United States Patent
Chaudhrl et al.

(10) Patent No.: US 8,453,065 B2
(45) Date of Patent: May 28, 2013

(54) PREVIEW AND INSTALLATION OF USER INTERFACE ELEMENTS IN A DISPLAY ENVIRONMENT

(75) Inventors: Imran A. Chaudhrl, San Francisco, CA (US); John O. Louch, San Luis Obispo, CA (US); Gregory N. Christle, San Jose, CA (US); Eric Steven Peyton, Lisle, IL (US); Kevin Tiene, Cupertino, CA (US); Scott Forstall, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 180 days.

(21) Appl. No.: 11/148,010

(22) Filed: Jun. 7, 2005

(65) Prior Publication Data
US 2006/0277469 A1    Dec. 7, 2006

Related U.S. Application Data

(60) Provisional application No. 60/583,125, filed on Jun. 25, 2004.

(51) Int. Cl.
*G06F 3/00* (2006.01)

(52) U.S. Cl.
USPC ............................ 715/762; 715/826; 715/709

(58) Field of Classification Search
USPC .................. 715/709, 864, 826, 762; 345/333, 345/334
See application file for complete search history.

(56) References Cited

U.S. PATENT DOCUMENTS

| | | | |
|---|---|---|---|
| 4,752,893 A | 6/1988 | Guttag et al. |
| 5,031,104 A | 7/1991 | Ikeda et al. |
| 5,067,081 A | 11/1991 | Person |
| 5,168,441 A | 12/1992 | Ornaheim et al. |
| 5,289,574 A | 2/1994 | Sawyer |
| 5,297,250 A | 3/1994 | Leroy et al. |
| 5,351,995 A | 10/1994 | Booker |
| 5,357,603 A | 10/1994 | Parker |
| 5,379,057 A | 1/1995 | Clough et al. |
| 5,388,201 A | 2/1995 | Hourvitz et al. |

(Continued)

FOREIGN PATENT DOCUMENTS

| | | |
|---|---|---|
| CA | 2 432 239 | 12/2004 |
| DE | 10 141 695 | 3/2003 |

(Continued)

OTHER PUBLICATIONS

JavaBoutique. Oct. 1, 2002. Available at: http://javaboutique.internet.com/utilities/counter.html.*

(Continued)

*Primary Examiner* — Omar Abdul-Ali
(74) *Attorney, Agent, or Firm* — Fish & Richardson P.C.

(57) ABSTRACT

Methods, apparatus, and computer program products are provided including a method for displaying a user interface element in a display environment. The method includes receiving a selection of a user interface element to be displayed in a display environment, and selectively displaying the user interface element in a preview environment prior to installing the user interface element and prior to displaying the interface element in the display environment. Selectively displaying the user interface element includes determining if a preview is required; instantiating the user interface element in a preview environment including displaying the user interface element in a presentation window and supporting interaction of the user interface element with a user; and selectively installing the user interface element in the display environment.

23 Claims, 50 Drawing Sheets

U.S. PATENT DOCUMENTS

| | | | |
|---|---|---|---|
| 5,416,890 A | 5/1995 | Beretta | |
| 5,481,665 A | 1/1996 | Okada et al. | |
| 5,490,246 A | 2/1996 | Brotsky et al. | |
| 5,522,022 A | 5/1996 | Rao et al. | |
| 5,537,630 A | 7/1996 | Berry et al. | |
| 5,552,989 A | 9/1996 | Bertrand | |
| 5,564,002 A | 10/1996 | Brown | |
| 5,564,022 A | 10/1996 | Debnath et al. | |
| 5,588,098 A | 12/1996 | Chen et al. | |
| 5,602,997 A * | 2/1997 | Carpenter et al. | 715/764 |
| 5,638,501 A | 6/1997 | Gough et al. | |
| 5,644,737 A | 7/1997 | Tuniman et al. | |
| 5,644,739 A | 7/1997 | Moursund | |
| 5,651,107 A | 7/1997 | Frank et al. | |
| 5,657,049 A | 8/1997 | Ludolph et al. | |
| 5,659,693 A | 8/1997 | Hansen et al. | |
| 5,659,694 A | 8/1997 | Bibayan | |
| 5,666,416 A | 9/1997 | Micali | |
| 5,671,343 A | 9/1997 | Kondo et al. | |
| 5,675,362 A | 10/1997 | Clough et al. | |
| 5,689,664 A | 11/1997 | Narayanan et al. | |
| 5,708,764 A | 1/1998 | Borrel et al. | |
| 5,710,884 A | 1/1998 | Dedrick | |
| 5,721,848 A | 2/1998 | Joseph | |
| 5,727,129 A | 3/1998 | Barrett et al. | |
| 5,727,135 A | 3/1998 | Webb et al. | |
| 5,731,819 A | 3/1998 | Gagne et al. | |
| 5,742,285 A | 4/1998 | Ueda | |
| 5,742,768 A | 4/1998 | Gennaro et al. | |
| 5,754,174 A | 5/1998 | Carpenter et al. | |
| 5,760,773 A | 6/1998 | Berman et al. | |
| 5,764,229 A | 6/1998 | Bennett | |
| 5,764,238 A | 6/1998 | Lum et al. | |
| 5,790,120 A | 8/1998 | Lozares et al. | |
| 5,793,376 A | 8/1998 | Tanaka et al. | |
| 5,796,402 A | 8/1998 | Ellison-Taylor | |
| 5,801,703 A | 9/1998 | Bowden et al. | |
| 5,809,230 A | 9/1998 | Pereira | |
| 5,835,061 A | 11/1998 | Stewart | |
| 5,835,692 A | 11/1998 | Cragun et al. | |
| 5,835,693 A | 11/1998 | Lynch et al. | |
| 5,838,316 A | 11/1998 | Arruza | |
| 5,838,906 A | 11/1998 | Doyle et al. | |
| 5,870,734 A | 2/1999 | Kao | |
| 5,877,741 A | 3/1999 | Chee et al. | |
| 5,877,762 A | 3/1999 | Young et al. | |
| 5,878,219 A | 3/1999 | Vance, Jr. et al. | |
| 5,883,639 A | 3/1999 | Walton et al. | |
| 5,900,876 A | 5/1999 | Yagita et al. | |
| 5,903,896 A | 5/1999 | Waldman et al. | |
| 5,917,436 A | 6/1999 | Endo et al. | |
| 5,920,659 A | 7/1999 | Iverson et al. | |
| 5,929,852 A | 7/1999 | Fisher et al. | |
| 5,933,148 A | 8/1999 | Oka et al. | |
| 5,949,409 A | 9/1999 | Tanaka et al. | |
| 5,963,191 A | 10/1999 | Jaaskelainen, Jr. | |
| 5,978,579 A | 11/1999 | Buxton et al. | |
| 5,999,948 A | 12/1999 | Nelson et al. | |
| 6,005,568 A | 12/1999 | Simonoff et al. | |
| 6,006,231 A | 12/1999 | Popa | |
| 6,011,562 A | 1/2000 | Gagne et al. | |
| 6,023,708 A | 2/2000 | Mendez et al. | |
| 6,031,937 A | 2/2000 | Graffagnino | |
| 6,034,621 A | 3/2000 | Kaufman | |
| 6,045,446 A | 4/2000 | Ohshima | |
| 6,061,695 A | 5/2000 | Slivka et al. | |
| 6,075,543 A | 6/2000 | Akeley | |
| 6,128,010 A * | 10/2000 | Baxter et al. | 715/846 |
| 6,133,915 A | 10/2000 | Arcuri et al. | |
| 6,144,381 A | 11/2000 | Lection et al. | |
| 6,154,601 A | 11/2000 | Yaegashi et al. | |
| 6,160,552 A | 12/2000 | Wilsher et al. | |
| 6,166,748 A | 12/2000 | Van Hook et al. | |
| 6,167,533 A | 12/2000 | Potterveld et al. | |
| 6,185,427 B1 | 2/2001 | Krasner et al. | |
| 6,188,399 B1 | 2/2001 | Voas et al. | |
| 6,191,797 B1 | 2/2001 | Politis | |
| 6,195,664 B1 | 2/2001 | Tolfa | |
| 6,199,045 B1 | 3/2001 | Giniger et al. | |
| 6,211,890 B1 | 4/2001 | Ohba | |
| 6,243,705 B1 | 6/2001 | Kucala | |
| 6,246,418 B1 | 6/2001 | Oka | |
| 6,253,122 B1 | 6/2001 | Razavi et al. | |
| 6,259,405 B1 | 7/2001 | Stewart et al. | |
| 6,259,432 B1 | 7/2001 | Yamada et al. | |
| 6,266,053 B1 | 7/2001 | French et al. | |
| 6,266,430 B1 | 7/2001 | Rhoads | |
| 6,269,405 B1 | 7/2001 | Dutcher et al. | |
| 6,272,484 B1 | 8/2001 | Martin et al. | |
| 6,272,558 B1 | 8/2001 | Hui et al. | |
| 6,275,831 B1 | 8/2001 | Bodnar et al. | |
| 6,278,448 B1 * | 8/2001 | Brown et al. | 715/866 |
| 6,278,450 B1 | 8/2001 | Arcuri et al. | |
| 6,278,884 B1 | 8/2001 | Kim | |
| 6,295,541 B1 | 9/2001 | Bodnar et al. | |
| 6,298,306 B1 | 10/2001 | Suarez et al. | |
| 6,300,947 B1 | 10/2001 | Kanevsky | |
| 6,304,684 B1 | 10/2001 | Niczyporuk et al. | |
| 6,307,574 B1 | 10/2001 | Ashe et al. | |
| 6,310,621 B1 | 10/2001 | Gagne et al. | |
| 6,311,232 B1 | 10/2001 | Cagle et al. | |
| 6,313,851 B1 | 11/2001 | Matthews, III et al. | |
| 6,321,314 B1 | 11/2001 | Van Dyke | |
| 6,333,753 B1 | 12/2001 | Hinckley | |
| 6,344,855 B1 | 2/2002 | Fisher et al. | |
| 6,353,437 B1 | 3/2002 | Gagne | |
| 6,369,823 B2 | 4/2002 | Ohba | |
| 6,369,830 B1 | 4/2002 | Brunner et al. | |
| 6,396,520 B1 | 5/2002 | Ording | |
| 6,401,104 B1 | 6/2002 | LaRue et al. | |
| 6,411,274 B2 | 6/2002 | Watanabe et al. | |
| 6,411,301 B1 | 6/2002 | Parikh et al. | |
| 6,412,021 B1 | 6/2002 | Nguyen et al. | |
| 6,421,058 B2 | 7/2002 | Parikh et al. | |
| 6,424,348 B2 | 7/2002 | Parikh | |
| 6,430,576 B1 | 8/2002 | Gates et al. | |
| 6,434,744 B1 | 8/2002 | Chamberlain et al. | |
| 6,452,600 B1 | 9/2002 | Parikh et al. | |
| 6,456,234 B1 | 9/2002 | Johnson | |
| 6,456,290 B2 | 9/2002 | Parikh et al. | |
| 6,457,034 B1 | 9/2002 | Morein | |
| 6,466,218 B2 | 10/2002 | Parikh et al. | |
| 6,466,237 B1 | 10/2002 | Miyao et al. | |
| 6,469,714 B2 | 10/2002 | Buxton et al. | |
| 6,483,524 B1 | 11/2002 | Petchenkine et al. | |
| 6,484,261 B1 | 11/2002 | Wiegel | |
| 6,487,560 B1 | 11/2002 | LaRue et al. | |
| 6,489,963 B2 | 12/2002 | Parikh et al. | |
| 6,512,522 B1 | 1/2003 | Miller et al. | |
| 6,515,682 B1 | 2/2003 | Washington et al. | |
| 6,525,736 B1 | 2/2003 | Erikawa et al. | |
| 6,526,174 B1 | 2/2003 | Graffagnino | |
| 6,535,892 B1 | 3/2003 | LaRue et al. | |
| 6,536,041 B1 | 3/2003 | Knudson et al. | |
| 6,542,160 B1 | 4/2003 | Abgrall | |
| 6,542,166 B1 * | 4/2003 | Washington et al. | 715/762 |
| 6,544,295 B1 | 4/2003 | Bodnar | |
| 6,571,245 B2 | 5/2003 | Huang et al. | |
| 6,571,328 B2 | 5/2003 | Liao et al. | |
| 6,573,896 B1 | 6/2003 | Ribadeau et al. | |
| 6,577,317 B1 | 6/2003 | Duluk, Jr. et al. | |
| 6,580,430 B1 | 6/2003 | Hollis et al. | |
| 6,590,592 B1 | 7/2003 | Nason et al. | |
| 6,609,977 B1 | 8/2003 | Shimizu et al. | |
| 6,611,687 B1 | 8/2003 | Clark et al. | |
| 6,614,444 B1 | 9/2003 | Duluk, Jr. et al. | |
| 6,615,213 B1 | 9/2003 | Johnson | |
| 6,618,048 B1 | 9/2003 | Leather | |
| 6,636,214 B1 | 10/2003 | Leather et al. | |
| 6,639,595 B1 | 10/2003 | Drebin et al. | |
| 6,661,426 B1 | 12/2003 | Jetha et al. | |
| 6,664,958 B1 | 12/2003 | Leather et al. | |
| 6,664,962 B1 | 12/2003 | Komsthoeft et al. | |
| 6,664,986 B1 | 12/2003 | Kopelman et al. | |
| 6,674,438 B1 | 1/2004 | Yamamoto et al. | |
| 6,677,894 B2 | 1/2004 | Sheynblat et al. | |
| 6,681,120 B1 | 1/2004 | Kim | |

| | | | |
|---|---|---|---|
| 6,687,745 B1 | 2/2004 | Franco et al. | |
| 6,697,074 B2 | 2/2004 | Parikh et al. | |
| 6,707,462 B1 | 3/2004 | Peercy et al. | |
| 6,711,474 B1 | 3/2004 | Treyz et al. | |
| 6,714,201 B1 | 3/2004 | Grinstein et al. | |
| 6,714,221 B1 | 3/2004 | Christie et al. | |
| 6,715,053 B1 | 3/2004 | Grigor | |
| 6,717,599 B1 | 4/2004 | Olano | |
| 6,724,403 B1 | 4/2004 | Santoro et al. | |
| 6,731,238 B2 | 5/2004 | Johnson | |
| 6,734,864 B2 | 5/2004 | Abgrall | |
| 6,738,804 B1 | 5/2004 | Lo | |
| 6,741,242 B1 | 5/2004 | Itoh et al. | |
| 6,742,042 B1 | 5/2004 | Holden et al. | |
| 6,757,691 B1 | 6/2004 | Welsh et al. | |
| 6,757,698 B2 | 6/2004 | McBride et al. | |
| 6,760,046 B2 | 7/2004 | I'Anson et al. | |
| 6,765,592 B1 | 7/2004 | Pletcher et al. | |
| 6,788,318 B2 | 9/2004 | Chen | |
| 6,792,616 B1 | 9/2004 | Jerding et al. | |
| 6,795,060 B2 | 9/2004 | Rekimoto et al. | |
| 6,806,892 B1 | 10/2004 | Plow et al. | |
| 6,810,323 B1 | 10/2004 | Bullock et al. | |
| 6,816,782 B1 | 11/2004 | Walters et al. | |
| 6,845,318 B1 | 1/2005 | Moore et al. | |
| 6,847,891 B2 | 1/2005 | Pietras et al. | |
| 6,853,911 B1 | 2/2005 | Sakarya | |
| 6,853,917 B2 | 2/2005 | Miwa | |
| 6,882,979 B1 | 4/2005 | Reay et al. | |
| 6,892,360 B1 | 5/2005 | Pabla et al. | |
| 6,906,720 B2 | 6/2005 | Emberling et al. | |
| 6,910,000 B1 | 6/2005 | Yedidia et al. | |
| 6,910,052 B2 | 6/2005 | Gates et al. | |
| 6,911,984 B2 | 6/2005 | Sabella et al. | |
| 6,918,091 B2 | 7/2005 | Leavitt et al. | |
| 6,931,633 B1 | 8/2005 | Vazquez et al. | |
| 6,944,829 B2 | 9/2005 | Dando | |
| 6,975,959 B2 | 12/2005 | Dietrich et al. | |
| 6,993,721 B2 | 1/2006 | Rosin et al. | |
| 7,007,242 B2 | 2/2006 | Suomela et al. | |
| 7,016,011 B2 | 3/2006 | De Haan | |
| 7,024,381 B1 | 4/2006 | Hastings et al. | |
| 7,027,055 B2 | 4/2006 | Anderson et al. | |
| 7,028,264 B2 | 4/2006 | Santoro et al. | |
| 7,036,083 B1 | 4/2006 | Zenith | |
| 7,044,372 B2 | 5/2006 | Okuda et al. | |
| 7,050,955 B1 | 5/2006 | Carmel et al. | |
| 7,076,730 B1 | 7/2006 | Baker | |
| 7,082,577 B1 | 7/2006 | Brosnahan | |
| 7,085,994 B2 | 8/2006 | Gvily | |
| 7,096,030 B2 | 8/2006 | Huomo | |
| 7,107,546 B2 | 9/2006 | Coulthard | |
| 7,123,189 B2 | 10/2006 | Lalik et al. | |
| 7,127,473 B2 | 10/2006 | Agassi et al. | |
| 7,127,713 B2 | 10/2006 | Davis et al. | |
| 7,146,563 B2 | 12/2006 | Hesmer et al. | |
| 7,174,512 B2 | 2/2007 | Martin et al. | |
| 7,185,290 B2 | 2/2007 | Cadiz et al. | |
| 7,187,997 B2 | 3/2007 | Johnson | |
| 7,191,399 B2 | 3/2007 | Ohtani et al. | |
| 7,222,155 B1 | 5/2007 | Gebhardt et al. | |
| 7,242,406 B2 | 7/2007 | Robotham et al. | |
| 7,249,327 B2 | 7/2007 | Nelson et al. | |
| 7,256,711 B2 | 8/2007 | Sheha et al. | |
| 7,260,380 B2 | 8/2007 | Dietl et al. | |
| 7,269,792 B2 | 9/2007 | Consolatti et al. | |
| 7,281,202 B2 | 10/2007 | Croney et al. | |
| 7,293,034 B2 | 11/2007 | Paya et al. | |
| 7,315,848 B2 | 1/2008 | Pearse et al. | |
| 7,328,435 B2 | 2/2008 | Trifon | |
| 7,346,766 B2 | 3/2008 | Mackin et al. | |
| 7,356,816 B2 | 4/2008 | Goodman et al. | |
| 7,401,104 B2 | 7/2008 | Shah et al. | |
| 7,426,687 B1 | 9/2008 | Schultz et al. | |
| 7,503,010 B2 | 3/2009 | Chaudhri et al. | |
| 7,523,401 B1 | 4/2009 | Aldridge | |
| 7,530,026 B2 | 5/2009 | Chaudhri et al. | |
| 7,546,543 B2 | 6/2009 | Louch et al. | |
| 7,568,165 B2 | 7/2009 | Amadio et al. | |
| 7,614,011 B2 | 11/2009 | Karidis et al. | |
| 7,644,391 B2 | 1/2010 | Fisher et al. | |
| 7,730,082 B2 | 6/2010 | Sah et al. | |
| 7,761,800 B2 | 7/2010 | Chaudhri et al. | |
| 7,765,326 B2 | 7/2010 | Robbin et al. | |
| 7,765,493 B2 | 7/2010 | Chickles et al. | |
| 7,784,065 B2 | 8/2010 | Polivy et al. | |
| 7,793,222 B2 | 9/2010 | Chaudhri et al. | |
| 7,793,227 B2 | 9/2010 | Wada et al. | |
| 7,793,232 B2 | 9/2010 | Chaudhri et al. | |
| 7,802,246 B1 | 9/2010 | Kennedy et al. | |
| 7,814,148 B2 | 10/2010 | Bell et al. | |
| RE41,922 E | 11/2010 | Gough et al. | |
| 7,873,908 B1 | 1/2011 | Varanasi et al. | |
| 7,873,910 B2 | 1/2011 | Chaudhri et al. | |
| 2001/0019338 A1 | 9/2001 | Roth | |
| 2001/0030647 A1 | 10/2001 | Sowizral et al. | |
| 2001/0035885 A1 | 11/2001 | Iron et al. | |
| 2002/0013822 A1 | 1/2002 | West | |
| 2002/0042266 A1 | 4/2002 | Heyward et al. | |
| 2002/0049788 A1 | 4/2002 | Lipkin et al. | |
| 2002/0054148 A1 | 5/2002 | Okada | |
| 2002/0059594 A1 | 5/2002 | Rasmussen et al. | |
| 2002/0065946 A1 | 5/2002 | Narayan | |
| 2002/0066279 A1 | 6/2002 | Kiyomatsu | |
| 2002/0067418 A1 | 6/2002 | I | |
| 2002/0078453 A1 | 6/2002 | Kuo | |
| 2002/0085037 A1 | 7/2002 | Leavitt et al. | |
| 2002/0087632 A1 | 7/2002 | Keskar | |
| 2002/0089526 A1 | 7/2002 | Buxton et al. | |
| 2002/0093516 A1 | 7/2002 | Brunner et al. | |
| 2002/0099678 A1 | 7/2002 | Albright et al. | |
| 2002/0105548 A1 | 8/2002 | Hayton et al. | |
| 2002/0112180 A1 | 8/2002 | Land et al. | |
| 2002/0114466 A1 | 8/2002 | Tanaka et al. | |
| 2002/0118217 A1 | 8/2002 | Fujiki | |
| 2002/0120673 A1 | 8/2002 | Tolson et al. | |
| 2002/0123739 A1 | 9/2002 | Haacke et al. | |
| 2002/0129092 A1 | 9/2002 | Tolson et al. | |
| 2002/0133508 A1 | 9/2002 | LaRue et al. | |
| 2002/0140740 A1* | 10/2002 | Chen | 345/810 |
| 2002/0158902 A1 | 10/2002 | Hooker et al. | |
| 2002/0171682 A1 | 11/2002 | Frank et al. | |
| 2002/0174003 A1 | 11/2002 | Redmann et al. | |
| 2002/0174055 A1 | 11/2002 | Dick et al. | |
| 2002/0174181 A1 | 11/2002 | Wei | |
| 2002/0180798 A1 | 12/2002 | Poor et al. | |
| 2002/0186257 A1 | 12/2002 | Cadiz et al. | |
| 2002/0196268 A1 | 12/2002 | Wolff et al. | |
| 2003/0008661 A1 | 1/2003 | Joyce et al. | |
| 2003/0008711 A1 | 1/2003 | Corbo | |
| 2003/0009267 A1 | 1/2003 | Dunsky et al. | |
| 2003/0018971 A1 | 1/2003 | McKenna, Jr. | |
| 2003/0020671 A1 | 1/2003 | Santoro et al. | |
| 2003/0032409 A1 | 2/2003 | Hutcheson et al. | |
| 2003/0046316 A1 | 3/2003 | Gergic et al. | |
| 2003/0061482 A1 | 3/2003 | Emmerichs | |
| 2003/0067489 A1 | 4/2003 | Wong et al. | |
| 2003/0069904 A1 | 4/2003 | Hsu et al. | |
| 2003/0076369 A1 | 4/2003 | Resner et al. | |
| 2003/0079038 A1 | 4/2003 | Robbin et al. | |
| 2003/0080995 A1 | 5/2003 | Tenenbaum et al. | |
| 2003/0097659 A1 | 5/2003 | Goldman | |
| 2003/0100326 A1 | 5/2003 | Grube et al. | |
| 2003/0101046 A1 | 5/2003 | Krasnov | |
| 2003/0122787 A1 | 7/2003 | Zimmerman et al. | |
| 2003/0123739 A1 | 7/2003 | Graffagnino | |
| 2003/0125057 A1 | 7/2003 | Pesola | |
| 2003/0134657 A1 | 7/2003 | Norta et al. | |
| 2003/0144793 A1 | 7/2003 | Melaku et al. | |
| 2003/0146934 A1 | 8/2003 | Bailey et al. | |
| 2003/0154239 A1 | 8/2003 | Davis et al. | |
| 2003/0158975 A1 | 8/2003 | Frank et al. | |
| 2003/0164862 A1 | 9/2003 | Cadiz et al. | |
| 2003/0169306 A1* | 9/2003 | Makipaa et al. | 345/864 |
| 2003/0174136 A1 | 9/2003 | Emberling et al. | |
| 2003/0174154 A1 | 9/2003 | Yukie et al. | |
| 2003/0184552 A1 | 10/2003 | Chadha | |
| 2003/0184584 A1 | 10/2003 | Vachuska et al. | |

| | | | | | |
|---|---|---|---|---|---|
| 2003/0189597 A1 | 10/2003 | Anderson et al. | 2006/0031264 A1 | 2/2006 | Bosworth et al. |
| 2003/0191799 A1 | 10/2003 | Araujo et al. | 2006/0036703 A1 | 2/2006 | Fulmer et al. |
| 2003/0206195 A1 | 11/2003 | Matsa et al. | 2006/0036941 A1 | 2/2006 | Neil |
| 2003/0208685 A1 | 11/2003 | Abdel-Rahman | 2006/0036969 A1 | 2/2006 | Guido et al. |
| 2004/0003402 A1 | 1/2004 | McKenna, Jr. | 2006/0041377 A1 | 2/2006 | Jung et al. |
| 2004/0012626 A1 | 1/2004 | Brookins | 2006/0041378 A1 | 2/2006 | Cheng et al. |
| 2004/0032409 A1 | 2/2004 | Girard | 2006/0053384 A1 | 3/2006 | La Fetra et al. |
| 2004/0036711 A1 | 2/2004 | Anderson | 2006/0064422 A1 | 3/2006 | Arthurs et al. |
| 2004/0039934 A1 | 2/2004 | Land et al. | 2006/0075033 A1 | 4/2006 | Bienstock et al. |
| 2004/0054428 A1 | 3/2004 | Sheha et al. | 2006/0075106 A1 | 4/2006 | Hochmuth et al. |
| 2004/0054711 A1 | 3/2004 | Multer | 2006/0075141 A1 | 4/2006 | Boxenhorn |
| 2004/0070629 A1 | 4/2004 | Seifert | 2006/0089840 A1 | 4/2006 | May |
| 2004/0078814 A1 | 4/2004 | Allen | 2006/0095331 A1 | 5/2006 | O'Malley et al. |
| 2004/0090969 A1 | 5/2004 | Jerrard-Dunne et al. | 2006/0107231 A1 | 5/2006 | Matthews et al. |
| 2004/0117831 A1 | 6/2004 | Ellis et al. | 2006/0112123 A1 | 5/2006 | Clark et al. |
| 2004/0119754 A1 | 6/2004 | Bangalore et al. | 2006/0123356 A1 | 6/2006 | Sobeski et al. |
| 2004/0125128 A1 | 7/2004 | Chang et al. | 2006/0123359 A1 | 6/2006 | Schatzberger et al. |
| 2004/0158401 A1 | 8/2004 | Yoon | 2006/0136843 A1 | 6/2006 | Shafron |
| 2004/0176907 A1 | 9/2004 | Nesbitt | 2006/0150118 A1 | 7/2006 | Chaudhri et al. |
| 2004/0179019 A1 | 9/2004 | Sabella et al. | 2006/0156248 A1 | 7/2006 | Chaudhri et al. |
| 2004/0181580 A1 | 9/2004 | Baranshamaje | 2006/0168536 A1 | 7/2006 | Portmann |
| 2004/0183800 A1 | 9/2004 | Peterson | 2006/0168538 A1 | 7/2006 | Stevens et al. |
| 2004/0194020 A1 | 9/2004 | Beda et al. | 2006/0174202 A1 | 8/2006 | Bonner |
| 2004/0203909 A1 | 10/2004 | Koster | 2006/0197752 A1 | 9/2006 | Hurst et al. |
| 2004/0205504 A1 | 10/2004 | Phillips | 2006/0200775 A1 | 9/2006 | Behr et al. |
| 2004/0212640 A1 | 10/2004 | Mann et al. | 2006/0205517 A1 | 9/2006 | Malabuyo et al. |
| 2004/0215740 A1 | 10/2004 | Frank et al. | 2006/0206835 A1 | 9/2006 | Chaudhri et al. |
| 2004/0223003 A1 | 11/2004 | Heirich et al. | 2006/0218499 A1 | 9/2006 | Matthew et al. |
| 2004/0225955 A1 | 11/2004 | Ly | 2006/0230059 A1 | 10/2006 | Etgen et al. |
| 2004/0230911 A1 | 11/2004 | Bent et al. | 2006/0230272 A1 | 10/2006 | Lawrence et al. |
| 2004/0237082 A1* | 11/2004 | Alcazar et al. ............... 717/174 | 2006/0236257 A1 | 10/2006 | Othmer et al. |
| 2004/0248586 A1 | 12/2004 | Patel et al. | 2006/0253794 A1 | 11/2006 | Wilson |
| 2004/0255253 A1 | 12/2004 | Marcjan | 2006/0271637 A1 | 11/2006 | McKeon et al. |
| 2004/0261012 A1 | 12/2004 | Balsiger | 2006/0274086 A1 | 12/2006 | Forstall et al. |
| 2004/0261037 A1 | 12/2004 | Ording et al. | 2006/0277469 A1 | 12/2006 | Chaudhri et al. |
| 2004/0261038 A1 | 12/2004 | Ording et al. | 2006/0277481 A1 | 12/2006 | Forstall et al. |
| 2005/0010419 A1 | 1/2005 | Pourhamid | 2006/0282574 A1 | 12/2006 | Zotov et al. |
| 2005/0010634 A1 | 1/2005 | Henderson et al. | 2006/0287824 A1 | 12/2006 | Lin |
| 2005/0021935 A1 | 1/2005 | Schillings et al. | 2007/0005233 A1 | 1/2007 | Pinkus et al. |
| 2005/0022139 A1 | 1/2005 | Gettman et al. | 2007/0010942 A1 | 1/2007 | Bill |
| 2005/0027442 A1 | 2/2005 | Kelley et al. | 2007/0011026 A1 | 1/2007 | Higgins et al. |
| 2005/0039144 A1 | 2/2005 | Wada et al. | 2007/0016362 A1 | 1/2007 | Nelson |
| 2005/0057497 A1 | 3/2005 | Kawahara | 2007/0038934 A1 | 2/2007 | Fellman |
| 2005/0060655 A1 | 3/2005 | Gray et al. | 2007/0042790 A1 | 2/2007 | Mohi et al. |
| 2005/0060661 A1 | 3/2005 | Kawahara et al. | 2007/0044029 A1 | 2/2007 | Fisher et al. |
| 2005/0088447 A1 | 4/2005 | Hanggie et al. | 2007/0044039 A1 | 2/2007 | Amadio et al. |
| 2005/0088452 A1 | 4/2005 | Hanggie et al. | 2007/0061245 A1 | 3/2007 | Ramer et al. |
| 2005/0091571 A1 | 4/2005 | Leichtling | 2007/0061724 A1 | 3/2007 | Slothouber et al. |
| 2005/0091690 A1 | 4/2005 | Delpuch et al. | 2007/0073480 A1 | 3/2007 | Singh |
| 2005/0096840 A1 | 5/2005 | Simske | 2007/0074126 A1 | 3/2007 | Fisher et al. |
| 2005/0114021 A1 | 5/2005 | Krull et al. | 2007/0093258 A1 | 4/2007 | Steenstra et al. |
| 2005/0144563 A1 | 6/2005 | Hough et al. | 2007/0101146 A1 | 5/2007 | Louch et al. |
| 2005/0144595 A1 | 6/2005 | McLean | 2007/0101279 A1 | 5/2007 | Chaudhri et al. |
| 2005/0149458 A1 | 7/2005 | Eglen et al. | 2007/0101288 A1 | 5/2007 | Forstall et al. |
| 2005/0160368 A1* | 7/2005 | Liu et al. ............... 715/762 | 2007/0101291 A1 | 5/2007 | Forstall et al. |
| 2005/0168471 A1 | 8/2005 | Paquette | 2007/0101297 A1 | 5/2007 | Forstall et al. |
| 2005/0168476 A1 | 8/2005 | Levene et al. | 2007/0101433 A1 | 5/2007 | Louch et al. |
| 2005/0172239 A1 | 8/2005 | Liu et al. | 2007/0106465 A1 | 5/2007 | Adam et al. |
| 2005/0183026 A1 | 8/2005 | Amano et al. | 2007/0118813 A1 | 5/2007 | Forstall et al. |
| 2005/0193368 A1 | 9/2005 | Becker et al. | 2007/0124066 A1 | 5/2007 | Kikuchi et al. |
| 2005/0197767 A1 | 9/2005 | Nortrup | 2007/0129888 A1 | 6/2007 | Rosenberg |
| 2005/0198584 A1 | 9/2005 | Matthews et al. | 2007/0130153 A1 | 6/2007 | Nachman et al. |
| 2005/0215310 A1 | 9/2005 | Boyd et al. | 2007/0130541 A1 | 6/2007 | Louch et al. |
| 2005/0221808 A1 | 10/2005 | Karlsson et al. | 2007/0135136 A1 | 6/2007 | Ische |
| 2005/0222756 A1 | 10/2005 | Davis et al. | 2007/0135990 A1 | 6/2007 | Seymour et al. |
| 2005/0227709 A1 | 10/2005 | Chang et al. | 2007/0150320 A1 | 6/2007 | Huang |
| 2005/0240857 A1 | 10/2005 | Benedict et al. | 2007/0156326 A1 | 7/2007 | Nesbitt |
| 2005/0243373 A1 | 11/2005 | Silverbrook et al. | 2007/0162850 A1 | 7/2007 | Adler et al. |
| 2005/0256940 A1 | 11/2005 | Henderson et al. | 2007/0179854 A1 | 8/2007 | Ziv et al. |
| 2005/0278651 A1 | 12/2005 | Coe et al. | 2007/0203984 A2 | 8/2007 | AlHusseini et al. |
| 2005/0282612 A1 | 12/2005 | Mathews | 2007/0204218 A1 | 8/2007 | Weber et al. |
| 2005/0283734 A1 | 12/2005 | Santoro et al. | 2007/0209013 A1 | 9/2007 | Ramsey et al. |
| 2006/0001652 A1 | 1/2006 | Chiu et al. | 2007/0233736 A1 | 10/2007 | Xiong et al. |
| 2006/0004913 A1 | 1/2006 | Chong | 2007/0254676 A1 | 11/2007 | Pedigo et al. |
| 2006/0005207 A1 | 1/2006 | Louch et al. | 2007/0260751 A1 | 11/2007 | Meesseman |
| 2006/0010394 A1 | 1/2006 | Chaudhri et al. | 2007/0266093 A1 | 11/2007 | Forstall et al. |
| 2006/0015249 A1 | 1/2006 | Gieseke | 2007/0271328 A1 | 11/2007 | Geelen et al. |
| 2006/0015818 A1 | 1/2006 | Chaudhri et al. | 2007/0273558 A1 | 11/2007 | Smith et al. |
| 2006/0015846 A1 | 1/2006 | Fraleigh et al. | 2007/0276586 A1 | 11/2007 | Jeon et al. |

| | | | | | | |
|---|---|---|---|---|---|---|
| 2007/0276596 | A1 | 11/2007 | Solomon et al. | JP | 2007-304009 | 11/2007 |
| 2007/0282521 | A1 | 12/2007 | Broughton | JP | 2008-058917 | 3/2008 |
| 2007/0299601 | A1 | 12/2007 | Zhao et al. | KR | 2005-096746 | 10/2005 |
| 2008/0004802 | A1 | 1/2008 | Horvitz | WO | WO 96/06401 | 2/1996 |
| 2008/0016468 | A1 | 1/2008 | Chambers et al. | WO | 97/07467 | 2/1997 |
| 2008/0021632 | A1 | 1/2008 | Amano | WO | 97/24577 | 7/1997 |
| 2008/0027636 | A1 | 1/2008 | Tengler et al. | WO | 98/07112 | 2/1998 |
| 2008/0032703 | A1 | 2/2008 | Krumm et al. | WO | WO 98/45815 | 10/1998 |
| 2008/0034309 | A1 | 2/2008 | Louch et al. | WO | WO 02/09039 | 1/2002 |
| 2008/0034314 | A1 | 2/2008 | Louch et al. | WO | 03/023593 | 3/2003 |
| 2008/0045234 | A1 | 2/2008 | Reed | WO | WO 2004/027707 | 4/2004 |
| 2008/0071466 | A1 | 3/2008 | Downs et al. | WO | 2004/076977 | 9/2004 |
| 2008/0082254 | A1 | 4/2008 | Huhtala et al. | WO | WO 2006/012343 | 2/2006 |
| 2008/0085727 | A1 | 4/2008 | Kratz | WO | WO 2006/020304 | 2/2006 |
| 2008/0091347 | A1 | 4/2008 | Tashiro | WO | WO 2006/119269 | 11/2006 |
| 2008/0104634 | A1 | 5/2008 | Gajdos et al. | WO | WO 2009/012319 | 12/2009 |
| 2008/0109153 | A1 | 5/2008 | Gueziec | WO | WO 2009/012330 | 12/2009 |
| 2008/0129528 | A1 | 6/2008 | Guthrie | | | |
| 2008/0132243 | A1 | 6/2008 | Spalink et al. | | | |
| 2008/0132252 | A1 | 6/2008 | Altman et al. | | | |
| 2008/0140308 | A1 | 6/2008 | Yamane et al. | | | |
| 2008/0140520 | A1 | 6/2008 | Hyder et al. | | | |
| 2008/0155453 | A1 | 6/2008 | Othmer | | | |
| 2008/0161034 | A1 | 7/2008 | Akiyama | | | |
| 2008/0167811 | A1 | 7/2008 | Geelen | | | |
| 2008/0168367 | A1 | 7/2008 | Chaudhri et al. | | | |
| 2008/0168368 | A1 | 7/2008 | Louch et al. | | | |
| 2008/0168382 | A1 | 7/2008 | Louch et al. | | | |
| 2008/0172374 | A1 | 7/2008 | Wolosin et al. | | | |
| 2008/0176545 | A1 | 7/2008 | Dicke et al. | | | |
| 2008/0177793 | A1 | 7/2008 | Epstein et al. | | | |
| 2009/0021486 | A1 | 1/2009 | Chaudhri et al. | | | |
| 2009/0024944 | A1 | 1/2009 | Louch et al. | | | |
| 2009/0044138 | A1 | 2/2009 | Rudolph et al. | | | |
| 2009/0125815 | A1 | 5/2009 | Chaudhri et al. | | | |
| 2009/0144644 | A1 | 6/2009 | Chaudhri et al. | | | |
| 2009/0158193 | A1 | 6/2009 | Chaudhri et al. | | | |
| 2009/0187841 | A1 | 7/2009 | Chaudhri et al. | | | |
| 2009/0228824 | A1 | 9/2009 | Forstall et al. | | | |
| 2009/0260022 | A1 | 10/2009 | Louch et al. | | | |
| 2009/0271724 | A1 | 10/2009 | Chaudhri et al. | | | |

FOREIGN PATENT DOCUMENTS

| | | |
|---|---|---|
| DE | 102 42 378 | 3/2004 |
| EP | 548586 | 6/1993 |
| EP | 0694879 | 1/1996 |
| EP | 0 699 330 | 4/1998 |
| EP | 0 908 835 | 4/1999 |
| EP | 1 237 076 | 9/2002 |
| EP | 1 300 652 | 4/2003 |
| EP | 1383080 | 1/2004 |
| EP | 0972273 | 3/2004 |
| EP | 1 496 338 | 1/2005 |
| EP | 1 770 956 | 9/2005 |
| EP | 1 724 996 | 11/2006 |
| EP | 1 790 947 | 5/2007 |
| GB | 2 359 888 | 5/2001 |
| GB | 2 407 230 | 4/2005 |
| JP | 9-62993 | 3/1997 |
| JP | 9-210710 | 8/1997 |
| JP | 10-030933 | 2/1998 |
| JP | 2001-160063 | 6/2001 |
| JP | 2002-310680 | 10/2002 |
| JP | 2003-228532 | 8/2003 |
| JP | 2004-045054 | 2/2004 |
| JP | 2004-219146 | 8/2004 |
| JP | 2004-362271 | 12/2004 |
| JP | 2005-106741 | 4/2005 |
| JP | 2005-182146 | 7/2005 |
| JP | 2005-241519 | 9/2005 |
| JP | 2006-184007 | 7/2006 |
| JP | 2007-033220 | 2/2007 |
| JP | 2007-033331 | 2/2007 |
| JP | 2007-033368 | 2/2007 |
| JP | 2007-127439 | 5/2007 |
| JP | 2007-147439 | 6/2007 |
| JP | 2007-201699 | 8/2007 |
| JP | 2007-240400 | 9/2007 |
| JP | 2007-271299 | 10/2007 |

OTHER PUBLICATIONS

Javaboutique. Dec. 8, 2002. Available at: http://web.archive.org/web/20021208051951/http://javaboutique.internet.com/utilities/counter.html.*

Javaboutique. Oct. 8, 2008. Available at: http://web.archive.org/web/20021208051951/http://javaboutique.internet.com/utilities/counter.html.*

"About Merkitys"; [online] [Retrieved on Feb. 4, 2008]; Retrieved from the Internet, URL: http://meaning.3xi.org/; 3 pages.

"Advanced Digital Photo Solutions"; GeoSpatial Experts; [online] [Retrieved on Feb. 4, 2008]; Retrieved from the Internet, URL: http://www.geospatialexperts.com/productadv.html; 4 pages.

"Animated Transition"; [online] [Retrieved on Oct. 16, 2006] Retrieved from the Internet >URL: http://designinterfaces.com/Animated_Transition; 2 pages.

Beier et al., "The bull's-eye: a framework for web application user interface design guidelines", Proceedings of the Sigchi Conference on Human Factors in Computing Systems, Apr. 2003, pp. 489-496.

Berman et al., "The Role of Dead Reckoning and Inertial Sensors in Future General Aviation Navigation", IEEE, 1998, pp. 510-517.

Bevly et al., "Cacaded Kalman Filters for Accurate Estimatioon of Multiple Biases, Dead-Reckoning Navigation, and Full State Feedback Control of Ground Vehicles", IEEE Transactions on Control Systems in Technology, vol. 15, No. 2, Mar. 2007, pp. 199-208.

Binzhuo et al., "Mobile Phone GIS Based on Mobile SVG", IEEE 2005, pp. 889-892.

Boonsrimuang et al., "Mobile Internet Navigation System", IEEE, 2002, pp. 325-328.

Carew; "Phones that tell you where to drive, meet, eat"; [online] [Retrieved May 26, 2007]; Retrieved from the Internet <URL http://news.yahoo.com/s/nm/20070525/wr_nm/column_pluggedin_dc_2&printer=1;_ylt=Ahqaftn7x mlS2r0FZFeu9G4ht.cA; 2 pages.

Carey et al., "Integrating Widget Design Knowledge with User Interface Toolkits", Proceedings of the Fifth International Workshop on Computer-Aided Software Engineering, Jul. 1992, pp. 204-212.

Chen et al., "The Model of Optimum Route Selection in Vehicle Automatic Navigation System Based on Unblocked Reliability Analyses", Intelligent Transportation Systems, 2003, Proceedings, IEEE (2003), vol. 2, 12-15, Oct. 2003, pp. 975-978.

Chinese Notification of First Office Action, Chinese Patent Application No. 200580016349.3, Jul. 25, 2008, 21 pages.

Cho et al., A Traveler Information Service Structure in Hybrid T-DMB and Cellular Communication Network, Broadcast Systems Research Group, IEEE, 2006, pp. 747-750.

Chua et al., "Intelligent Portal for Event-triggered SMS Alerts", 2nd International Conference on Mobile Technology, Applications and Systems, 2005, 8 pages.

Civilis et al., "Efficient Tracking of Moving Objects with Precision Guarantees", IEEE, Proceedings of the First Annual International Conference on Mobile and Ubiquitous Systems: Networking and Services (MobiQuitous'04), 2004, 10 pages.

"Convert just about Anything to Anything else", OnlineConversion.com, Aug. 2000, [online] [Retrieved on Jun. 22, 2008] Retrieved from the Internet, URL:htrp://web.archive.org/web/200000815055422/http://www.onlineconversion.com/>.

"Coolsmartphone"; [online] [Retrieved on Apr. 13, 2006]; Retrieved from the Internet, URL: http://www.coolsmartphone.com/article569.html; 57 pages.

"DaimlerCrysler Guide5 Usecases Overview Map", 1 page.

Dalrymple, Jim; "Google Maps adds locator, but not for iPhone", [online] [Retrieved Nov. 30, 2007]; Retrieved from the Internet <URL: http://news.yahoo.com/s/macworld/20071130/tc_macworld/googlemaps20071130_0&printer=1;_ylt= Auvf3s6LQK_pOaJlb954T_DQn6gB; 1 page.

"dialDTMF" [online] [Retrieved Jan. 10, 2008] Retreived from the Internet, URL: http://dialdtmf.sourceforge.net/, 9 pages.

Dibdin, Peter, "Where are mobile location based services?", CM316 Mutlimedia Systems Paper, Dec. 14, 2001, pp. 1-8.

Evans et al., "In-Vehicle Man-Machine Interaction the Socrates Approach", Vehicle Navigation & Information Systems Conference Proceedings, Aug. 31-Sep. 2, 1994, pp. 473-477.

"FAQ"; [online] [Retrieved Nov. 30, 2007] Retrieved from the Internet, URL: http://www.navizon.com/FAQ.htm; 8 pages.

fliekr; [online] [Retrieved on Feb. 4, 2008]; Retrieved from the Internet, URL: http://flickr.com/map; 1 page.

"Garmin® nüvifone™ Takes Personal Navigation and Communication to the Next Level"; Garmin International; [online] [Retrieved on Mar. 17, 2008]; Retrieved from the Internet, URL: http://www8.garmin.com/pressroom/mobile/013008.html; 3 pages.

"garmin hits iphone directly with nuvifone"; [online] [Retrieved on Mar. 17, 2008]; Retrieved from the Internet, URL: http://www.electronista.com/print/50764; 3 pages.

"Go View Map Save to Favorites Cancel"; [online] [Retrieved on Feb. 4, 2008]; Retrieved from the Internet, URL: http://www8.garmin.com/buzz/nuvifone/m/g/sc-geotag-lg.jpg; 1 page.

"GPS Blogging Phones"; [online] [Retrieved on Apr. 5, 2006] Retrieve from the Internet, URL: http://www.dailywireless.org/modules.php?name=News&file=article&sid=4613; 3 pages.

Han; "Bi-manual, multi-point, and multi-user interactions on a graphical interaction surface"; Mutli-Touch Interaction Research; [online] [Retrieved on Apr. 13, 2006]; Retrieved from the Internet, URL: http://mr1.nyu.edu/~jhan/ftirtouch/; 4 pages.

Helal et al., "Drishti: An Integrated Navigation System for Visually Impaired and Disabled", Fifth International Symposium on Wearable Computers (ISWC'01), IEEE, 2001, pp. 149-156.

Hohman et al., "GPS Roadside Integrated Precision Positioning System", Position Location and Navigation Symposium (IEEE 2000), pp. 221-230.

"How it Works"; Navizon—Peer-to-Peer Wireless Positioning; [online] [Retrieved on Nov. 30, 2007] Retrieved from the Internet, URL: http://www.navizon.com/FullFeatures.htm, 7 pages.

International Numbering and SMS—Type of Numbering, TON, Numbering Plan Indicator, NPI, [online] [Retrived Jan. 5, 2007] Retrieved from the Internet <URL: http://www.activeexperts.com/support/activsms/tonnpi/, 2 pages.

"International Roaming Guide—Personal Experience(s) from Customer and Community Member"; [online] [Retrieved Jun. 26, 2006] Retrieved from the Internet <URL: http://forums.cingular.com/cng/board/message?board.id=1185; 6 pages.

Invitation to Pay Additional Fees(Form PCT/ISA/206) and Communication Relating to the Results of the Partial Intrenational Search (PCT/ISA/206 (Annex)) for PCT/US2007/077441; dated Jan. 28, 2008, 8 pages.

Invitation to Pay Additional Fees(Form PCT/ISA/206) and Communication Relating to the Results of the Partial Intrenational Search (PCT/ISA/206 (Annex)) for PCT/US2008/050295; dated Jul. 29, 2008.

"iPhone Software/Hardware Hack: LocoGPS—GPS Add-on for the iPhone"; [online] [Retrieved on Dec. 25, 2007] Retrieved from the Internet <URL: http://www.iphonehacks.com/iphone_applications/index.html; 41 pages.

Jirawimut et al., "A Method for Dead Reckoning Parameter Correction in Pedestrian Navigation System", IEEE Transactions on Instrumentation and Measurement, vol. 52, No. 1, Feb. 2003, pp. 209-215.

Ju et al., "RFID Data Collection and Integration based on Mobile Agent", IEEE, 2006, 4 pages.

Koide et al., "3-D Human Navigation System with Consideration of Neighboring Space Information", IEEE International Conference on Systems, Man and Cybernetics, 2006 (SMC '06), vol. 2, Oct. 8-11, 2006, pp. 1693-1698.

Manabe et al., "On the M-CubITS Pedestrian Navigation System", IEEE, 2006, pp. 793-798.

Microsoft Corporation, "User's Guide Microsoft® Windows™ and MS-DOS® 6", 1993, pp. Cover-xvi, 112-121.

Microsoft Corporation, "Microsoft® Windows™ Graphical Environment User's Guide", Version 3.0 for MS-DOS® or PC-DOS Operating System, 1990, Document No. SY06851-0290, pp. Cover-vii, 15-75, 315-353.

Miller et al., "Synchronization of Mobile XML Databases by Utilizing Deferred Views", IEEE 2004, pp. 186-191.

"Mio 269+ Users Manual"; 2005; 44 pages.

"MOREnet Dialing Plan: PSTN and IP Network Integration for H.323, H320 VoIP and Public Voice Networks", [online] [Retrieved on Jan. 11, 2008] Retrieved from the Interent < URL: http://www.more.net/technical/research/dialplan/index.html, 12 pages.

Nardi et al., "Integrating Communication and Information through Contact Map", Communications of the ACM, vol. 45, No. 4, Apr. 2002, pp. 89-95.

Navizon Peer-to-Peer Wireless Positioning; [online] [Retrieved on Nov. 30, 2007]; Retrieved from the Internet, URL: http//www.navizon.com/; 2 pages.

"New Improved Panoramio—Geo Photo Sharing"; Google Earth Blog; [online] [Retrieved on Feb. 5, 2008]; Retrieved from the Internet, URL: http://www.gearthblog.com/blog/archives/2006/06/new_improved_pa.html, 1 page.

"New program for mobile blogging for PocketPC released: My Blog"; [online] [Retrieved on Apr. 5, 2006]; Retrieved from the Internet, URL: http://msmobiles.com/news.php/4067.html.

Northard, "Docking Station Communication Link", IBM Technical Disclosure Bulletin, Feb. 1994, 4 pages.

Notification of Transmittal of the International Search Report and the Written Opinion of the International Searching Authority, PCT/US2007/077441, May 8, 2008; 17 pages.

"Numbering and Dialing Plan within the United States", Alliance for Telecommunications Industry Solutions; 2005; 17 pages.

"nüvifone Images"; [online] [Retrieved on Feb. 4, 2008]; Retrieved from the Internet, URL: http://www8.garmin.com/buzz/nuvifone/media_gallery.jsp; 2 pages.

Paksoy et al., "The Global Position System—Navigation Tool of the Future", Journal of Electrical & Electronics, 2002, vol. 2, No. 1, pp. 467-476.

Pfoser et al., "Dynamic Travel Time Maps—Enabling Efficient Navigation", Proceedings of the 18th International Conference on Scientific and Statistical Database Management (SSDBM'06), IEEE, 10 pages.

Portfolio 2007; [online] [Retrieved on Jun. 14, 2007]; Retrieved from the Interent, URL: http://eric.wahlforss.com/folio; 3 pages.

RD 409052, Research Disclosure Alerting Abstract, "Location dependent information for satellite based vehicle communication—required application of Global Position System (GPS) to automatically extract relevant portions of data package as vehicle changes position," May 10, 1998, 1 page.

Review Guide—Google Maps for mobile (beta); Google; 2006; 7 pages.

Rist et al., "Customizing Graphics for Tiny Displays of Mobile Devices", Personal and Ubiquitous Computing, 2002, pp. 260-268, vol. 6.

Samadani et al., "PathMaker: systems for capturing trips", IEEE International Conference on Mutlimedia and Expo (ICME), Jun. 27-30, 2004, vol. 3, 5 pages.

Schreiner, "Where We At? Mobile Phones Bring GPS to the Masses", IEEE Computers Society, May/Jun. 2007, pp. 6-11.

"SNAP, MAP and SHARE Your World"; IsWhere by Red Hen Systems; [online] [Retrieved on Jun. 3, 2008]; Retrieved from the Internet, URL: http://www.redhensystems.com/products/multimedia_mapping_software/iswhere/default.asp?sm=2; 1 page.

Snippets Software et al., "Products Overview", Feb. 2002, [online] [Retrieved on Feb. 5, 2008] Retrieved from the Internet URL: http://web.archive.org/web/20020206061508/http://www.snippets.com/products/>.
Stardock et al., "DesktopX General Guide," Aug. 2000, [online] [Retrieved on Jan. 31, 2008] Retrieved from the Internet URL:http://www.stardock.com/products/desktopx/does/.
Stardock et al., "DesktopX WhitePaper", Aug. 2000, [online] [Retrieved on Jan. 31, 2008] Retrieved from the Internet <URL:http://www.stardock.net/media/whitepaper_desktopx.html.
Stardock et al., "DesktopX Tutorial", Aug. 2000, [online] [Retrieved on Jan. 31, 2008] Retrieved from the Internet URL:http://www.stardock.com/products/desktopx/tutorial.html.
Stardock et al., "The User Guide—Version 2", DesktopX 2000.
Stardock et al., "What Can It Do? Making Objects", DesktopX Tutorial, 2001, [online] [Retrieved on Apr. 11, 2008] Retrieved from the Internet URL:http://web.archive.org/web/2001101922285/http://www.stardock.com/products/desktopx/ . . .
Sung et al., "Towards Reliable Peer-to-Peer Data Sharing over Mobile Ad hoc Networks", IEEE, 2005.
"User's Manual MioMap 2.0"; Aug. 2005; 59 pages.
"User-centered design of mobile solutions", NAMAHN, 2006, 18 pages.
"Windows Live Search for Mobile Goes Final, Still Great"; [online] [Retrieved on Mar. 11, 2007]; Retrieved from the Internet, URL: http://gizmodo.com/gadgets/software/windows-live-search-for-mobile-goes-final-still-great-236002.php; 3 pages.
"Windows Mobile"; Microsoft; 2 pages.
"Windows Mobile 6 Professional Video Tour"; [online] [Retrieved on Mar. 11, 2007]; Retrieved from the Internet, URL: http://gizmodo.com/gadgets/cellphones/windows-mobile-6-professional-video-tour-237039.php; 4 pages.
Wu et al., "A Mutlimedia System for Route Sharing and Video-based Navigation", IEEE, 2006, pp. 73-76.
"27 Countries in your pocket"; [online] [Retrieved on Sep. 29, 2005] Retrieved from the Internet <URL: http://www.mio-tech.be/en/printview/press-releases-2005-09-29.htm; 1 page.
"Desktop Sidebar", [online] [Retrieved on May 11, 2007] Retrieved from the Internet URL: http://web.archive.org/web/20040101160831/http://www.desktopsidebar.com/; 5 pages.
"Inter-widget communication?", [online] [Retrieved on Jun. 5, 2009], Retrieved from the Internet RL: http://www2.konfabulator.com/forums/lofiversion/index.php/t125.html; 3 pages.
"Portlet Communication: What is application scope, anyway?", Sep. 18, 2002, [online]; Retrieved from the Internet at URL: http://wwwcoderanch.com/t/203244/Portals-Portlets/java/Portlet-Communication-What-application-scope; 3 pages.
"Portlet-to-portlet communication between JSR 168 portlets on public pages", Apr. 5, 2006, [online]; Retrieved from the Internet URL: http://www.ibm.developerworks/websphere/library/techarticles/0604_scott/0604_scott.html; 9 pages.
"Starfish Software Introduces Starfish Internet Sidekick; Starfish Internet Sidekick is the best way for Internet users to manage their calendar, contacts and communications," Business Wire, Sep. 23, 1996, [online] [Retrieved on Dec. 8, 2008]; Retrieved from the Internet URL: http://findarticles.com/articles/mi_mOEIN/is_1996_Sept_23/ai_18704672?tag=rel.res1; 2 pages.
"Welcome to the Gigaplex!™", Lazar Productions, Nov. 1996, [online] [Retrieved on Dec. 8, 2008]; Retrieved from the Internet URL: http://web.archive.org/web/19961105081827/www.gigaplex.com/; 4 pages.
Akeley, "Cg—Teaching Cg," Power Point Presentation, NVIDIA Corporation, 2002; 1 page.
BabelFish.com, Inc., Oct. 2003, [online] [Retrieved on Dec. 8, 2008]; Retrieved from the Internet URL: http://web.archive.org/web/20031002115902/www.babelfish.com/en/index.html; 1 page.
International Search Report and the Written Opinion, dated Jan. 27, 2006, issued in International Application No. PCT/US2005/022579; 15 pages.
Invitation to Pay Additional Fees and Communication Relating to the Results of the Partial International Search, dated May 15, 2009, issued in Interntional Application No. PCT/US2008/050047; 11 pages.
International Search Report and Written Opinion, dated Sep. 3, 2009, issued in International Application No. PCT/US2008/050047; 17 pages.
Invitation to Pay Additional Fees and Communication Relating to the Results of the Partial International Search, dated May 8, 2009, issued in International Application PCT/US2008/050038; 19 pages.
Konfabulator, "Konfabulator & Widget Basics—A Refresher Course in Widgetology", [online] [Retrieved on Jun. 5, 2009], Retrieved from the Internet URL: http://web.archive.org/web/20050811020610/http://konfabulator.com/basics; 16 pages.
Movies.com, Jan. 2002, [online] [Retrieved on Dec. 8, 2008]; Retrieved from the Internet URL: http://www.archive.org/web/20020118102516/movies.go.com; 1 page.
Siracusa, "Mac OS X 10.4 Tiger: Dashboard", Apr. 28, 2005, [online] [Retrieved on Aug. 1, 2008] Retrieved from the Internet URL: http://arstechnica.com/reviews/os/macosx-10-4.ars/17; 7 pages.
Snippet Software, "Product Spotlight Non-browser based portal solution from Snippets Software", Corporate Portal Newsletter, Oct. 2000, vol. 1, No. 10, 3 pages.
Stardock, "Gallactica Civilization: Dread Lords—User Manual", Stardock Entertainment © 2006; 65 pages.
Stardock, "Your Edge in Software", [online] [Retrieved on May 11, 2007]; Retrieved from the Internet URL: http://www.stardock.com/media.asp?cmd=mediakits; 56 pages.
Thomas et al., "Animating Widgets in the InterViews Toolkit", Lecture Notes in Computer Science, pp. 26-44, 1995.
Van Gelder et al., "Direct Volume Rendering with Shading via Three-Dimensional Textures," Computer Science Dept., Univ. of California, Santa Cruz, CA 95064, Jul. 19, 1996; 17 pages.
VMware™, "VMware™ Workstation User's Manual, Version 3.2", 2002; cover, pp. 12-13.
Wardell, "Apple's Dashboard vs. Konfabulator vs. DesktopX", Skinning the frog, Jul. 1, 2004, [online] [Retrieved on Aug. 1, 2008]; Retrieved from the Internet URL: http://frogboy.joeuser.com/article/19800; 9 pages.
"Sidekick", [Online] [Retrieved on Oct. 12, 2009] Retrieved from the Internet at URL: http://en.widipedia.org/wiki/Sidekick; 5 pages.
International Search Report and Written Opinion, dated Oct. 16, 2009, issued in International Application No. PCT/US2008/070217.
Caceres et al., "Widget 1.0 Requirements", [Online] [Downloaded on Sep. 10, 2009]; Retrieved from the Internet at URL: http://www.w3.org/TR/2007/WD-widgets-reqs-20070705; 30 pages.
Louch et al., "Multidimensional Widgets", U.S. Appl. No. 12/612,301, filed Nov. 4, 2009.
Warren, "The Vmware Workstation 5 Handbook", Jun. 2005, Course Technology PTR, 50 pages.
Bauer, "Transparent User Modeling for a Mobile Personal Assistant," LWA 2004: Lurnen-Wissensentdecking-Adaptivitat, [Online] Oct. 6, 2004, pp. 3-8, Berlin Retrieved from the Internet: URL:http://www.dfki.de/specter/Docs/Bauer04.pdf> [retrieved on Sep. 15, 2009].
Lieberman and Selker, "Agents for the User Interface," Handbook of Agent Technology, 2003, pp. 1-21, Retrieved from the Internet, URL: http://web.media.mit.edu/{lieber/Publications/Agents_for_UI.pdf> [retrieved on Sep. 15, 2009].
eHow' VMWare, http://www.ehow.com/how_6368_minimize-window.html, "How to Minimize a Window," Jun. 2004.
Grundy, "An environment for developing adaptive, multi-device user interfaces," AUIC '03 Proceedings of the Fourth Australasian User Interface Conference on User Interfaces, 2003, vol. 18, Australian Computer Society, Inc., Darlinghurst, Australia.
Rodriguez et al., "IBM WebSphere Portal V5 A Guide for Portlet Application Development," Feb. 1, 2004, 48 pages.
Inter-Widget Messaging!, I want my widgets to work together !, Feb. 7, 2005, 4 pages.
Horvitz et al., "The Lumiere Project: Bayesian User Modeling for Inferring the Goals and Needs of Software Users," Fourteenth Conference on Uncertainty in Artificial Intelligence, Madison, WI, Jul. 1998, Morgan Kaufman Publishers, pp. 256-265.
Dashboard Widgets, Jun. 8, 2005, 2 pages.
Discovering the Dashboard, Apr. 28, 2005, 10 pages.
How-To Keeping Multiple Dashboard Widgets on the Desktop, Apr. 30, 2005, 8 pages.

Konfabulator 1.7—Now with Konspose and Unicode Support!, Jun. 25, 2004, 11 pages.
Konspose and Activation, Jun. 30, 2004, 2 pages.
Konspose Speed, Sep. 24, 2004, 3 pages.
Macworld Unveils Dashboard Widget, Aug. 30, 2005, 5 pages.
"Writing a Desk Accessory," Developer Connection, Apple Computer, Inc. Jul. 3, 1996, [online] [Retrieved on Jan. 3, 2006] Retrieved from the Internet URL: http://developer.apple.com/documentation/mac/devices/devices-16.html>, 3 pages.
Akeley, Kurt, and Hanrahan, Pat, "Real-Time Graphics Architecture," http://www.grahics.stanford.edu/courses/cs448a-01-fall, the OpenGL Graphics System, CS448 Lecture 15, Fall, 2001, pp. 1-20.
Altman, R.B., "Visual Quickstart Guide Power Point 2000/98, Applying Preset Animations," ProQuest Safari Books, Peachpit Press, May 7, 1999, 7 pages [online] Retrieved from the Internet: <URL: http://proquest.safaribooksonline.com/0201354411>.
Archive of "Objects, Images and Applets," W3C Recommendation, Feb. 10, 2003, [online] [Archived by http://archivve.org; Retrieved on Apr. 13, 2006] Retrieved from the Internet URL:http://web.archivve.org/web/20030210154019/http://www.w3.org/TR/REC-html140/struct/objects.html, 21 pages.
Cadiz, JJ et al., "Slideshow: Providing Peripheral Awareness of Important Information," Technical Report MSR-TR-2001-83, (Sep. 14, 2001), 9 pages. Microsoft Corporation, Redmond, WA.
Conner Borookshire D. et al. "Three-Dimensional Widgets" ACM 1992, 8 pages.
Elliott, Conal, "Programming Graphics Processors Functionally," Proceedings of the 2004 Haskell Workshop, Sep. 22, 2004. 11 pages.
Fried, Ina, "Developer Calls Apple's Tiger a Copycat," CNET News.com, Jun. 28, 2004 [online] Retrieved on Jul. 1, 2004] Retrieved from the Internet URL:http://zdnet.com.com/2102-1104_2-250692.html?tag=printthis, 2 pages.
Fried, Ina, "For Apple's Tiger, the Keyword is Search", CNET News.com, Jun. 28, 2004 [online] Retrieved on Jul. 1, 2004] Retrieved from the Internet URL:http://zdnet.com.com/2102-1103_2-5250346.html?tag=printthis, 2 pages.
Guber, John et al., "Dashboard vs. Konfabulator", Jun. 2004, 9 pages.
Haeberli, P. et al., "The Accumulation Buffer: Hardware Support for High-Quality Rendering," Computer Graphics, Aug. 1990, pp. 309-318, vol. 24, No. 4.
Http://en.wikipedia.org/wiki/Comparison_of_widget_engines, 2007, 6 pages.
http://en.wikipedia.org/wiki/Windows-Sidebar, 2007, 7 pages.
http://www.nat.org/dashboard/blog.php3 Dec. 2003, 31 pages.
International Search Report , PCT/US2005/008804, Jul. 27, 2005, 3 pages.
International Search Report and Writen Opinion, PCT/US2005/022152, Jul. 10, 2006, 8 pages.
International Search report, PCT/US2005/008805, Aug. 8, 2005, 3 pages.
Konfabulator, "Cupertino, Start your Photocopiers!," [online] [Retrieved on Jul. 1, 2004] Retrieved from the Internet <URL: http://www.konfabulator.com>, 1 page.
Konfabulator, "Konfabulator & Widget Basics," [online] [Retrieved on Jul. 1, 2004] Retrieved from the Internet <URL: http://www.konfabulator.com/info/basics.html>, 3 pages.
Konfabulator, "Screenshots," [online] [Retrieved on Jul. 1, 2004] Retrieved from the Internet <URL: http://www.konfabulator.com/info/screenshots.html>, 2 pages.
Konfabulator, "What is Konfabulator?," [online] [Retrieved on Jul. 1, 2004] Retrieved from the Internet <URL: http://www.konfabulator.com/info/, 3 pages.
Lammers, J.., et al., "Maya 4.5 Fundamentals: Particles,"New Riders Publishing, Jan. 14, 2003, 12 pages, [online] [retrieved on Feb. 17, 2007] Retrieved from ProQuest Safari Books Online on the Internet: <URL: http://proquest.safaribooksonline.com/0735713278>, 12 pages.
Notification of Transmittal of the International Search Report and the Written Opinion of the International Searching Authority, PCT/US2005/022579, 15 pages.
Nvidia, "CG—Teaching Cg," Power Point Presentation, Author and date unknown, pp. 1-16.
Puder, A., "Extending Desktop Applications to the Web," ACM International Conference Proceedings Series, Proceedings of the Jun. 2004 International Symposium on Information and Communication Technologies, 2004, vol. 90, 6 pages.
Rochkind, M. et al., "Common Elements in Today's Graphical User Interfaces: The Good, the Bad, and the Ugly," Interchi '93, AMC, Apr. 24-29, 1993, pp. 470-473.
Segal, Mark and Akeley, Kurt, "The OpenGL Graphics System: A Specification (Version 1.5)," Copyright 1992-2003 Silicon Graphics, Inc., Oct. 30, 2003, 334 pages.
Shantzis, Michael A., "A Model for Efficient and Flexible Image Computing," Computer Graphics Proceedings, Annual Conference Series, Orlando, Florida, Jul. 24-29, 1994, pp. 147-154.
Shiozawa, Hidekazu et al., "Perspective Layered Visualization of Collaborative Workspaces," Proceedings of the International ACM SIGGROUP conference on Supporting Group Work Publisher, Nov. 1999, 5 pages.
Snippet Software Inc. et al. "Corporate Portal Newsletter" Oct. 2000, 3 pages.
Snippet Software Inc. et al. "Snippets Software" Jun. 2001, 16 pages.
Staples, Loretta, "Representation in Virtual Space: Visual Convention in the Graphical User Interface," Proceedings of the SIGCHI Conference on Human Factors in Computing Systems, Apr. 1993. http://www.nat.org/dashboard/blog.php3 Dec. 2003, 8 pages.
Stardock.com et al. "DesktopX Whitepaper and users Guide" 1999, 72 pages.
Tang, J.C. et al., "ConNexus to Awarenex: Extending Awareness to Mobile Users," SIGCHI '01, AMC, Mar. 31-Apr. 4, 2001, 8 pages.
Ullenboom, C., "Java is auch eine Insel," 2003, [online] [Retrieved on Apr. 13, 2006] Retrieved from the Internet URL: http://www.galileocomputing.de/openbook/javainsel2//java_140000.htm#Xxx998138, 3 pages.
Van Gelder, Allen, and Kwansik, Kim, "Direct Volume Rendering with Shading via Three-Dimensional Textures," Computer Science Dept., Univ. of California, Santa Cruz, CA 95064, 9 pages.
Wardell, Brad, Konfabulator for Windows, Jan. 10, 2004; [online] Retrieved from the Internet Mar. 6, 2006] Retrieved from the Internet: URL: http://www.xpthemes.com/forums.asp?MID=19& CMID=19& AID=4472, 6 pages.
US 7,254,416, 08/2007, Kim (withdrawn)

* cited by examiner

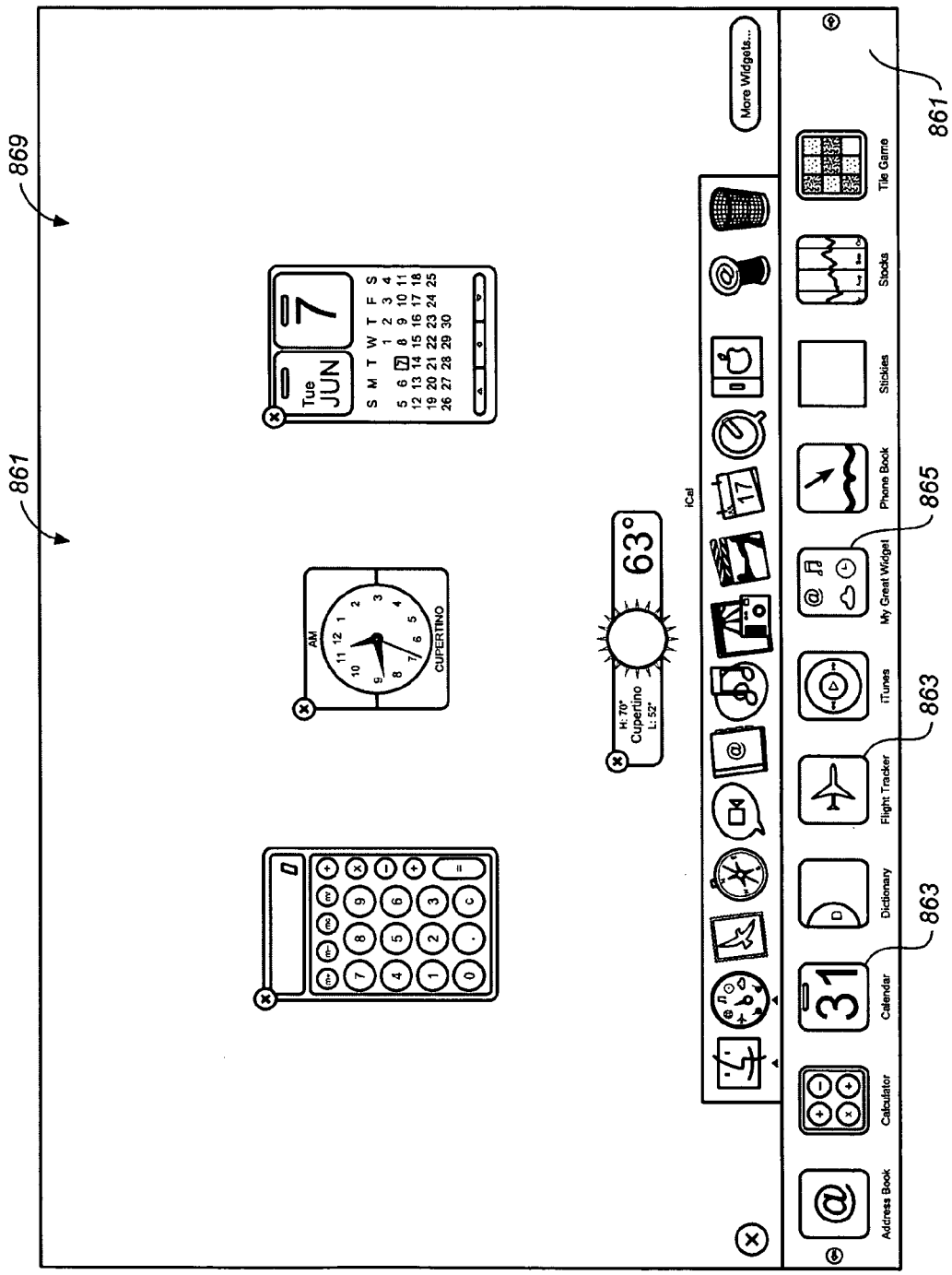

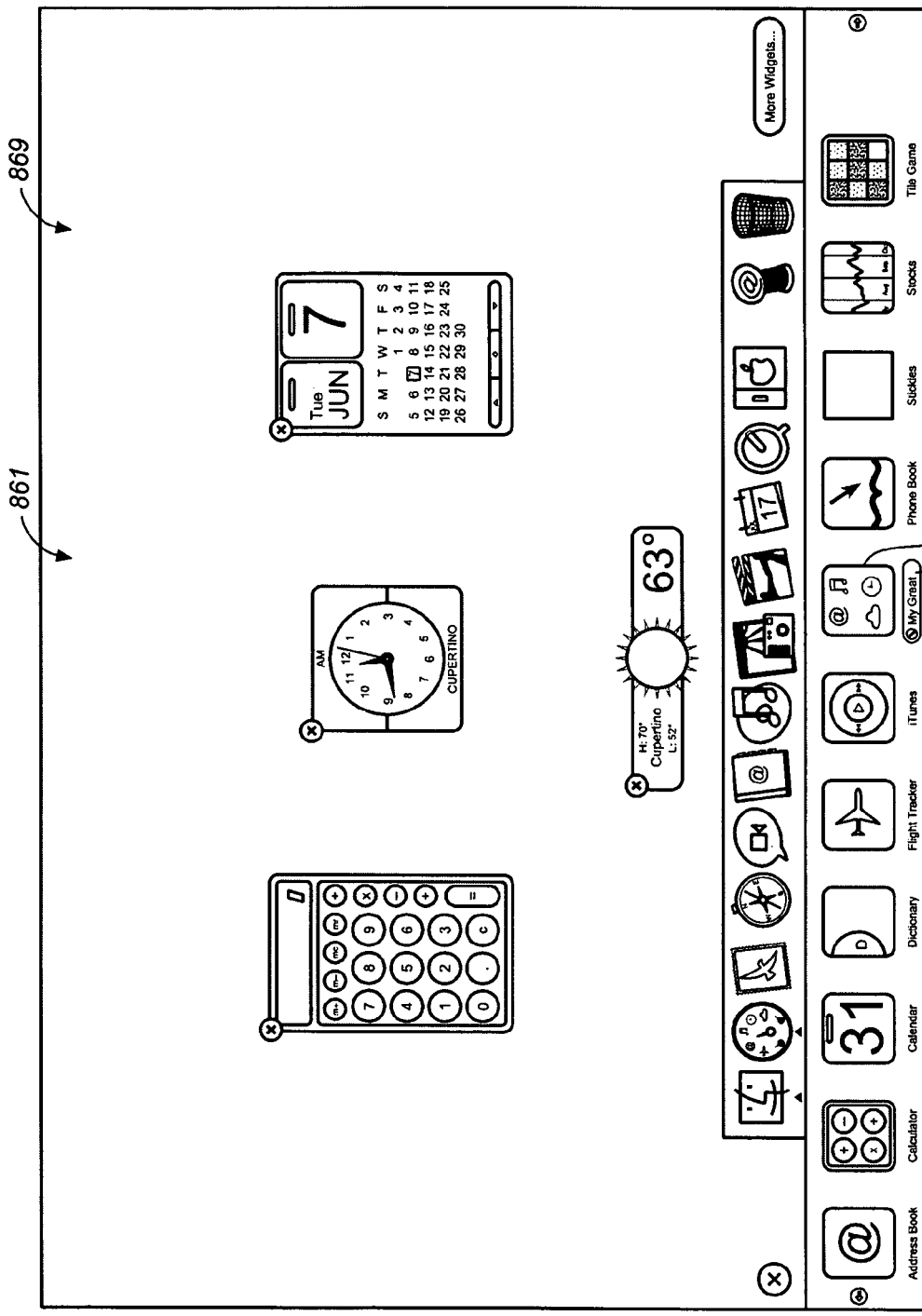

PREVIEW AND INSTALLATION OF USER INTERFACE ELEMENTS IN A DISPLAY ENVIRONMENT

CROSS-REFERENCE TO RELATED APPLICATIONS

The subject matter of the invention is generally related to the following jointly owned and co-pending patent applications, each incorporated by reference in its entirety:

U.S. Provisional patent application Ser. No. 60/583,125, for "Procedurally Expressing Graphic Objects for Web Pages," filed Jun. 25, 2004 (P3489);

U.S. Utility patent application Ser. No. 10/874,829, for "User Interface for Assisting in the Installation of an Asset," filed Jun. 22, 2004;

U.S. Utility application Ser. No. 11/145,561, for "Presenting Clips of Content", filed Jun. 3, 2005, to Scott Forstall and Imran Chaudhri;

U.S. Utility application Ser. No. 11/145,560, for "Webview Applications", filed Jun. 3, 2005, to Scott Forstall and Imran Chaudhri; and.

U.S. Utility application Ser. No. 11/145,023, for "Clipview Applications", filed Jun. 3, 2005, to Scott Forstall and Imran Chaudhri.

FIELD OF THE INVENTION

The present invention relates generally to graphical user interfaces.

BACKGROUND OF THE INVENTION

A hallmark of modern graphical user interfaces is that they allow a large number of items to be displayed on a screen at the same time. The leading personal computer operating systems, such as Apple MacOS X and Microsoft Windows XP, provide user interfaces in which a number of windows can be displayed, overlapped, resized, moved, configured, and reformatted according to the needs of the user. Taskbars, menus, and other UI elements provide mechanisms for accessing and activating windows even when they are hidden behind other windows.

Although many users appreciate the ability of such user interfaces to present such a wealth of information on the screen simultaneously, the resulting "information overload" can be somewhat overwhelming. Users often find that it is difficult to navigate to a particular UI element or window, or to even locate a desired element, among a large number of onscreen elements. The problem is further compounded when user interfaces allow users to position the on-screen elements in any desired arrangement, including overlapping, minimizing, maximizing, and the like. Such flexibility may be useful to some users but may result in chaos for other users. Having too many items on the screen simultaneously leads to information overload, and can act as an inhibiting factor in the effective use of the computer equipment.

Some user interfaces dedicate certain areas of the screen for holding certain user interface elements that are commonly used (such as a menu bar, or icons that activate commonly-used programs or files). However, such areas are generally limited in size, so as not to occupy too much valuable screen real estate that could otherwise be devoted to the main workspace area of the display screen. Although small elements, such as a digital clock element or taskbar, may be well suited for display in such dedicated screen areas, other types of elements cannot be usably presented in such a small screen area; thus they must be activated, or enlarged, before they can be used or viewed. This causes yet another level of confusion, since the items need to be activated and dismissed. Furthermore, the items may overlap or otherwise add to the number of onscreen elements that must be dealt with and organized by the user.

SUMMARY OF THE INVENTION

In one implementation, a user-activatable dashboard (also referred to as a unified interest layer) is provided. The dashboard can contain any number of user interface elements, referred to herein as "widgets," for quick access by a user. In response to a command from a user, the dashboard is invoked and the widgets are shown on the screen. In one aspect of the invention, the user can preview widgets prior to activate in the dashboard. Other management functions including installation and deletion are possible.

Widgets can be of any type. They can communicate with a remote server to provide information to the user (for example, a weather report), or they can provide commonly needed functionality (for example, a calculator), or they can act as an information repository (for example, a notepad or calendar). Some widgets can provide a combination of these types of functions. In one aspect, an application programming interface (API) is provided so as to allow third-party developers to create and distribute additional widgets that provide different types of functionality.

In one aspect a method is provided for viewing a widget in a dash board. The method includes receiving a selection of a widget to be displayed in a dashboard of a user interface and selectively displaying the widget in a preview environment prior to installing the widget and prior to displaying the widget in the display environment. Selectively displaying the widget includes determining if a preview is required, instantiating the widget in a preview environment including displaying the widget in a presentation window and supporting interaction of the widget with a user and selectively installing the widget in the display environment.

Aspects of the invention can include one or more of the following features. The receiving a selection can include launching an installer process. The selectively displaying can include receiving a user selection to preview the widget. The method can include presenting the widget in a presentation window and presenting the presentation window in an installation window. The presentation window and the installation windows can be separate processes. The method can further include managing an interaction of the presentation window and the installation window. Managing includes managing a resizing of an installation window, a repositioning of the installation window or an interaction with the presentation window which effects a display of the installation window. The method can be instantiated in a widget. Selectively installing can include launching, and displaying the widget in, the dashboard.

In another aspect, a method for viewing a user interface element in a display environment is provided. The method includes receiving a selection of a user interface element to be displayed in a display environment, and selectively displaying the user interface element in a preview environment prior to installing the user interface element and prior to displaying the interface element in the display environment. Selectively displaying the user interface element includes determining if a preview is required; instantiating the user interface element in a preview environment including displaying the user interface element in a presentation window and supporting interaction of the user interface element with a user; and selectively installing the user interface element in the display environment.

In another aspect, a preview engine for a user interface element in a user interface is provided that includes a selection engine for selecting a widget for installation in a dashboard environment; and a preview engine operative to display a user interface element in a presentation window that itself is displayed in an installation window of a user interface.

Aspects of the invention can include one or more of the following features. The user interface element can be a widget.

BRIEF DESCRIPTION OF THE DRAWINGS

The accompanying drawings illustrate several embodiments of the invention and, together with the description, serve to explain the principles of the invention.

FIG. 8F-8J are user interfaces showing the removal of a user interface element from a user interface element bar.

One skilled in the art will recognize that these Figures are merely examples of the operation of the invention according to one embodiment, and that other user interface arrangements and modes of operation can be used without departing from the essential characteristics of the invention.

DETAILED DESCRIPTION OF THE EMBODIMENTS

The present invention is now described more fully with reference to the accompanying Figures, in which several embodiments of the invention are shown. The present invention may be embodied in many different forms and should not be construed as limited to the embodiments set forth herein.

Rather these embodiments are provided so that this disclosure will be complete and will fully convey the invention to those skilled in the art.

Hardware Architecture

Figure 1:
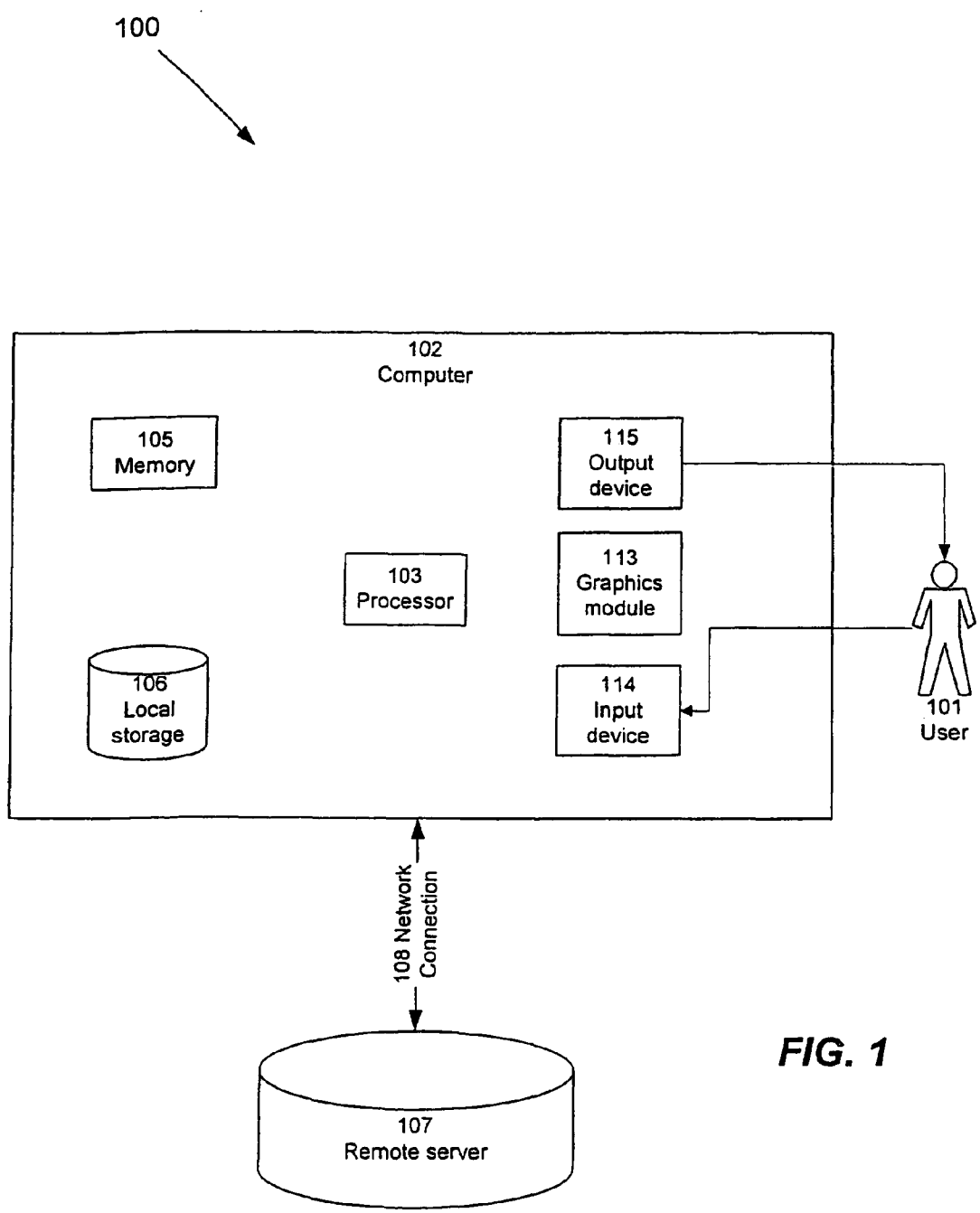
FIG. 1 is a block diagram depicting an overall architecture for implementing the present invention according to one embodiment.

In one embodiment, the present invention is implemented as part of an operating system for a personal computer. One example of an implementation of the present invention is in a Macintosh personal computer running the MacOS X operating system. Referring now to FIG. 1, there is shown an example of an architecture for a system 100 for implementing the present invention. Personal computer 102 includes processor 103, memory 105, input devices 114 such as keyboard and mouse, and output device 115 such as a display screen. A graphics module 113, such as a graphics card, may be provided for generating output for output device 115. User 101 interacts with system 100 by providing input via device 114 and viewing output via device 115. Computer 102 also includes local storage 106, such as a hard drive, and can also include network connection 108 for accessing remote server 107. These components are well-known hardware components commonly used for running software applications. In one embodiment, software embodying the invention is provided on a computer-readable medium such as local storage 106.

In another embodiment, the present invention is implemented as a plug-in that can be installed and run on personal computer 102, and that interacts with the operating system of personal computer 102 to perform the functions described herein. In yet another embodiment, the present invention is implemented as functionality in a software application running on a personal computer.

For illustrative purposes, in the following description the invention is described as a feature of an operating system; however, one skilled in the art will recognize that the techniques of the present invention can be implemented in other contexts as well, including those described above.

Method of Operation

Figure 2:
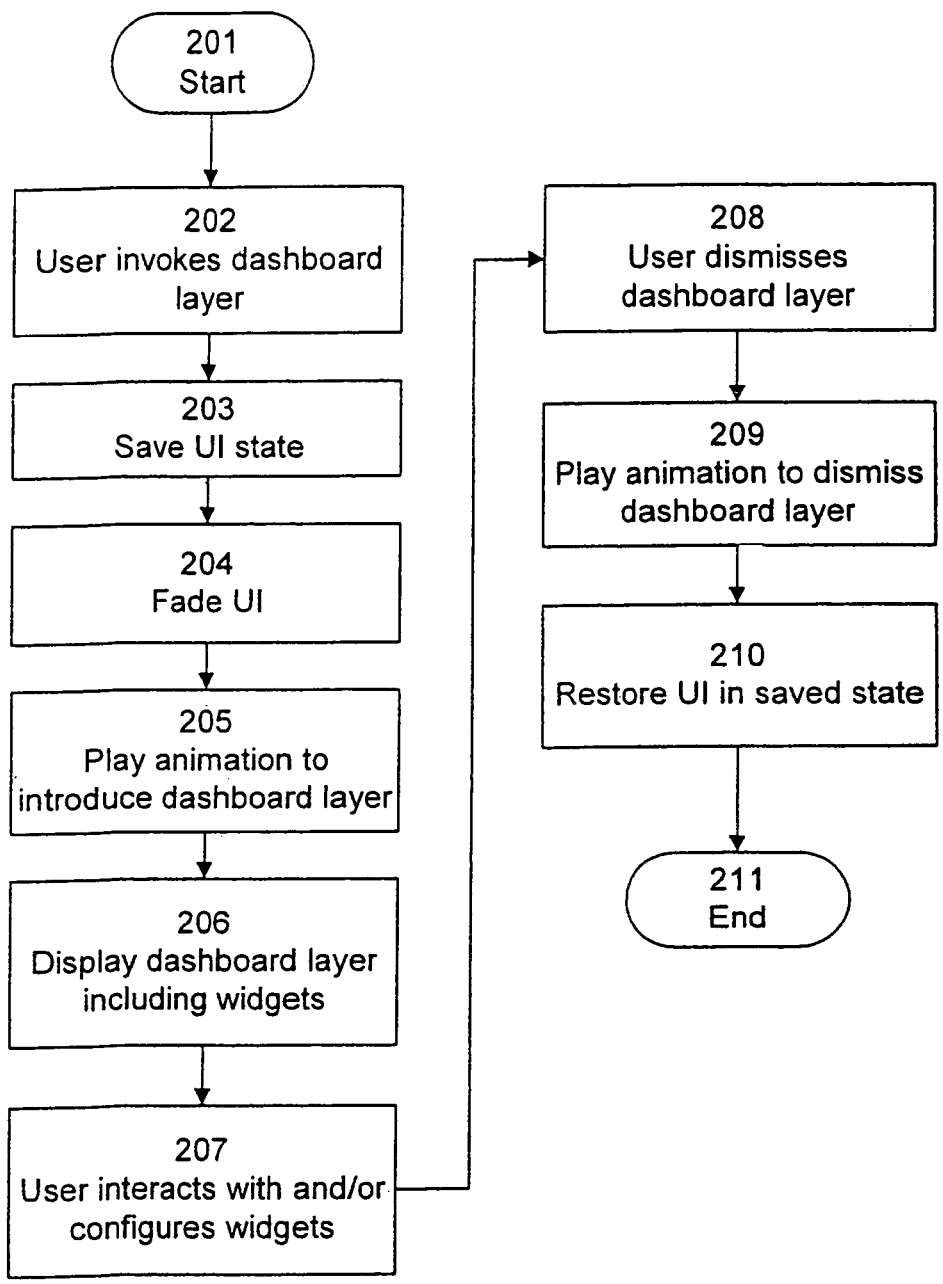
FIG. 2 is a flowchart depicting a method for activating and using a dashboard according to one embodiment of the present invention.

Referring now to FIG. 2, there is shown a flowchart depicting a method for activating and using a dashboard according to one embodiment of the present invention. In one embodiment, the user can activate the functionality of the present invention at any time, for example by hitting a designated function key or key combination, or by clicking on an icon, or by selecting a command from an onscreen menu, or by moving an onscreen cursor to a designated corner of the screen. In response to the user performing such an action 202, the current state of the user interface is saved 203, the user interface is temporarily inactivated (and/or faded 204), an animation is played 205 to introduce the dashboard, and the dashboard of the present invention is displayed 206. If applicable, a previous state of the dashboard is retrieved, so that the dashboard can be displayed in the same configuration as the last time the user saw it.

In one embodiment, the dashboard is overlaid on the existing desktop user interface; the user interface may be darkened, brightened, blurred, distorted, or otherwise altered so as to emphasize that it is temporarily inactivated. The existing desktop may be visible behind the dashboard. In another embodiment, the existing desktop is not visible while the dashboard is active. In another embodiment, the desktop is shrunk to a small portion of the screen while the dashboard is active, and can be reactivated by clicking on it. In another embodiment, the desktop is shrunk and presented as a widget similar to the widgets described herein; the desktop can be reactivated by clicking on the widget.

The dashboard (also referred to herein as a "unified interest layer") includes a number of elements, referred to herein as "widgets". These widgets generally include software accessories for performing useful, commonly needed functions. Examples of widgets include, without limitation, a calendar, a calculator, an address book, a package tracker, a weather module, and the like. In one embodiment, some widgets may interact with remote sources of information, such as servers, to provide information; for example, a weather module may retrieve live weather data from a remote server. Widgets may be interactive, so that a user performs common input operations (such as clicking a mouse or typing on a keyboard) to utilize the functionality of a widget.

The user interacts with and/or configures widgets as desired 207. In one embodiment, the user can move widgets around the screen, and can resize widgets if applicable. Some widgets may be resizable, and some may be of fixed size; the widget author may specify whether a widget can be resized. Some widgets may automatically resize themselves based on the amount or nature of the data being displayed. In one embodiment, widgets may overlap one another. In another embodiment, widgets do not overlap one another; if the user attempts to move one widget to the position occupied by another widget, one of the widgets may automatically move out of the way to make room. In one embodiment, the position, configuration, and size of widgets are saved when the dashboard is dismissed, so that the same state can be restored the next time the dashboard is invoked.

When the user wishes to dismiss 208 the dashboard and return to the normal user interface, he or she does so by invoking a dismissal command. In various embodiments, the user hits a function key or key combination (which may be the same or different than the key or combination used to activate the dashboard), or clicks on a close box or other icon, or clicks on negative space within the dashboard (in other words, a space between widgets), or moves an onscreen cursor to a predefined corner of the screen. In another embodiment, the dashboard is automatically dismissed after some predetermined period of time without any user activity, or upon some other trigger event. An animation may be played 209 to provide a transition as the dashboard is dismissed.

In one embodiment, when the dashboard is dismissed, the current configuration of the widgets is stored so that it can be retrieved the next time the dashboard is activated. In one embodiment, an animation is played to dismiss the dashboard and re-introduce the user interface. The user interface is restored 210 to its previous state, so that the user can resume normal interaction with the software applications and operating system of the computer.

In one embodiment, the dashboard is configurable. The user can select any number of widgets to be displayed, for example by dragging the widgets from a configuration bar (or other user interface element) onto a location on the dashboard. In one embodiment, the configuration bar can include different types of widgets, and can be categorized and/or hierarchically organized. In one embodiment, in response to the user dragging a widget onto the configuration bar, the widget is downloaded from a server and installed (if it is not already installed on the user's machine). In one embodiment, certain widgets may cost money, so that the user must provide a credit card or some other payment means before the widget is installed on the user's machine. In another embodiment, widgets are already installed on the user's machine, but are only made visible when they have been dragged from the configuration bar onto the dashboard. One skilled in the art will recognize that the configuration bar is merely an example of one type of user interface element for configuring the dashboard, and that other configuration mechanisms can be used without departing from the essential characteristics of the present invention.

As mentioned above, various types of animations can be used to emphasize and clarify transitions in connection with the present invention. For example, activation of the dashboard can be signaled by a "fly-in" animation, wherein the widgets move from the edge of the screen inwards to their respective positions in the dashboard. Simultaneously, the user interface can be darkened, blurred, distorted, or otherwise altered to indicate that it is temporarily inactive. Dismissal of the dashboard can be signaled by a "fly-out" animation, wherein the widgets move towards the edge of the screen and then appear to fly off the screen. Simultaneously, the user interface is restored to its normal state. In one embodiment, when the user drags a widget from the configuration bar onto the desktop, an animation such as a ripple effect can be shown, to emphasize that the widget has been placed onto the desktop in the selected location. The ripple effect distorts the background temporarily to give the impression that the widget is being placed into water. In one embodiment, the effect is implemented according to animation and distortion techniques described in detail in the related cross-referenced patent applications. In one embodiment, such animations are configurable by the user.

In one embodiment, more than one dashboard is available. For example, the user can configure one dashboard to contain widgets related to work, and another for widgets related to personal matters. Different trigger events (such as different key combinations) can be used for triggering the various dashboards; alternatively, the user can select from a pop-up menu which dashboard he or she wishes to activate. The system of the present invention stores state information for each of the dashboards. Different dashboards can contain one or more of the same widgets; state information for a widget can be maintained separately for each dashboard in which the widget appears, or it can be commonly maintained across all dashboards in which the widget appears. In addition, different dashboards can be available for different users of computer 102, so that each user can only access the dashboard(s) he or she created. A user can specify a dashboard as being available to other users, if desired. A user can also specify, for any or all of the dashboards he or she creates, whether other users are permitted to make changes to the dashboard(s).

In one embodiment, some or all widgets are associated with related, fully functional applications providing expanded versions of the functionality of the corresponding widgets. These widgets include a button, or icon, or other element, for quickly launching the associated application. When the user clicks on the button, the dashboard is dismissed, the normal desktop user interface is reactivated, and the associated application is automatically launched. For example, as will be described in more detail below, a music player widget can include a button for launching a fully functional music player application containing additional features beyond what is available in the widget.

In one embodiment, a button can be provided for accessing a website, web page, or web-based application having functionality or information related to a widget. When the user clicks on the button, the dashboard is dismissed, the normal desktop user interface is reactivated, a web browser is launched, and the web page (or the like) associated with the widget is automatically launched. For example, a stock quote widget may include a button for accessing a website that includes more detailed information on a portfolio or on a particular stock. In another embodiment, related fully functional applications, websites, web pages, or web-based applications can be accessed by other means than a button within the widget. For example, such functionality can be launched via an on-screen icon or menu, or via a keystroke or key combination.

In one embodiment, the fully functional application or related website provides context for a launched widget. For example, if the user has highlighted a word in a document before activating a dictionary widget, the dictionary widget's text field is automatically populated with the highlighted word. In one embodiment, a word search is automatically activated, and the results automatically displayed, so that activating the dictionary widget causes a definition to be displayed without any further user interaction. Similarly, if an email message is open on the user's screen when an address book widget is launched, the address book is automatically opened to a page corresponding to the contact information for the sender of the email message. In one embodiment, such prepopulation or automatic opening is not performed under certain situations, such as for example if the widget is already open to another page or entry. In one embodiment, the user can configure the operation of the widget, including whether or not such prepopulation or automatic opening occurs and under what circumstances it should occur. One skilled in the art will recognize that there are many other situations where a widget can use context information from a currently-running application or website.

In one embodiment, some or all widgets have rollover elements; these are user interface elements that appear when the onscreen cursor is moved over the widget. The rollover elements disappear when the onscreen cursor is moved so that it is no longer over the widget. In one embodiment, rollover elements only appear if the cursor is held over the widget for at least a predetermined period of time, such as half a second. An example of a rollover element is a volume ring (not shown) for music player application.

FIGS. 4 through 8A, 9 through 17D and 26 through 32 depict examples of dashboard operations in response to various user commands; these Figures illustrate various techniques and capabilities of the present invention. FIGS. 8B through 8K illustrate various techniques and capabilities for installing, previewing and managing user interface elements in a display environment.

Figure 4:
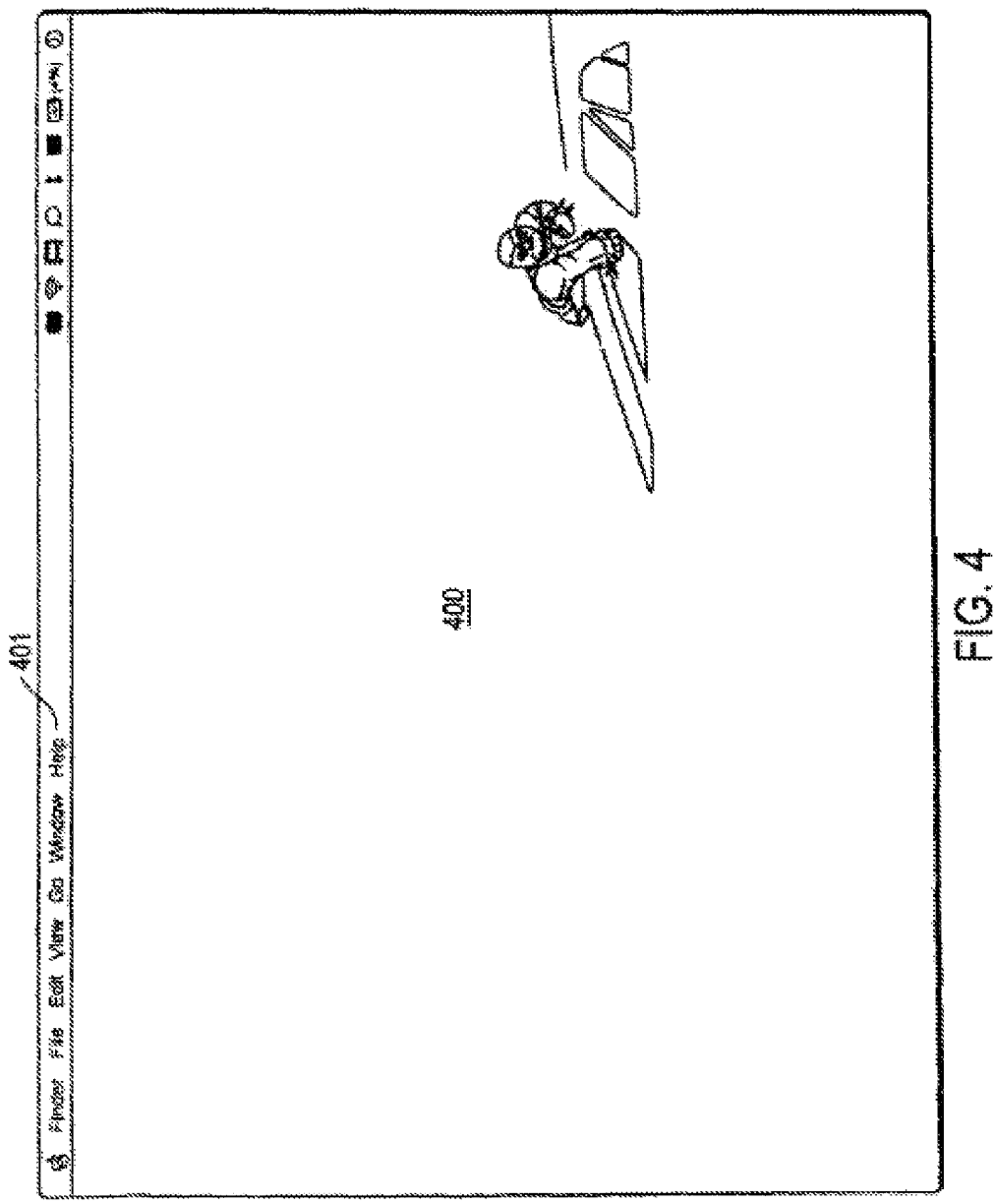
FIG. 4 is a screen shot depicting a desktop user interface prior to activation of a dashboard.

FIG. 4 depicts a desktop user interface 400 prior to activation of the dashboard. Desktop user interface 400 (referred to herein as "desktop") is a conventional user interface as may be provided by an operating system such as MacOS X. Desktop 400 has a background image, menu bar 401, and other standard features. As is known in the art, desktop 400 may also include windows, icons, and other elements (not shown).

Figure 5:
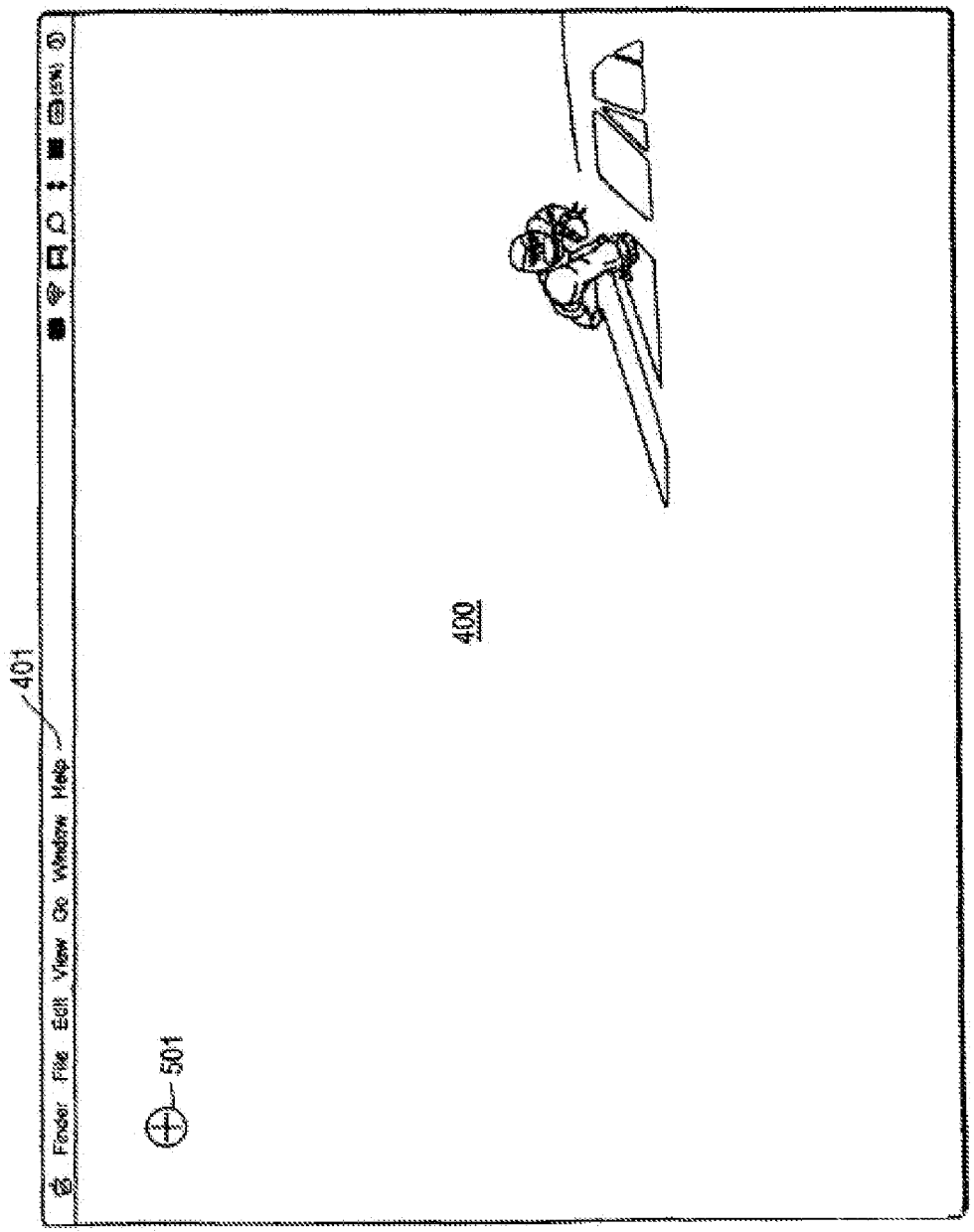
FIG. 5 is a screen shot depicting an initial state for a dashboard, according to one embodiment.

The user activates the dashboard by selecting an item from a menu, or by clicking on an icon, or by pressing a function key or key combination, or by some other means for invoking a command. FIG. 5 depicts an initial state for a dashboard, according to one embodiment. In the example of FIG. 5, a configuration icon 501 is initially displayed. Alternatively, upon activation, the dashboard can include one or more default widgets. Alternatively, if the dashboard has previously been activated and configured, the widgets are displayed as previously configured. As shown in FIG. 5, the dashboard itself is not necessarily visible as a distinct layer; rather its various components (such as widgets, icon 501, and other features) are visible. In one embodiment, these components are displayed in a transparent layer that allows desktop 400 to be seen through it. In one embodiment desktop 400 and its components are darkened (or blurred, or otherwise visually modified) while the dashboard is active, so as to emphasize that desktop 400 is temporarily inactive. The user can easily reactivate desktop 400 and dismiss the dashboard by simply clicking on an area of the screen where no dashboard element is being displayed; in one embodiment, clicking on this "negative space" causes the dashboard to be dismissed according to techniques described in more detail below. In another embodiment, other commands, key combinations, icons, or other user input is used to cause the dashboard to be dismissed. In another embodiment, desktop 400 is not visible while the dashboard is active.

In one embodiment, the user can move icon 501 to any location on the screen by dragging it, and the position of icon 501 is persistent from one invocation of the dashboard to the next.

Figure 6:
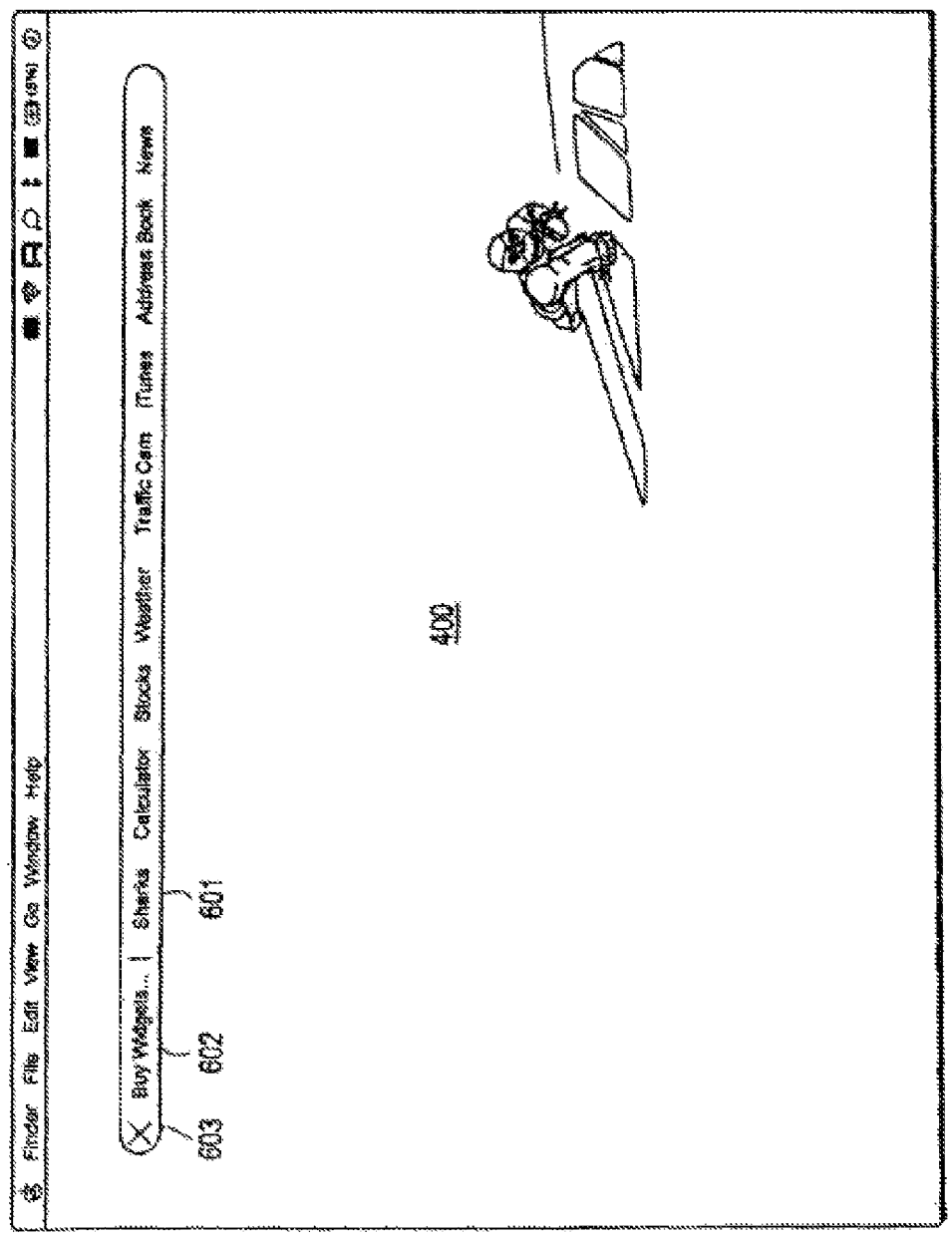
FIG. 6 is a screen shot depicting a configuration bar for a dashboard, according to one embodiment.
Figure 31:
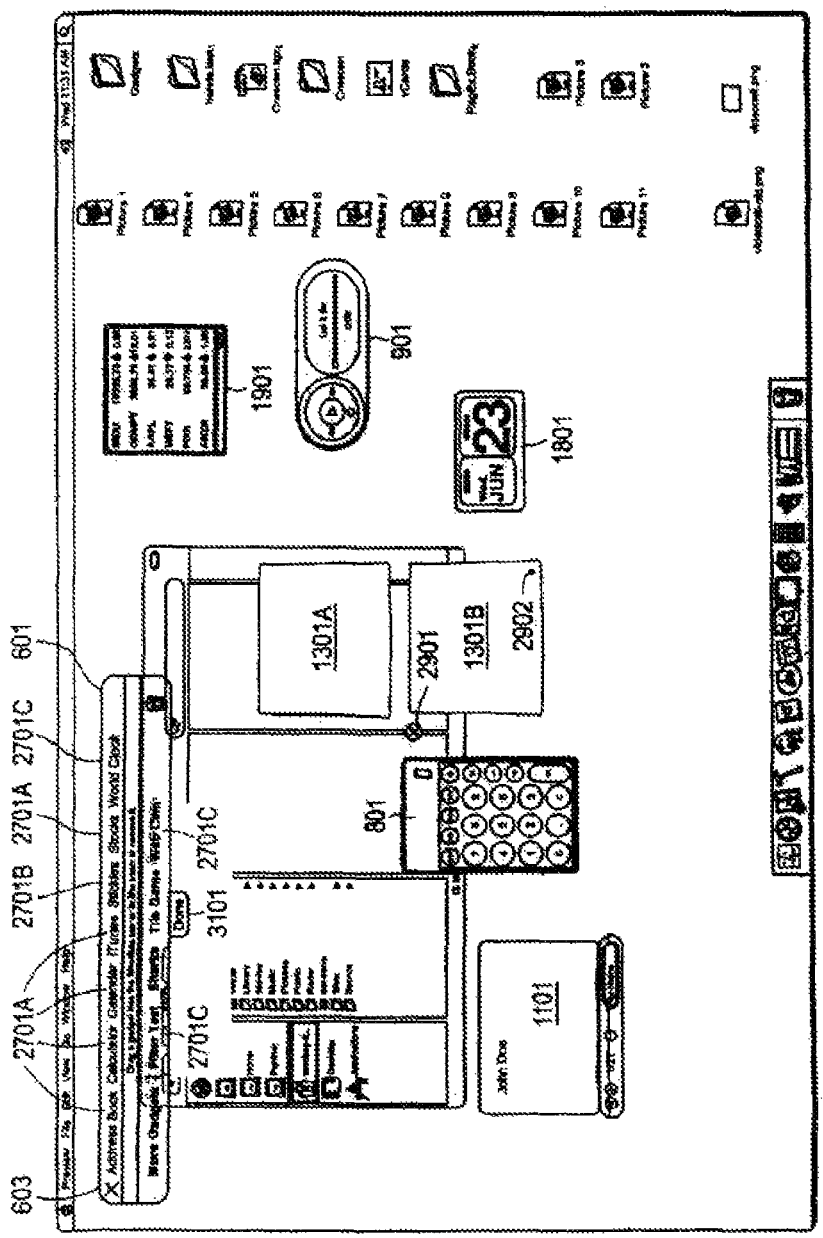
FIG. 31 is a screen shot depicting a dashboard wherein some labels in the configuration bar have changed in appearance, and wherein the dashboard includes rollover icons for closing and configuring a widget according to one embodiment.

The user clicks on icon 501 to activate configuration bar 601, as shown in FIG. 6. Configuration bar 601 provides access to various widgets that can be placed on the dashboard. In one embodiment, a text label is shown for each available widget. In another embodiment, an icon is shown for each available widget. If many widgets are available, they may be arranged hierarchically by type, or alphabetically, or by any other categorization methodology. For example, a number of categories may be displayed; clicking on one of the categories causes a pull-down menu to be displayed, listing a number of widgets in that category. In one embodiment, a buy command 602 is also available, allowing the user to select widgets from an online store or website. One skilled in the art will recognize that the particular configuration and appearance of configuration bar 601 in FIG. 6 is merely exemplary, and that many other arrangements are possible. The user can dismiss configuration bar 601 by clicking on dismissal icon 603. Referring now briefly to FIG. 31, a Done button 3101 can also be provided for dismissing configuration bar 601.

In one embodiment, the user can move configuration bar 601 to any location on the screen by dragging it, and the position of configuration bar 601 is persistent from one invocation of the dashboard to the next. Also, in one embodiment the state of configuration bar 601 (open or closed) is persistent from one invocation of the dashboard to the next.

Figure 7:
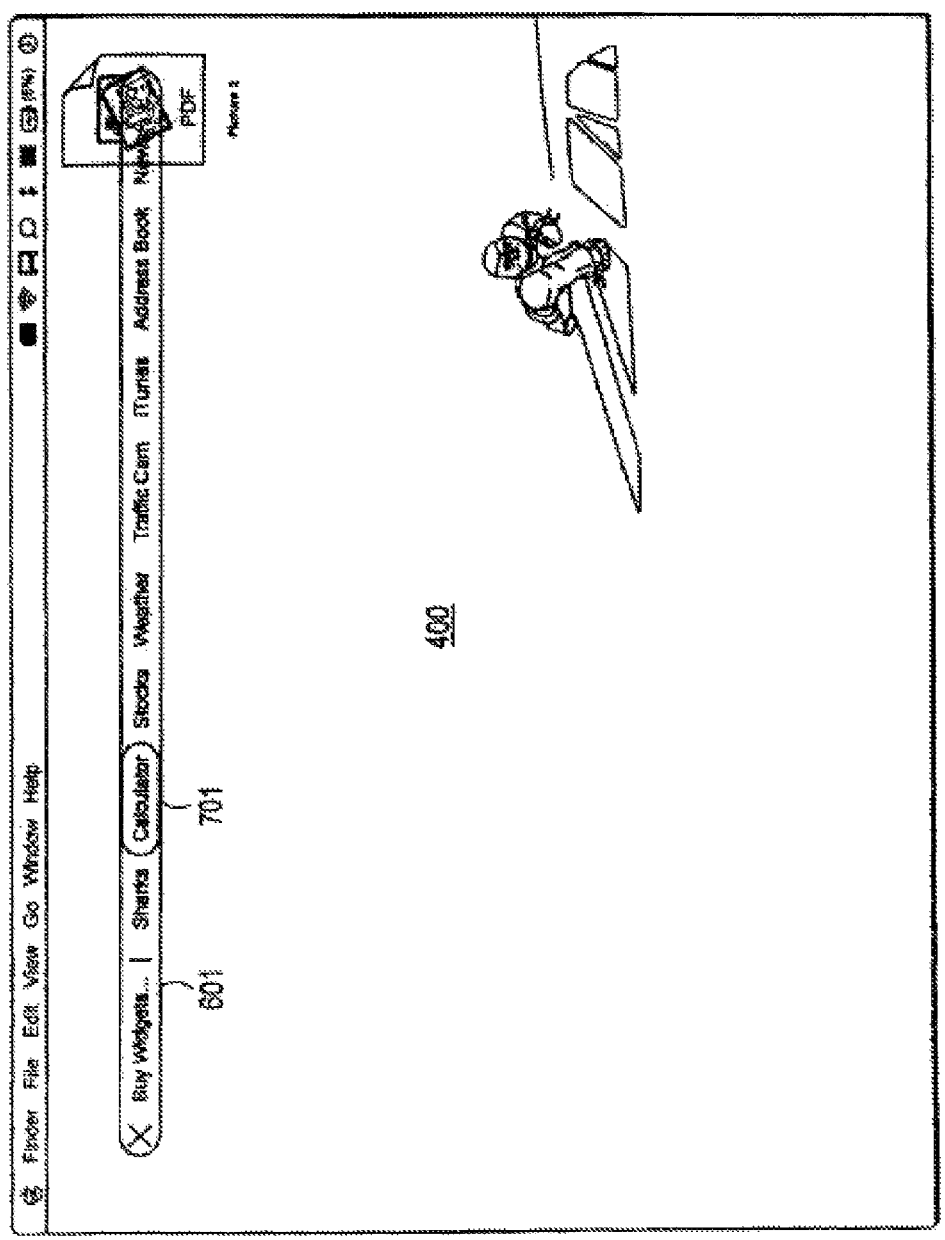
FIG. 7 is a screen shot depicting user selection of a widget from the configuration bar, according to one embodiment.

The user can drag widgets from configuration bar 601 onto the surface of the dashboard (in other words, anywhere on the screen), using standard drag-and-drop functionality for moving objects on a screen. FIG. 7 depicts user selection of a calculator widget from the configuration bar, according to one embodiment. Calculator label 701 is highlighted, to indicate that it has been selected by the user. FIG. 8 depicts the dashboard after the calculator widget 801 has been placed on the screen. In one embodiment, an animation, such as a ripple animation, is shown when the user "drops" widget 801 by releasing a mouse button (or equivalent input device) to place widget 801 at the desired location. The user can move widget 801 after it has been placed, to any other desired location, or can remove widget 801 from the screen, for example by dragging it off the screen, or dragging it back onto configuration bar 601, or by invoking a remove command. The position, state, and configuration of widget 801 are preserved when the dashboard is dismissed, so that these characteristics are restored the next time the dashboard is activated.

In one embodiment, multiple instances of some widgets can be activated, by dragging the widget from configuration bar 601 onto the dashboard surface two or more times. In another embodiment, only one instance of each widget can be activated. In another embodiment, some widgets can have multiple instances and others cannot.

Once calculator widget 801 has been placed on the dashboard, the user can interact with it by entering numbers via a mouse or other pointing device, or via a keyboard. Conventional operations for calculator applications are available.

Alternatively, widgets can be created or instantiated using an installer process. The installer process can include a separate user interface for selecting and installing widgets in a display environment. In general, the installer process is used to provide additional functionality to the creation/instantiation process, beyond the simple drag and drop operation describe above. Additional functionality can include preview and deletion functionality in a singular interface. The installer process can be a separate process or combined in another process. The installer process can itself be a separate application that is executable to install widgets in a display environment. As used herein, the term process refers to a combination of functions that can be implemented in hardware, software, firmware or the like.

Figure 8A:
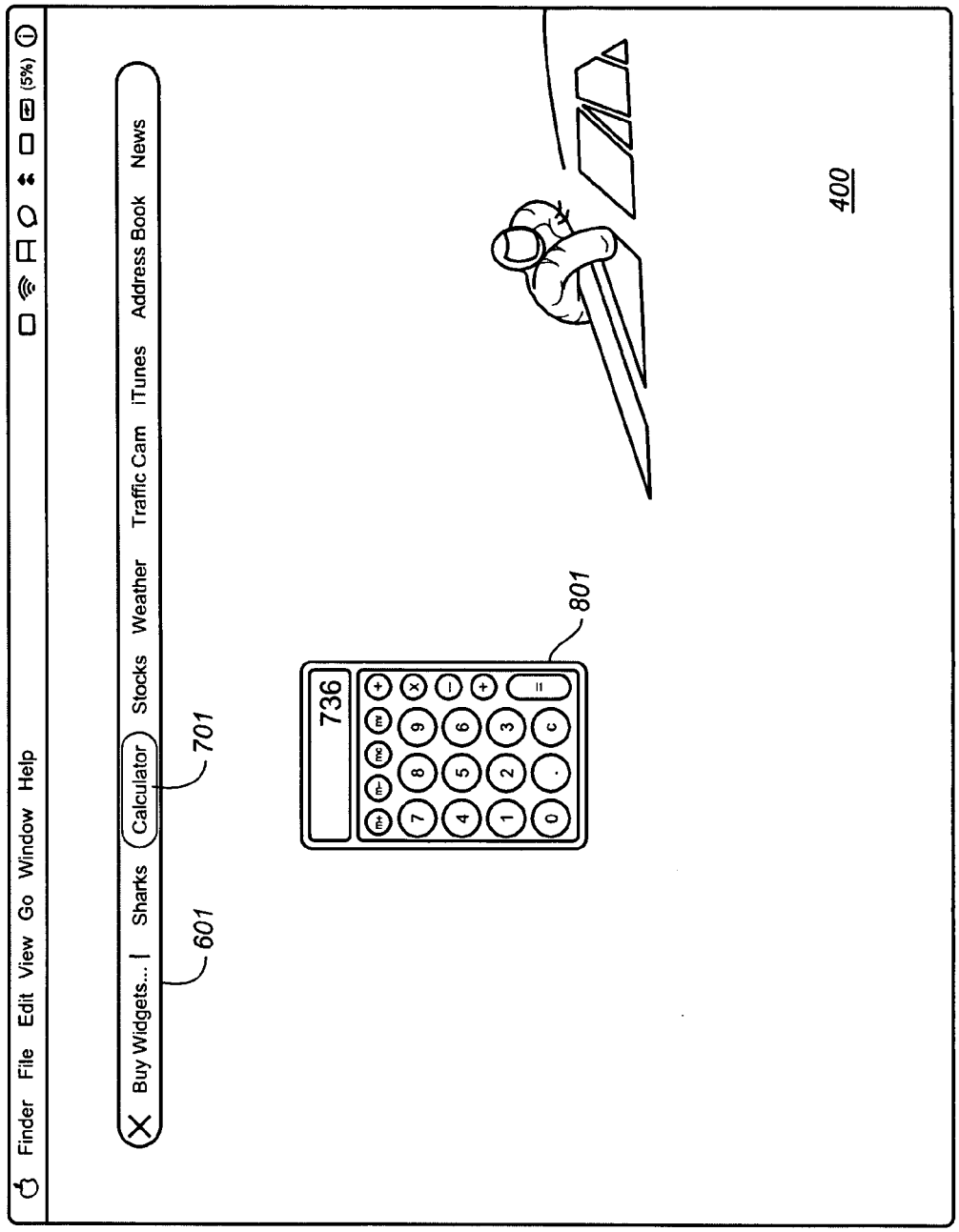
FIG. 8A is a screen shot depicting a dashboard including a calculator widget, according to one embodiment.
Figure 8B:
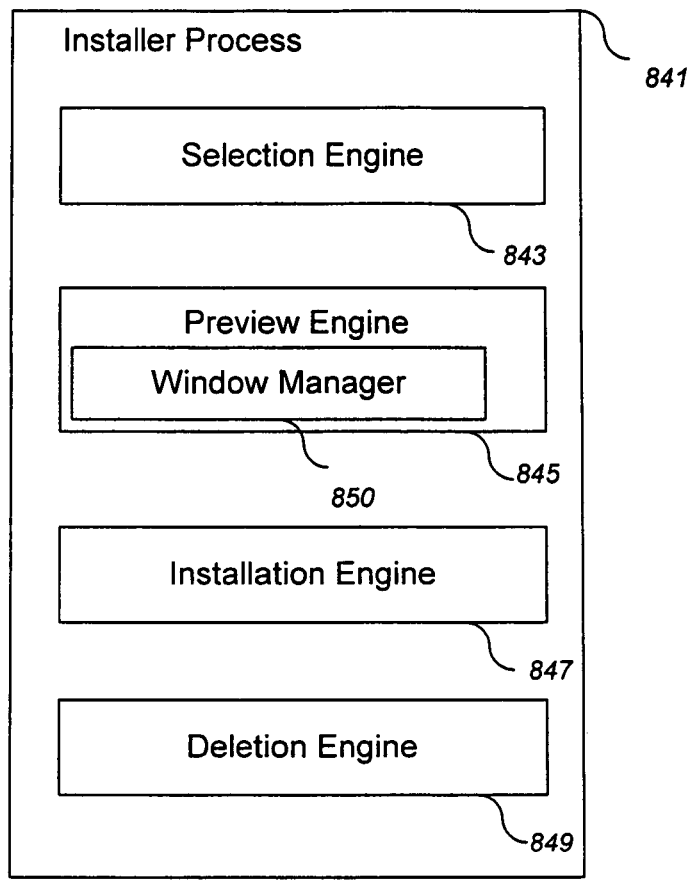
FIG. 8B is a block diagram of an installer process.

Referring now to FIG. 8b, an installer process 841 includes a plurality of functional engines for installing widgets in a display environment including a selection engine 843, a preview engine 845, an installation engine 847, and a deletion engine 849.

Figure 8C:
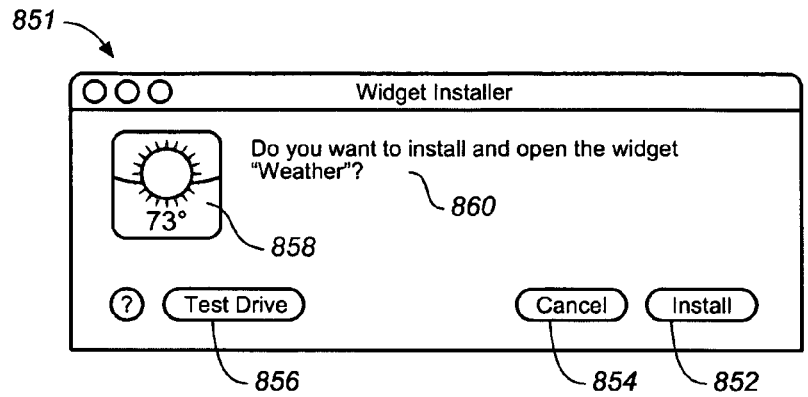
FIG. 8C is a user interface showing an installation window.

The selection engine 843 is used to select and present (e.g., a static presentation) a widget for installation. The selection engine 843 can be invoked in a display environment and can produce an installation window (e.g., a dialog), that acknowledges the users initiation of the installer process. The installation window can include a presentation of a selected widget (or a reference thereto as described below), along with various buttons that may be activated by the user or otherwise to invoke functionality in the installer process. A screen shot showing an installation window 851 in a user interface is shown in FIG. 8c. Installation window 851 can include one or more interactive features (e.g., buttons) that allow a user to install (e.g., install button 852), preview (e.g., preview button 856), or cancel the operation (e.g., cancel button 854). Preview is discussed in greater detail below. Further, installation window 851 can include the reference 858 and prompt 860 as discussed in further detail below.

Figure 8D:
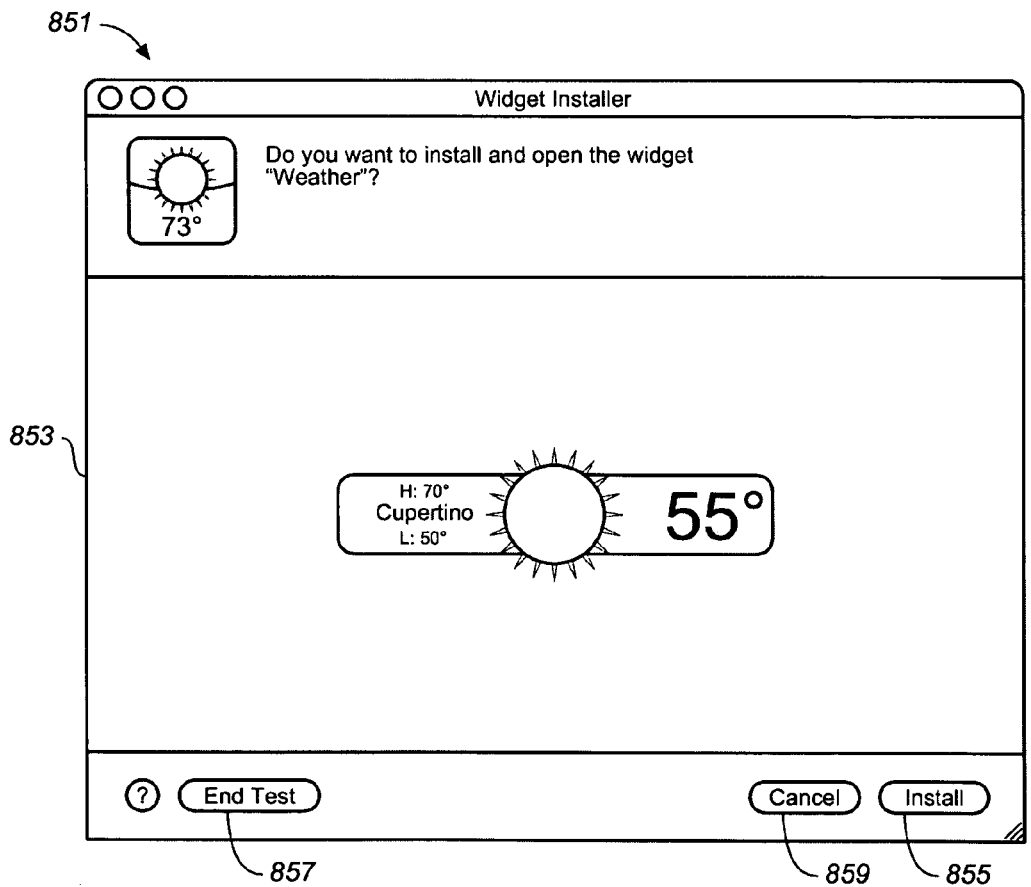
FIG. 8D. is a user interface showing an installation window with an included presentation window.

The preview engine 845 is used to preview (e.g., dynamically) a widget that has been selected to be installed. The preview engine 845, when invoked, provides a window (hereinafter "the presentation window" or specifically a "widget window" when used to display a widget) into which the selected widget can be displayed. In one implementation, the presentation window is a separate process and embedded within an underlying installer window (i.e., the installation window) which, in one implementation, is itself a separate process. In one implementation, the preview engine 845 provides a presentation of a fully functional widget in the presentation window. Fully functional refers to both the presentation of the widget in terms of size, shape, content and the like along with any supported interactivity features. Interactivity can include the separate refreshing of content in the presentation window. Alternatively, the content can be static, and only present ornamental properties. An example of an installation window 851 including presentation window 853 is shown in FIG. 8d.

When displaying a fully interactive widget in the presentation window, user input can be accepted that will result in changes in the presentation. For example, if the widget includes a URL that may be linked to, interaction can include the generation of an underlying page request and the presentation of the requested page in the presentation window. Interaction with user interface elements is described in "Application Clipper," incorporated by reference above. In the user interface shown in association with FIG. 8l, the presentation window has been update to include changed content (e.g., the weather widget has been interacted with to reflect a change in the presentation) as a result of user interaction.

In one implementation, a window manager 850 is associated with the preview engine 845. The window manager 850 can be a separate process that is used to support the interaction between the presentation window and the installation window described above. In one implementation, the logic associated with the window manager can be implemented in a same or separate process from the installer process or the preview process. In one implementation, the window manager 850 controls the interaction of the respective windows. Specifically, three separate interactions can be controlled. First, in one implementation, each window is a separate process displayed and brought forward (in a window hierarchy) together. The bringing together of the two distinct windows, each associated with separate processes can be controlled by the window manager 850.

Second, in one implementation, the presentation window and the installation window are required to interact with each other in predefined ways. For example, the presentation window and the installation window need not only to be brought forward together, they must also be controlled when interactions are required for the windows once displayed. For example, if one window is moved, i.e., using a drag and drop operation, the two windows are managed so that the presentation remains unified (i.e., the presentation window is maintained within the installation window, though the installation window itself was the process that received the user interaction to move). To accomplish such, window manager 850 provides an interface between the windows to allow for the receipt of input in one process and the translation to the other process.

Third, in one implementation the windows must be maintained within operating constraints of each underlying process. For example, when one window is resized (i.e., the installation window is resized), the window manager 850 controls the relative presentation of the other window (continuing this example, when the owner window is resized, the presentation window is repositioned to be centrally displayed in the owner window). Note, this third level of management includes management of process constraints. Process constraints include limitations on the changes that can be performed within the context of the installer process for either of the windows. For example, a minimum size constraint can be associated with the underlying presentation window, such that resizing of the associated installation window can be constrained to not be so small as to be unable to present the minimum sized presentation window in the newly downsized installation window.

The preview engine 845 is responsive to an initiation signal/action and provides the display of the selected widget in a presentation window as described above. Associated with the presentation window can be one or more interactive features (e.g., buttons) that allow a user to continue in the installation process (e.g., a continue or install button 855), cancel the preview (e.g., end test button 857, causing the presentation process to terminate and return control to the prior operative environment (i.e., return to the initiating point, for example, reinitiating the selection process)), or cancel the operation (e.g., cancel button 859).

In one implementation, the installer process does not include or allow for the selective bypassing of the preview presentation (i.e., bypass preview or does not include the preview engine 845). In one implementation, the preview engine 845 is itself a separate process or application (i.e., can be separate from the installer process 841). In one implementation, the preview engine 845 is itself a user interface element (i.e., a previewer widget) that can be used to preview widgets prior to installation, deployment, instantiation, or the like.

The installation engine 847 is operative to install/instantiate the selected widget in the display environment. The installation engine 847 can copy or move as required the selected widget to an appropriate volume and store the data structures (including preference data, identification data, scripts, navigation data and the like) for use in the display environment. In one implementation, the installation engine 847 includes an automatic invocation of the underlying display environment with the installed user interface element presented (i.e., the installation engine 847 installs the widget in, and opens up, a dashboard including the installed widget).

The deletion engine 849 provides control for widgets after installation. The deletion engine 849 can be a separate process from the installer process 841, or included therein. The deletion engine 849 can receive input and display user interface elements (dialogs and the like) to ensure that deletion operations are effectuated as required. The deletion engine 849 can be responsive to the selection of a user interface element, a portion of the element, controls associated with the element and the like. In one implementation, the deletion engine 849 receives mouse over input and displays a graphical element associated with a given identified element. The graphical element can include a control that allows for the activation of the deletion engine. The activation can cause the display of a window (e.g., a confirmation window) to ensure appropriate behavior. Deletion methods and example user interface elements associated therewith are discussed below in greater detail with reference to FIGS. 8f-8j.

In one implementation, the installer process 841 is part of a separate process that is not associated with a dashboard. Alternatively the installer process 841 can be part of a dashboard application and be activated, by for example, by selecting a widget for addition to the dashboard. Selection can include for example double clicking on a widget displayed in a configuration bar 601 (shown in FIG. 8a). Other installation tools are possible. For example a widget bar (not shown) can be used to display the widgets that are available for installation in a given display environment. The widget bar can be part of an authoring application for the creation of widgets, or be selectively activatable. Alternatively, the installer process 841 can be separately called, with the destination of the widget being defined as part of the application (e.g., into a dashboard environment, a desktop environment, an electronic display device environment, or the like).

Dashboard Environment

In a dashboard environment, installer process 841 can include a widget bar and an associated installer process. The installer process when invoked can cause the display of the widget bar in the user interface. In one implementation, the dashboard itself, as currently configured can also be displayed when the installer process is invoked. The installer process can then be invoked to select available widgets for installation from the widget bar, preview widgets, or remove installed widgets (i.e., remove widgets from the widget bar) depending on the configuration of the installer process.

Desktop Environment

In a desktop environment, installer process 841 can be of the form of an installer application that can be invoked (automatically, by the user, by the operating system, by an application or other invocation tool) to present user interface elements that are available to be installed in the desktop environment. The installer application can include a user interface element bar and an associated installer process. The installer process when invoked can cause the display of the user interface element bar in the user interface. The installer process can then be invoked to select available user interface elements for installation from the user interface elements bar, preview user interface elements, or remove installed user interface elements (i.e., remove user interface elements from the user interface elements bar) depending on the configuration of the installer process.

Figure 8E:
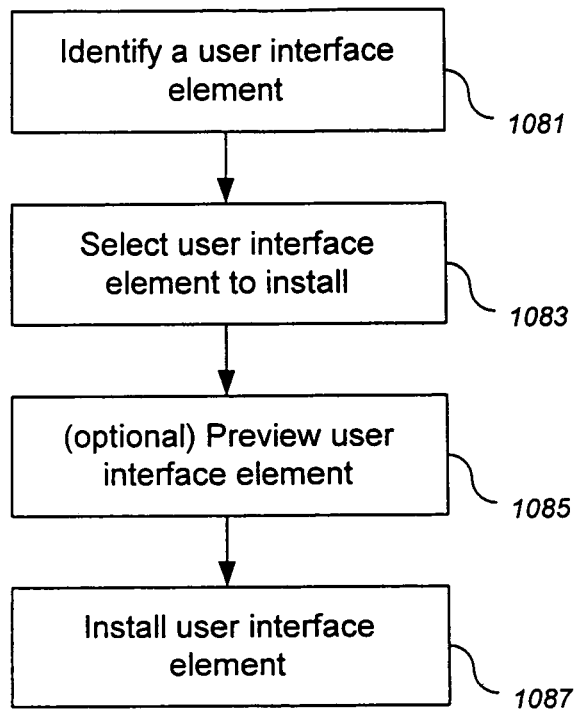
FIG. 8E is a method for installing a user interface element in a display environment.
Figure 8H:
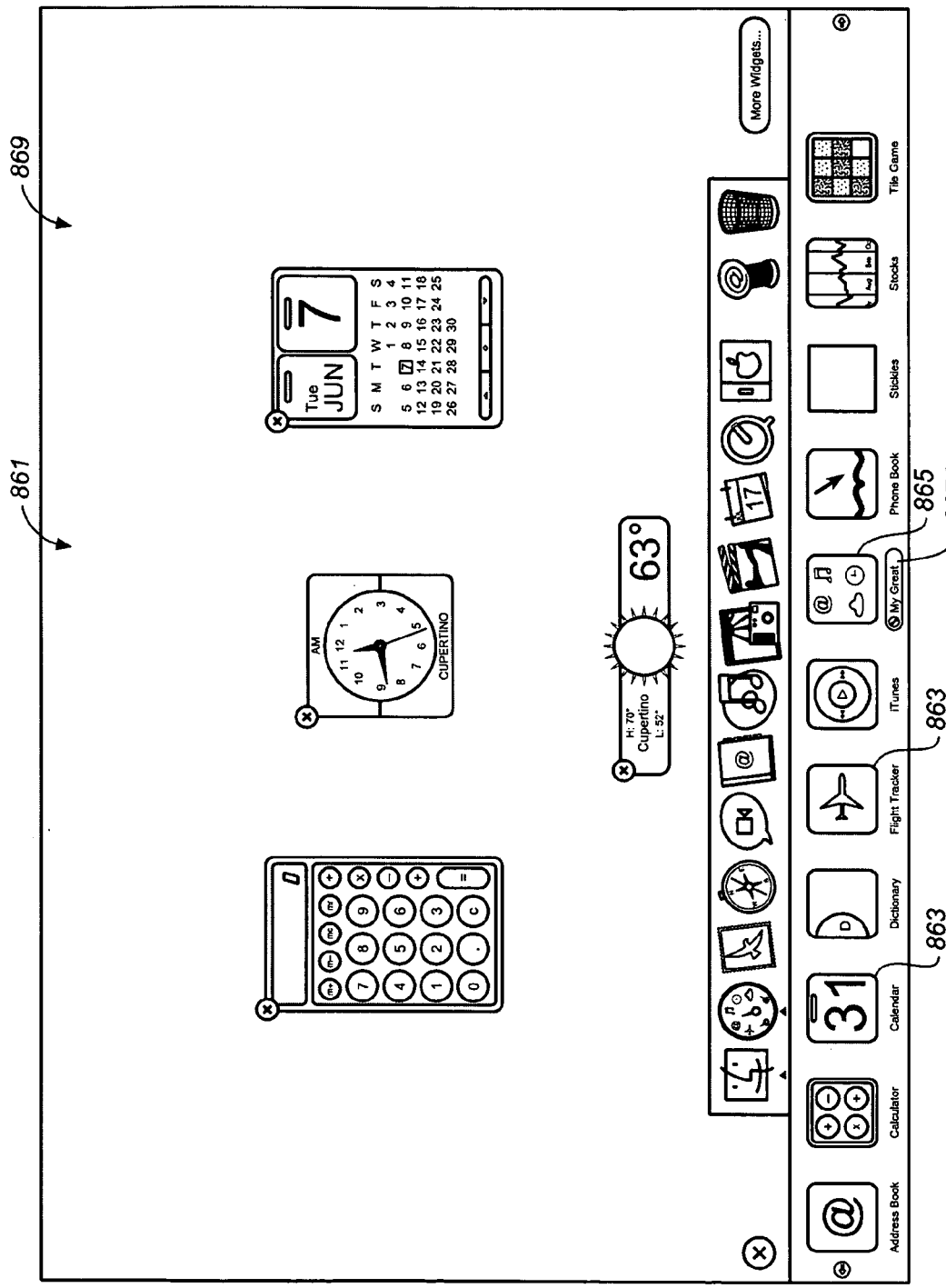

Referring now to FIG. 8e, a method is described for installing a user interface element (e.g., a widget) in a display environment. The method includes identifying a user interface element 1081. Identifying the user interface element can include locating a widget. Locating can include using a search tool or the like to locate widgets available for installation. Alternatively, other methods can be used for identifying user interface elements for installation including automatic and user controlled identification methods.

After identification, the identified user interface element is selected for installation 1083. Selecting a user interface element can include selecting a user interface element from a configuration bar, a widget bar, a tool bar, a menu, an authoring application, or other source. Alternatively, selecting can include dragging or dropping the user interface element onto the display environment, downloading the user interface element from a content source or other source, or other selection process. Selecting can include launching an associated installation process for installing the user interface element, a preview application for previewing the user interface element prior to installation or other authoring application. The launching of the applications can be automatic or user or otherwise selectively controlled.

Upon receipt of the selection, an installation window is presented. In one implementation, the installation window includes a user interface display portion, a prompt, and one or more interactivity elements.

The installation window can include a reference, partial display, or complete (e.g., complete but for the ability to interact, a static display) display of the user interface element that has been selected. The reference can be a complete reference, a pointer, a designator, a still image, or otherwise that identifies the candidate user interface element for installation. In this way, the user is able to recognize that the selection made corresponds to content (e.g., a widget) that the user desires to install.

The prompt can be of the form of a confirmation to the user of the underlying action. In one implementation the prompt can be used to confirm a desire to install a named widget. In other implementations, the prompt can be used to confirm not only the named widget, but the display environment into which the widget will be installed (e.g., "Install named widget #1 on my desktop?").

The interactivity elements can be of the form of buttons or the like. In one implementation, the installation window includes three interactivity elements including a preview element (e.g., test drive button), a cancel element (e.g., a cancel button), and an installation element (e.g., an installation button). Other interactivity elements are possible, including those that link to other associated applications, content sources (e.g., to allow for the selection of a different widget for installation), and the like. A screen shot showing an installation window 851 in a user interface is shown in FIG. 8c. Installation window 851 can include one or more interactive features (e.g., buttons) that allow a user to install (e.g., install button 852), preview (e.g., preview button 856), or cancel the operation (e.g., cancel button 854). Installation window 851 also includes a reference 858 (i.e., a reference to the user interface element being installed, here a static image and text description of the widget to be installed) and prompt 860 ("Do you want to install the weather widget?") as discussed above.

Continuing with the method, if a preview option is selected (optional), then a preview of the widget in a preview environment is created and presented 1085. The creation of the preview environment can include the invocation of a window management engine (e.g., window manager 850) for managing the interaction of plural windows that make up the preview. In one implementation, the preview includes a presentation window that is a separate process. The presentation window is used to display an instantiation of the selected widget. In one implementation, the display of the presentation window includes an instantiation of the selected widget in a selectably interactive environment. An example of a preview is shown in FIG. 8D. Associated with the preview process may be an authoring or selection process. For example, if the preview displayed is not satisfactory to a user, an interactivity element can be presented in the user interface to allow the direct launching of another process (e.g., a search process or application, an authoring application, a selection application or other process or application so that a more appropriate/desirable user interface element can be located/installed) with or without terminating the installation process.

Finally, the user interface element can be installed 1087. The installation of the user interface element can include the installation on a tool bar (e.g., a widget bar), in a resource, or in a display environment (e.g., directly on a dashboard or the desktop). Installation can include the saving of the underlying content metadata including data structures defining the user interface element in a library or the like. Alternatively, the installation can be part of an underlying application (e.g., directly in an associated dashboard application or a library associated therewith). The process steps described can be performed in other orders, repeated or the like to provide desired results. For example, the preview process can be repeated in association with the selection of multiple different user interface elements prior to invoking the installation step.

Once installed, user interface elements can be removed/deleted from the display environment as required. In one implementation, a separate deletion process is provided from the installation process. Alternatively, the installer process can be invoked to remove/delete user interface elements as required.

Referring now to FIGS. 8f-8j, a series of screen shots is presented with reference to one implementation of a deletion process. Deletion can include removing of the user interface element from a given display environment, removal from a tool bar, or other context. In one implementation, the deletion engine can be invoked as part of a clean-up operation associated with a tool bar (e.g., a widget bar). The user interface shown in FIG. 8f includes a tool bar (e.g., widget bar 861) including a plurality of user interface elements (e.g., widgets 863) including one or more particular user interface elements that are desired to be deleted (e.g., "my great widget 865"). The user interface as shown includes a display environment (e.g., a dashboard 861), which, in the implementation shown, is overlaid over a desktop 869.

Figure 8I:
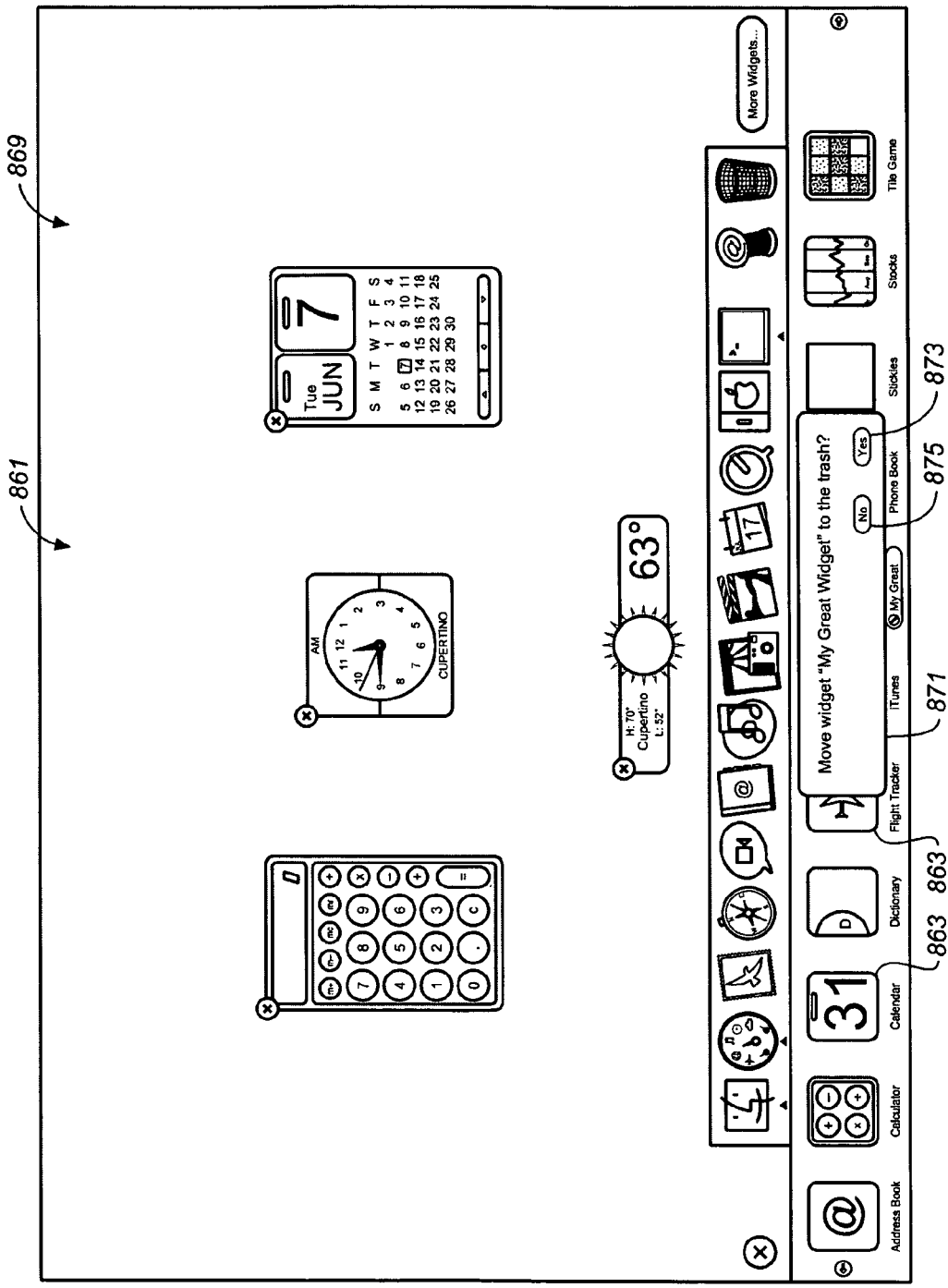
Figure 8J:
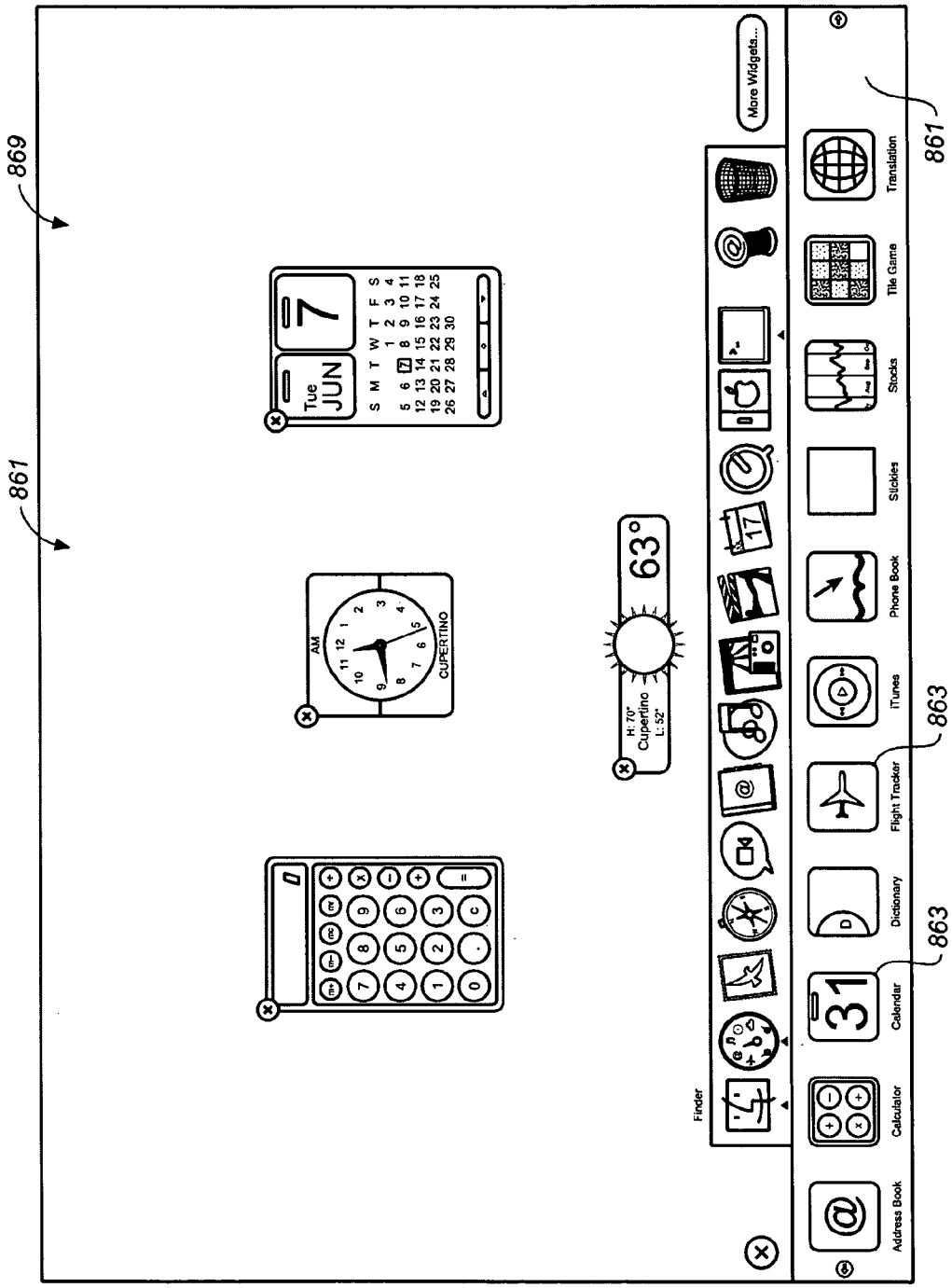
Figure 8K:
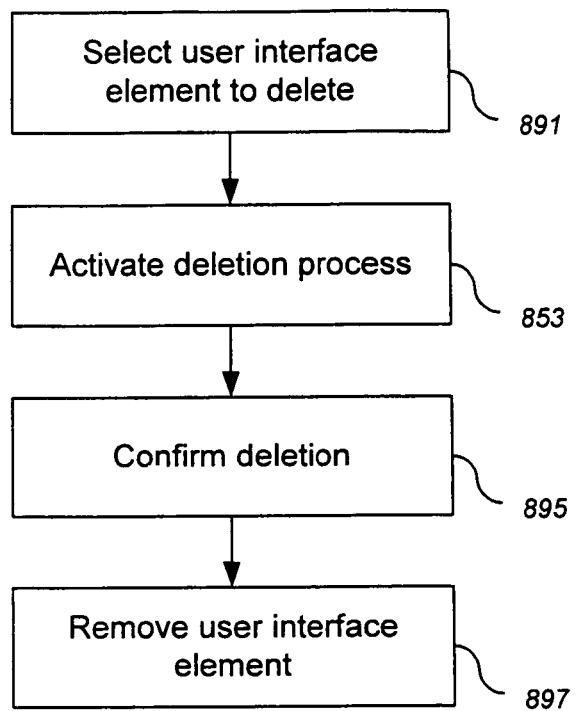
FIG. 8*k* is a method for removing a user interface element.
Figure 8L:
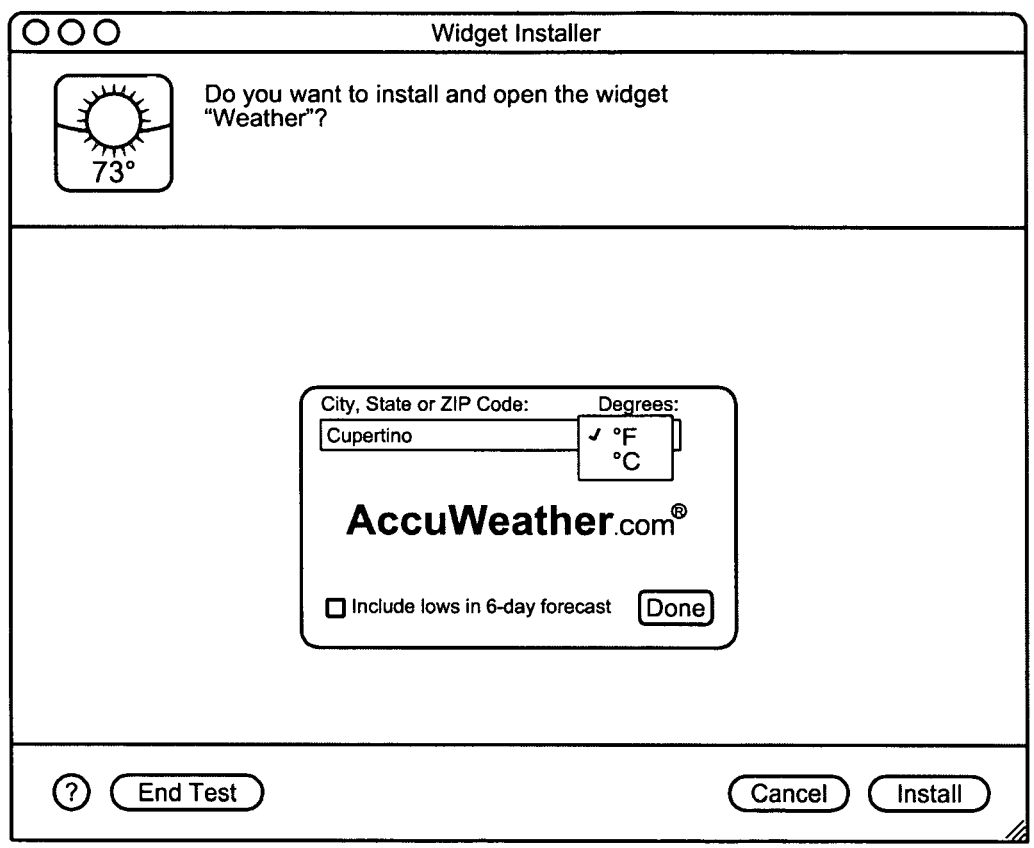
FIG. 8*l* is a user interface showing an installation window after a interaction with the user interface element presented in the presentation window.

A method for deleting a user interface element from a tool bar is provided that includes selecting the user interface element to be deleted as is described with reference to FIG. 8k. A user interface element is selected for deletion 891. In one implementation, the user interface element can be a widget that is part of a widget bar (e.g., widget bar 861). The selection of the user interface element can include a mouse over event. In one implementation, when a mouse over event is detected a control is presented. Referring to FIGS. 8f-8g, user interface element "my great widget" 865 can be selected for removal, including mousing over the element (pre-mouse over shown in FIG. 8*f*) and a control 867 is displayed (e.g., Stop Sign near text description in FIG. 8*g*).

Continuing with the removal process, a deletion process is activated 893. In one implementation, the activation of the deletion process can be initiated by the selection of a control. In one implementation, with reference to FIGS. 8*g*, 8*h*, and 8*i*, a control (e.g., control 867 of FIG. 8*g*) can be used to activate the deletion process by, for example, a mouse over (producing the activated control 867A shown in FIG. 8*h*), resulting in the display of a confirmation dialog as discussed below.

Continuing with the removal process, a confirmation is optionally required to execute the removal 895. The confirmation can take the form of a confirmation dialog (e.g., dialog 871 as shown in FIG. 8*i*). The confirmation can include interactive elements that allow for receipt of user or other input to confirm the desired operation (e.g., yes and no buttons 873 and 875 shown in FIG. 8*i*). Finally, and with confirmation as required, the user interface element can be removed 897. In the implementation shown in FIG. 8*j*, the user interface element (user interface element 865 of FIG. 8*i*) has been removed from the user interface bar (e.g., widget bar 861). In one implementation, animation techniques can be used when installing (adding) or deleting (removal) of user interface elements from a display environment. For example, in one implementation, an animation is used to fade a removed item while sliding remaining items (e.g., sliding from the left or right, top or bottom, on a user interface bar) to effectuate a removal of a user interface element. Other animation effects can be used. In one implementation, the deletion process is instantiated in a widget.

Figure 9:
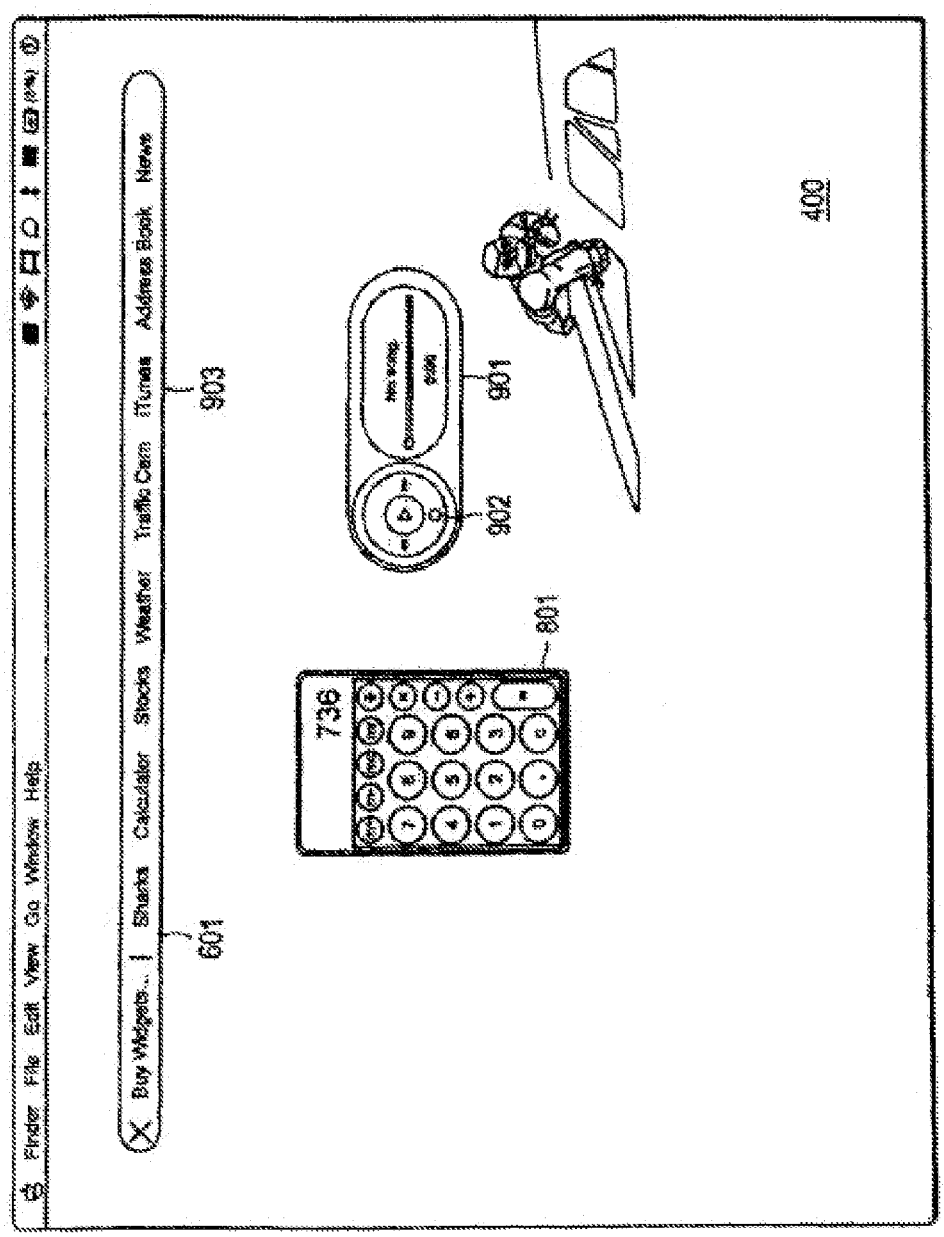
FIG. 9 is a screen shot depicting a dashboard including a calculator widget and a music player widget, according to one embodiment.

FIG. 9 depicts the screen after the user has dragged both a calculator widget 801 and a music player widget 901 onto the dashboard, according to one embodiment. Music player widget 901 is placed by clicking and dragging from "iTunes" label 903 in configuration bar 601. Music player widget 901, in this embodiment, provides a subset of the functionality associated with a fully functional music player application. In one embodiment, music player widget 901 includes button 902 for activating a fully functional music player application. Thus, the user can easily launch an application that provides enhanced functionality with respect to a widget.

Figure 10:
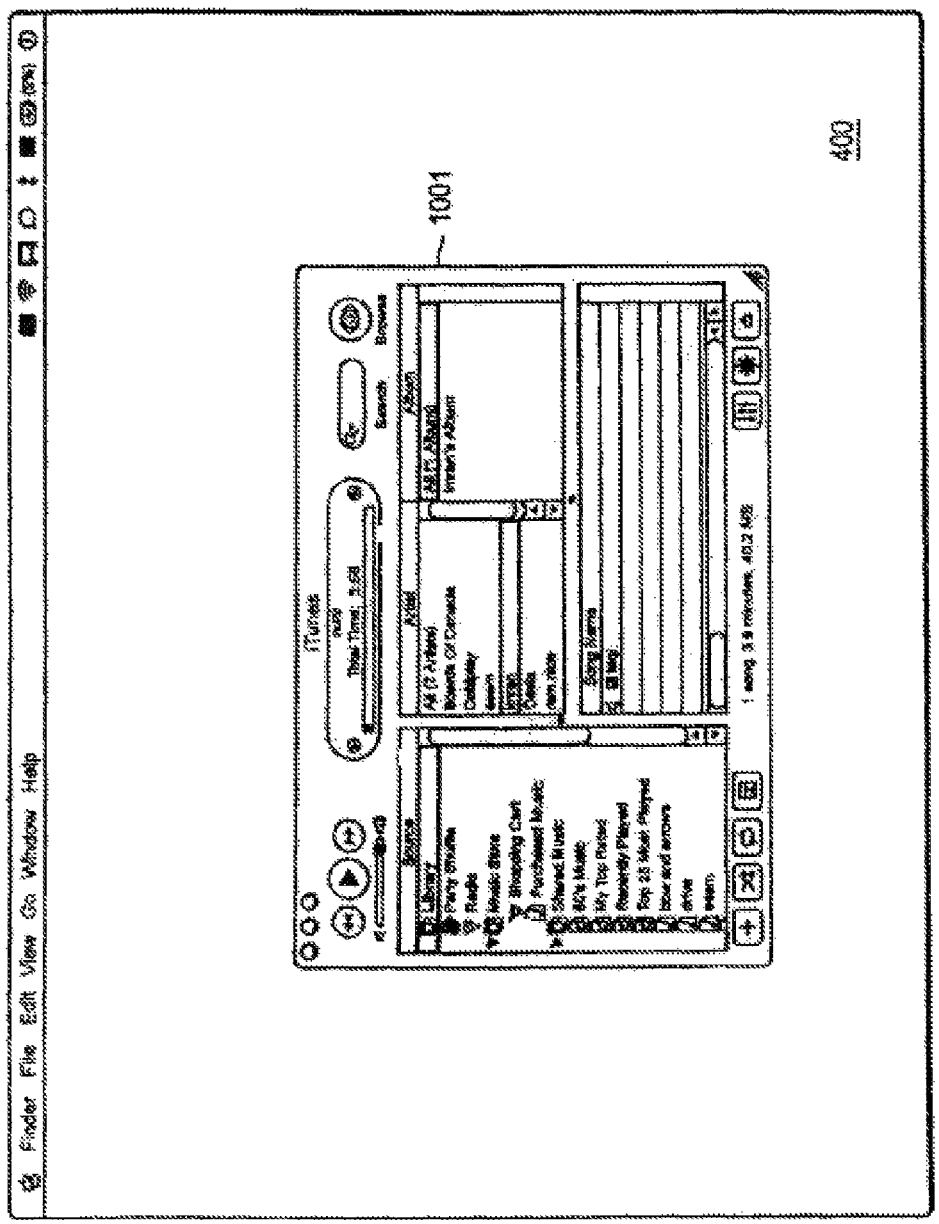
FIG. 10 is a screen shot depicting activation of a music player application as invoked by a music player widget, according to one embodiment.

In one embodiment, in response to the user clicking button 902 to activate the full music player application, the dashboard is dismissed, the normal desktop 400 is restored, and the full music player application is launched. All of these steps take place automatically, without requiring additional user intervention. FIG. 10 depicts the screen after the user has activated the full music player application 1001 by clicking on button 902 in music player widget 901, according to one embodiment. The dashboard has been dismissed, and the various elements of desktop 400, including menu bar 401, are once again active.

Figure 11:
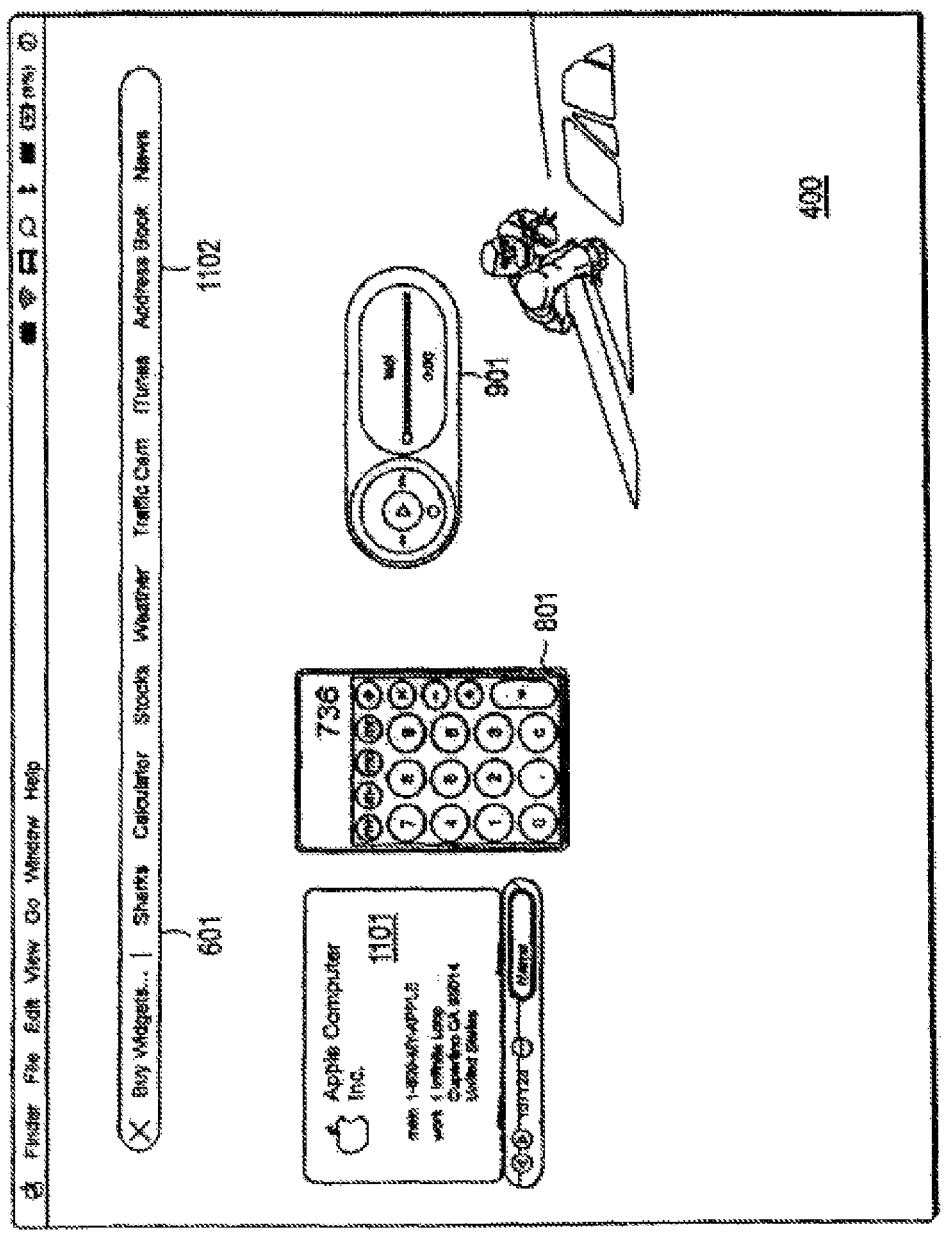
FIG. 11 is a screen shot depicting a dashboard including a calculator widget, a music player widget, and an address book widget, according to one embodiment.

In FIG. 11, the user has reactivated the dashboard (thus restoring widgets 801 and 901 in their previous states and locations), and has placed an address book widget 1101 by dragging it from label 1102. Again, in one embodiment, a ripple animation is displayed when widget 1101 is dropped onto its location on the dashboard.

Figure 12:
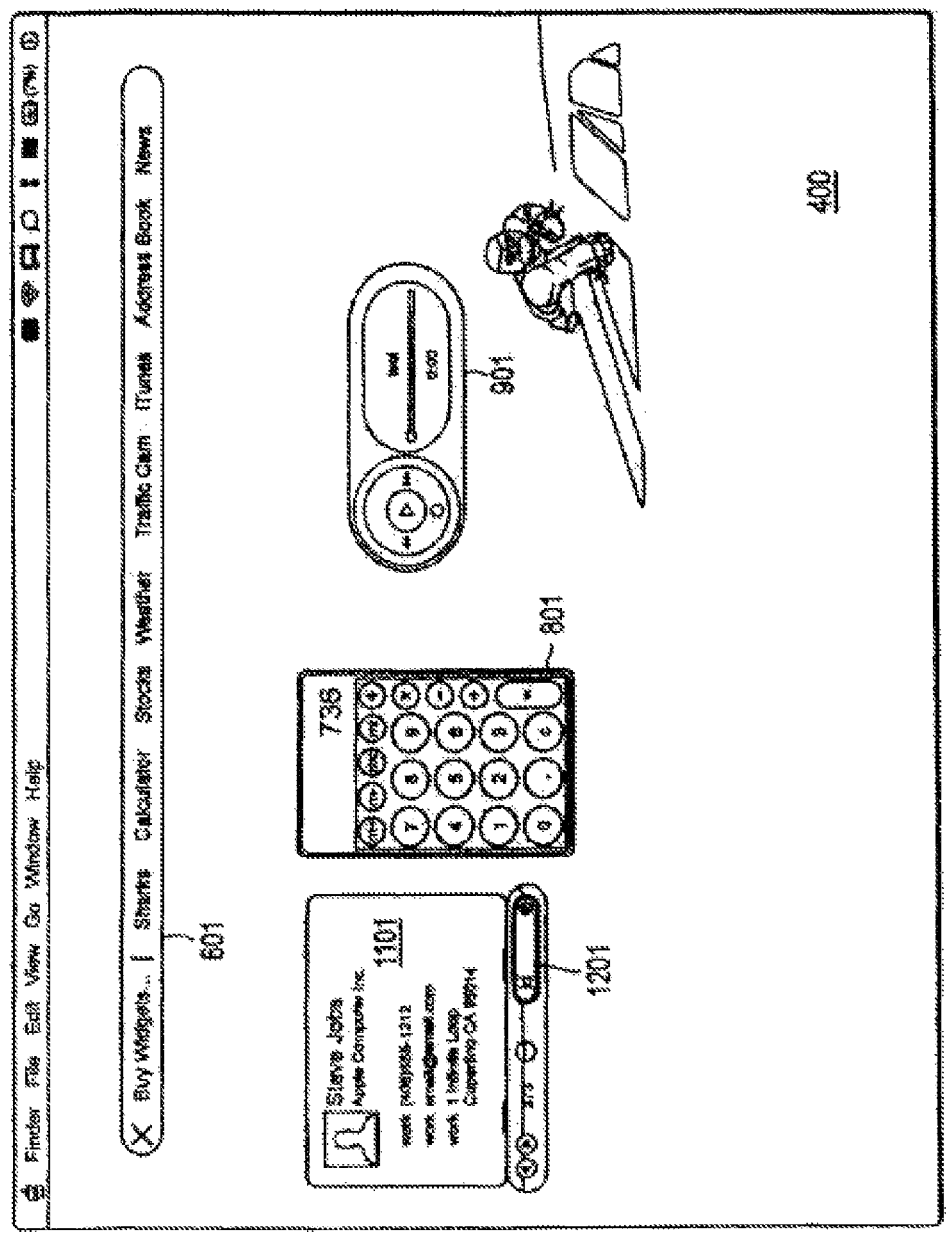
FIG. 12 is a screen shot depicting operation of an address book widget, according to one embodiment.

The user can interact with address book widget 1101 as he or she would normally interact with an address book application. For example, as shown in FIG. 12, the user can type in the first few letters of a person's name in field 1201; once sufficient information has been entered to identify an individual, that individual's address card is displayed.

Figure 13:
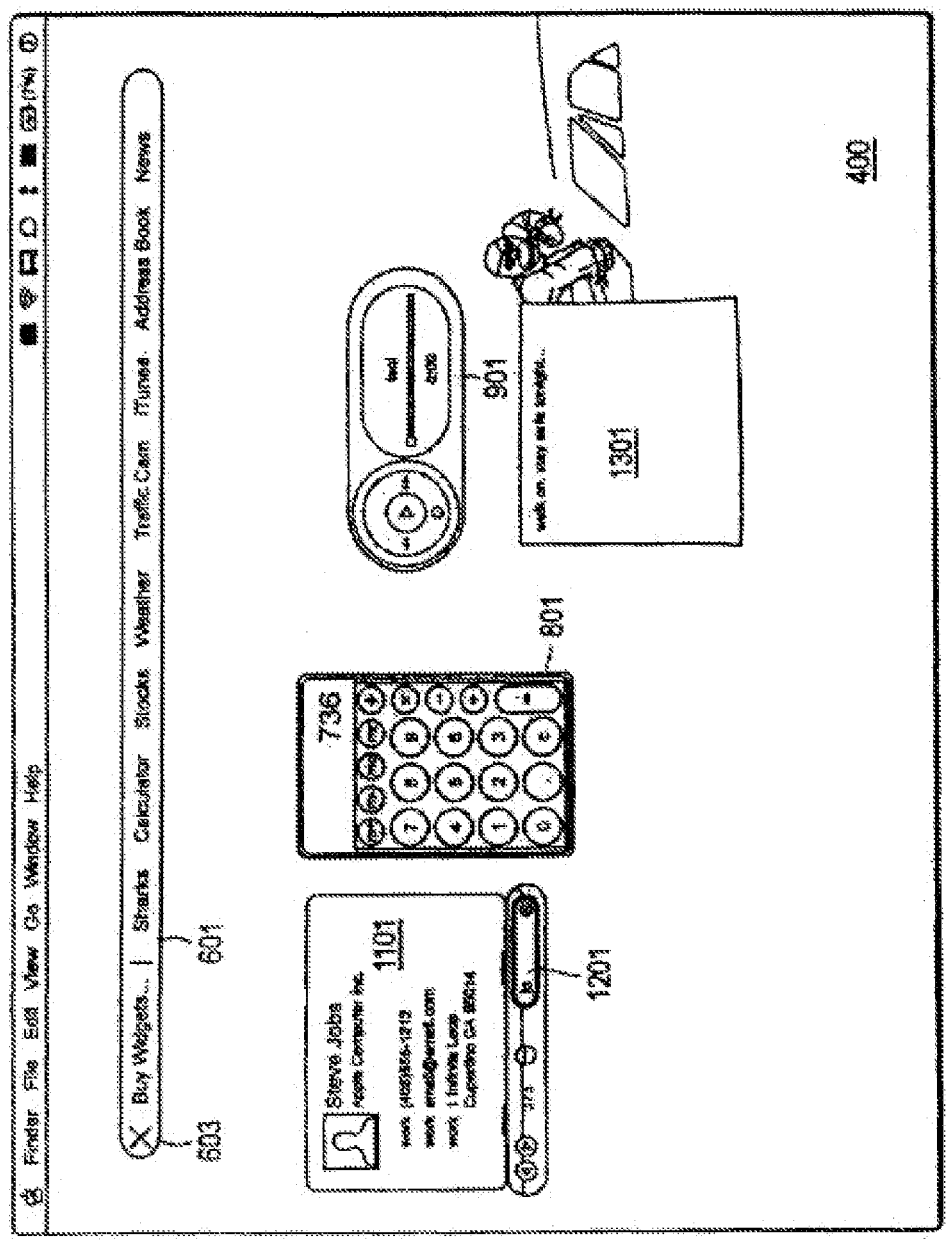
FIG. 13 is a screen shot depicting a dashboard including a number of widgets including a notes widget, according to one embodiment.

FIG. 13 depicts the dashboard after a number of widgets have been placed, including notes widget 1301, calculator widget 801, music player widget 901, and address book widget 1101. In one embodiment, double-clicking in notes widget 1301 causes it to enter an edit mode wherein text can be entered or edited. When not in edit mode, widget 1301 can be moved around the dashboard. In other embodiments, other types of user actions (for example pressing modifier keys) can be used to distinguish between text editing operations and widget-dragging operations.

Figure 14:
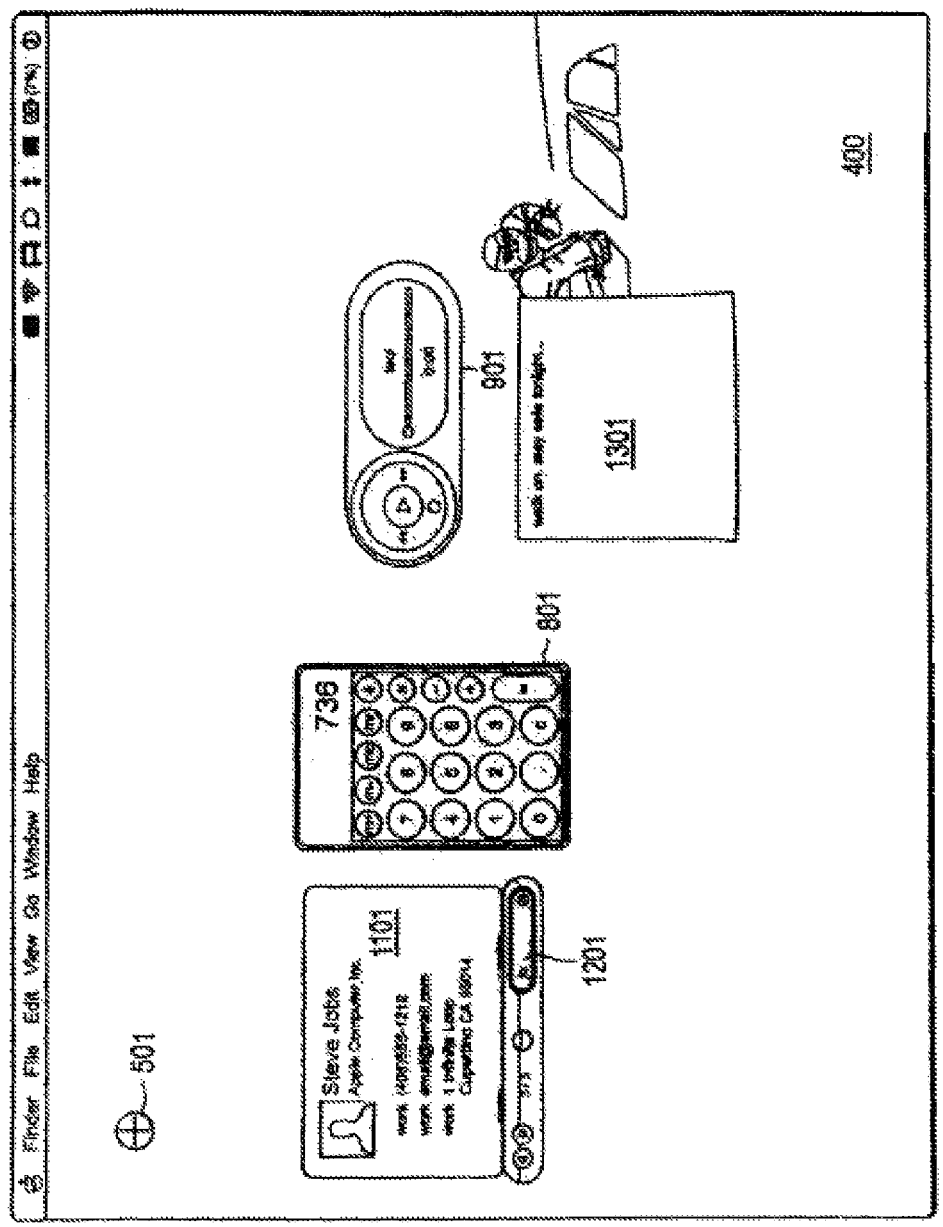
FIG. 14 is a screen shot depicting a dashboard where the configuration bar has been closed, according to one embodiment.

The user can dismiss configuration bar 601 by clicking on dismissal icon 603. FIG. 14 depicts a dashboard after configuration bar 601 has been closed, according to one embodiment. Configuration icon 501 is displayed, which allows the user to reactivate configuration bar 601 as desired.

Figure 15:
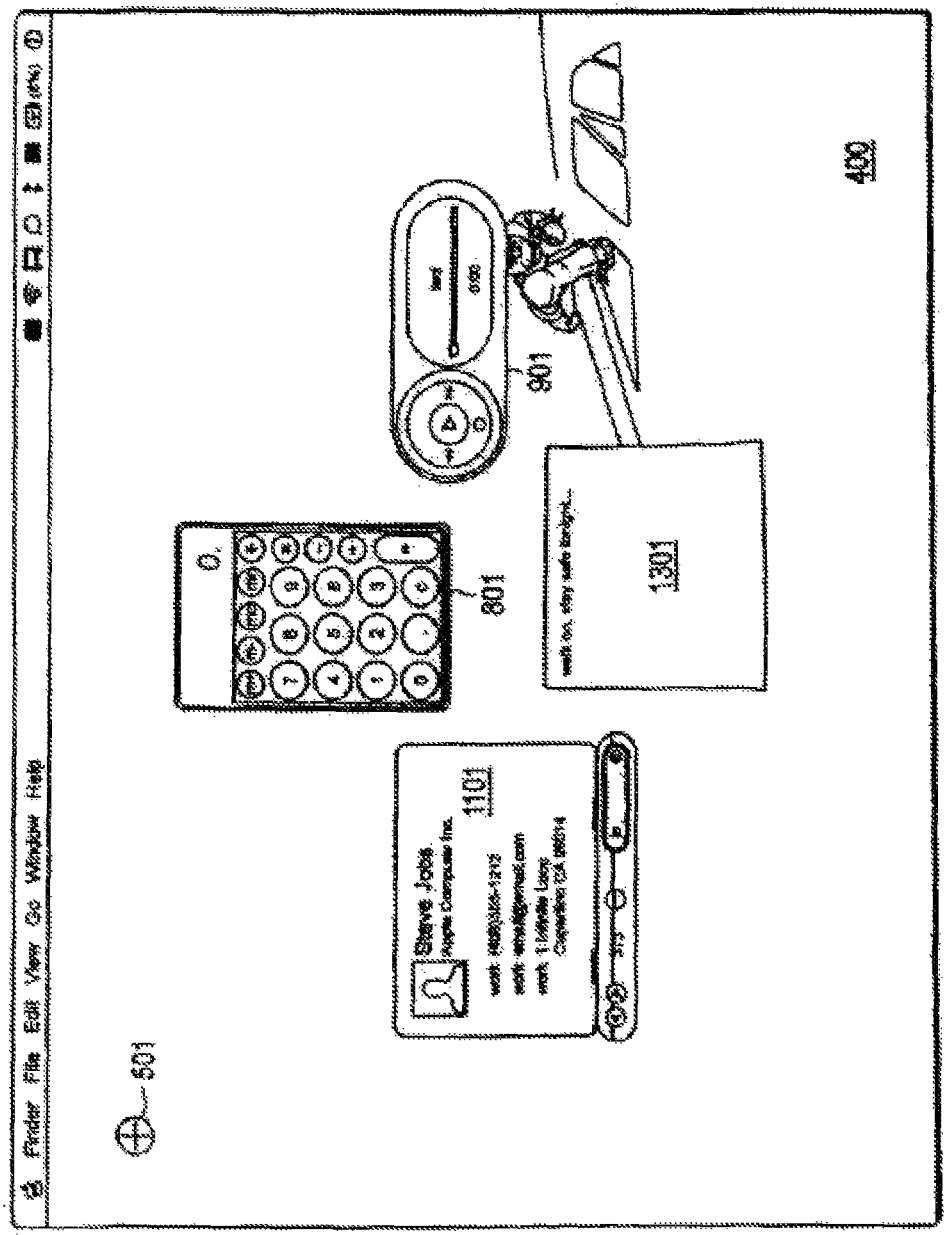
FIG. 15 is a screen shot depicting a dashboard wherein widgets have been moved to new positions.

The user can move widgets around the screen as desired. Widget locations are preserved when the dashboard is dismissed, so that the widgets reappear at the same location where they were left, when the dashboard is activated. FIG. 15 depicts the dashboard after widgets 801, 901, 1101, 1301 have been moved to new positions.

Figure 16A:
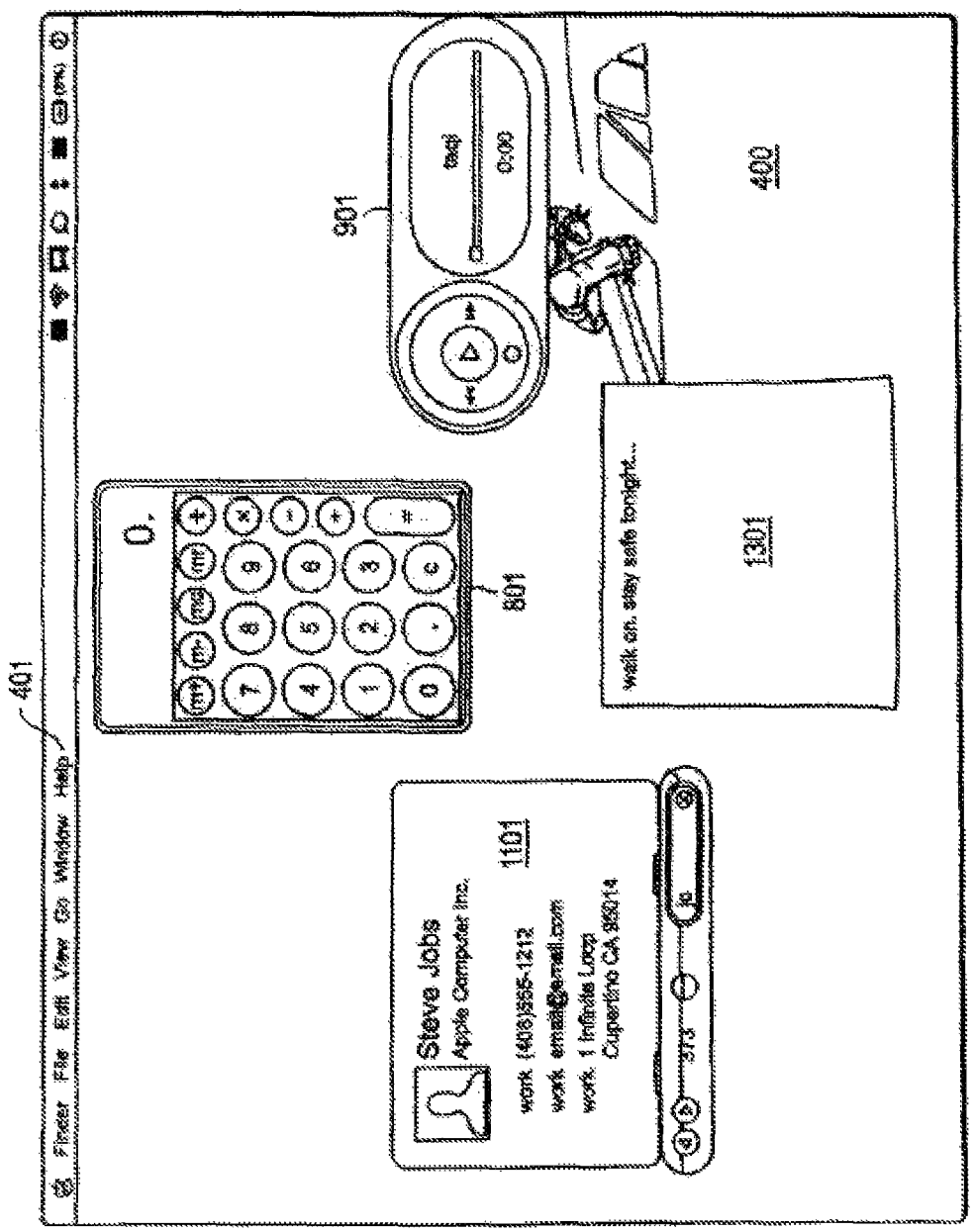
FIGS. 16A through 16C are screen shots depicting a transition animation for dismissing the dashboard, according to one embodiment.
Figure 16B:
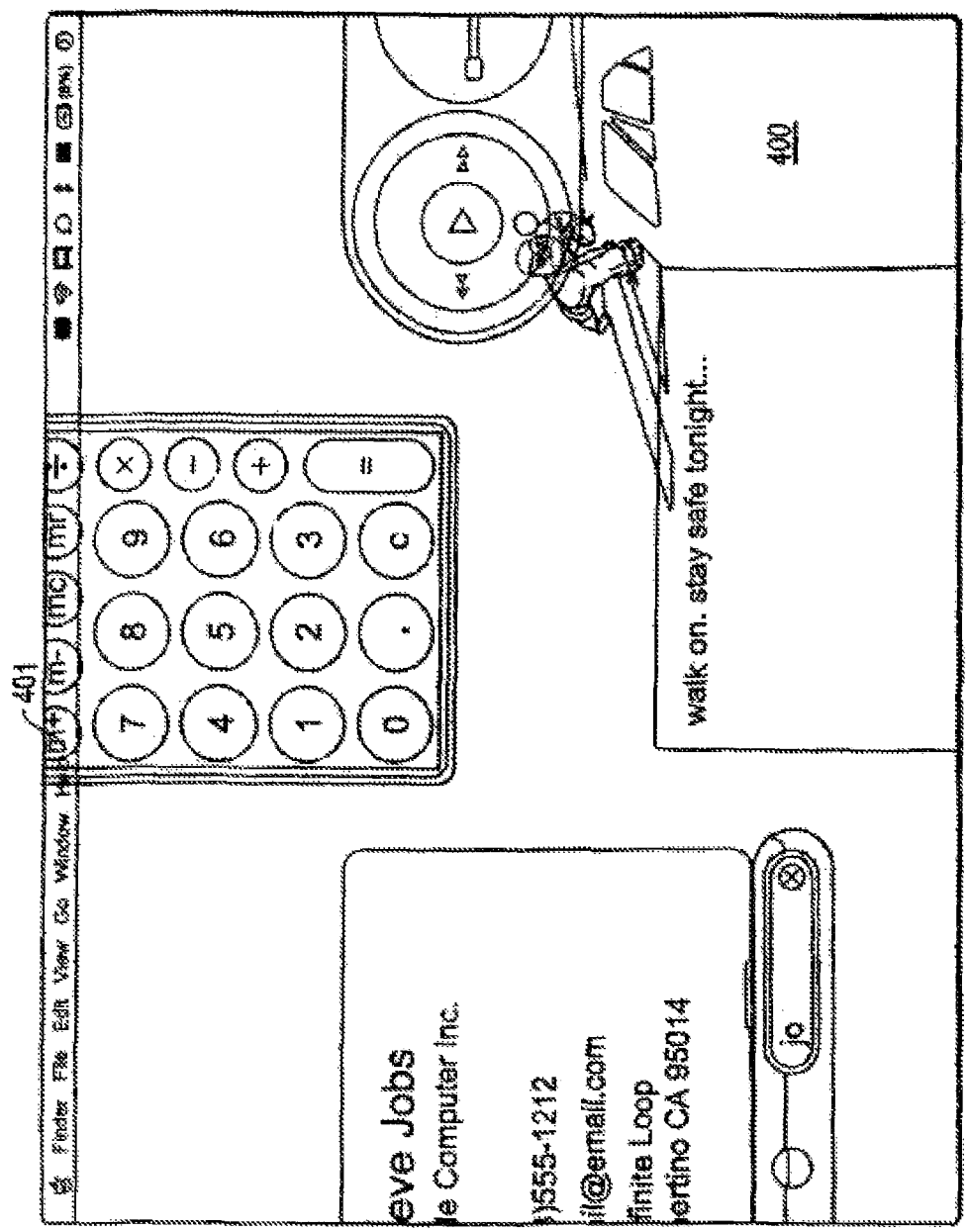
Figure 16C:
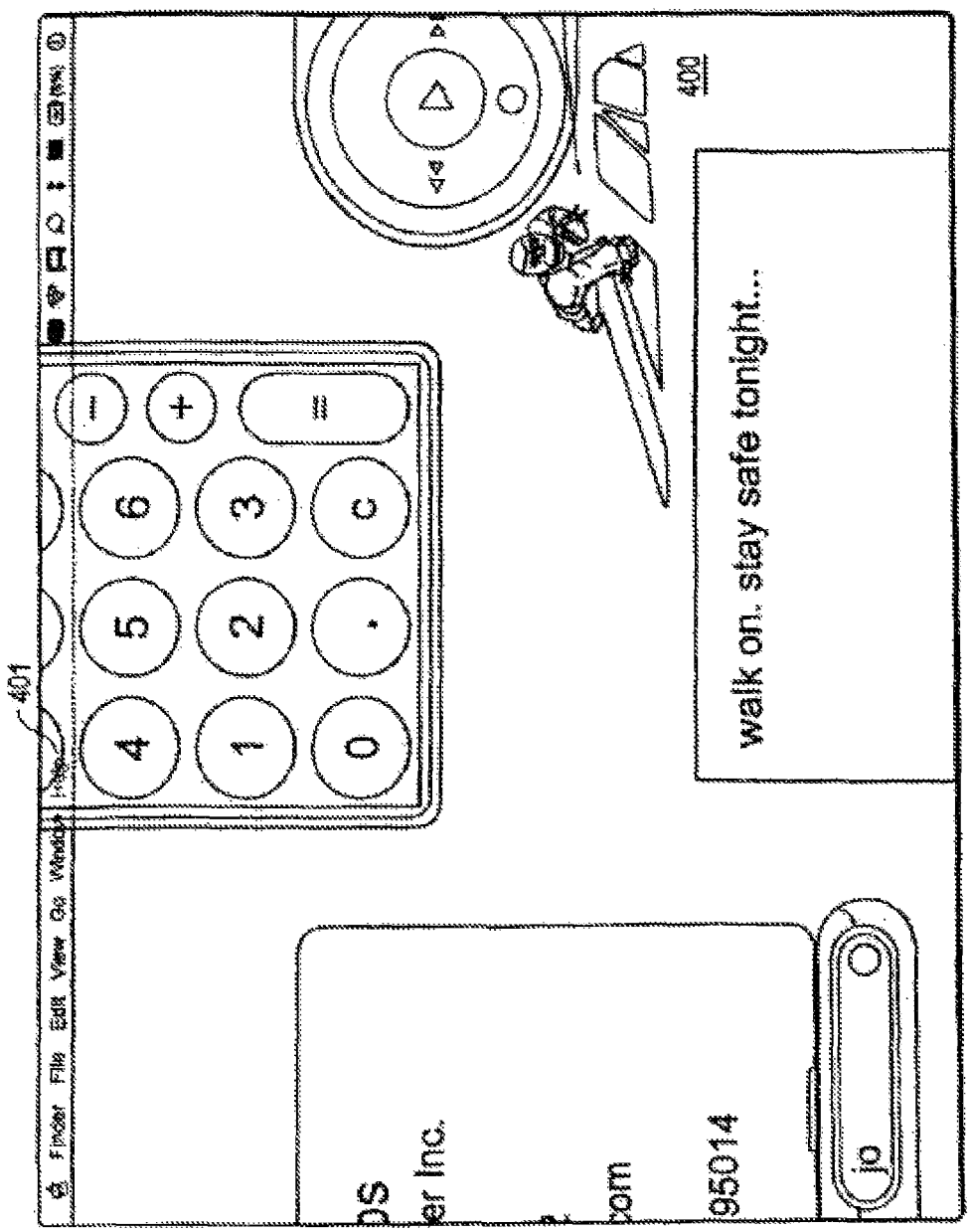
Figure 17A:
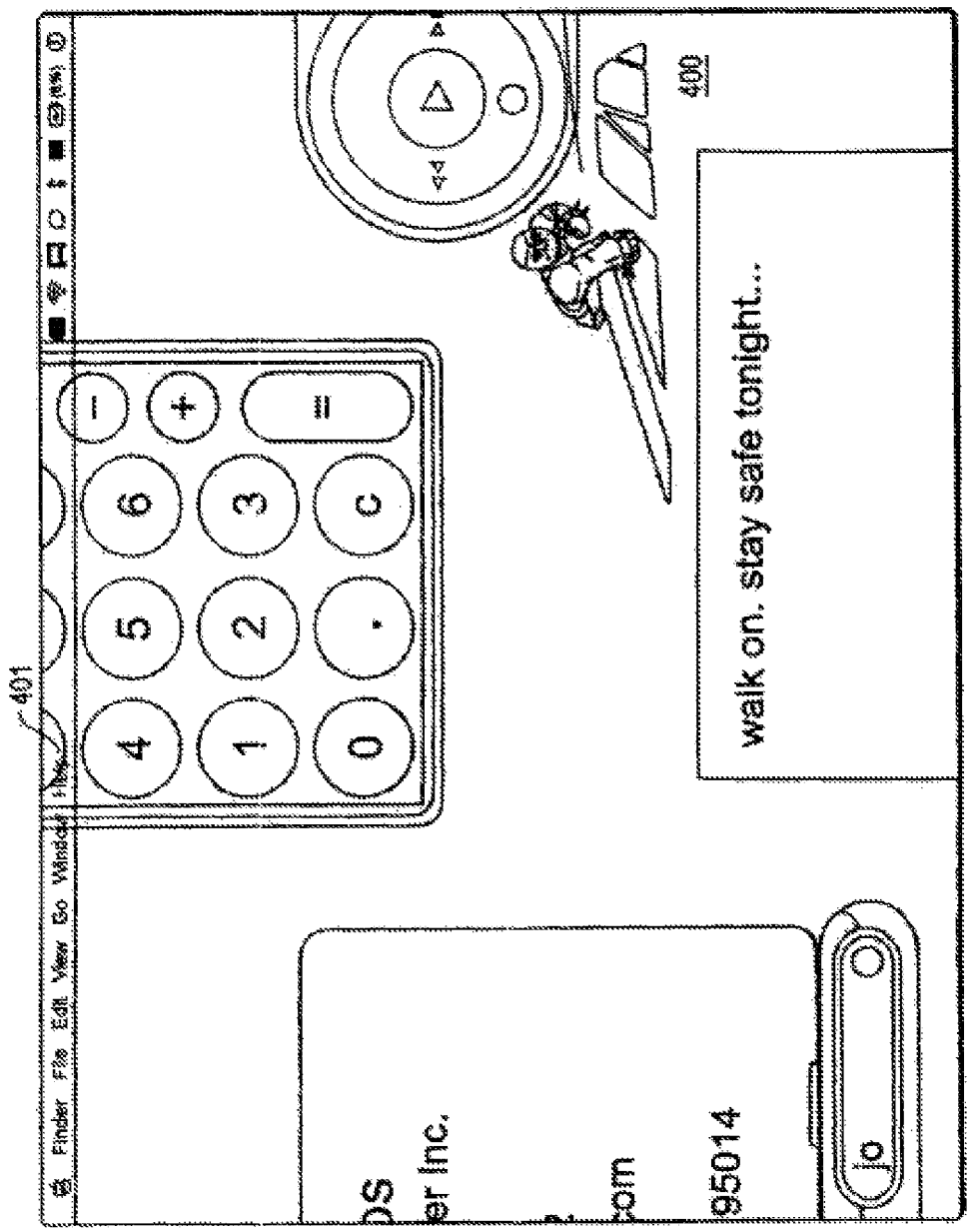
FIGS. 17A through 17D are screen shots depicting a transition animation for activating the dashboard, according to one embodiment.
Figure 17B:
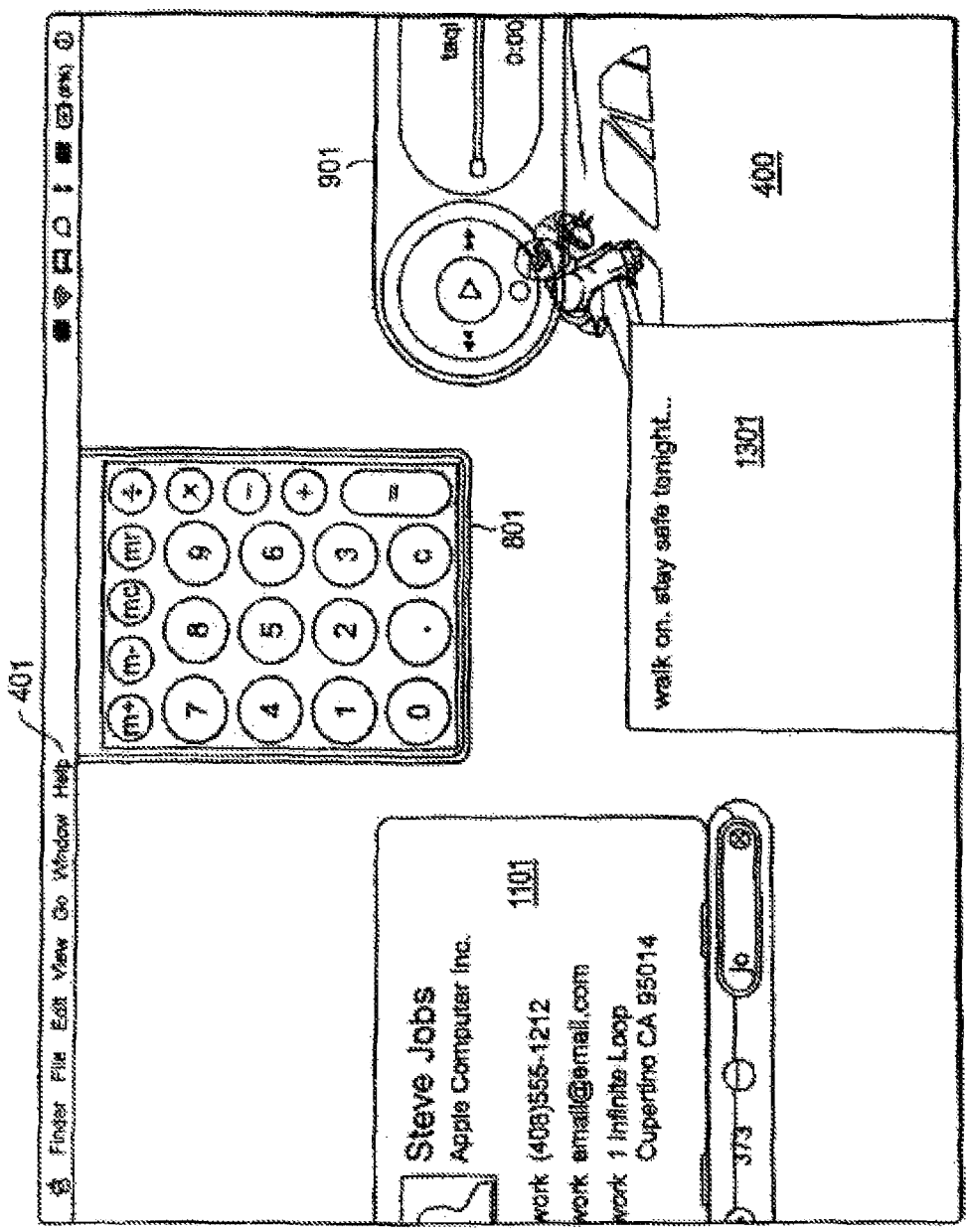
Figure 17C:
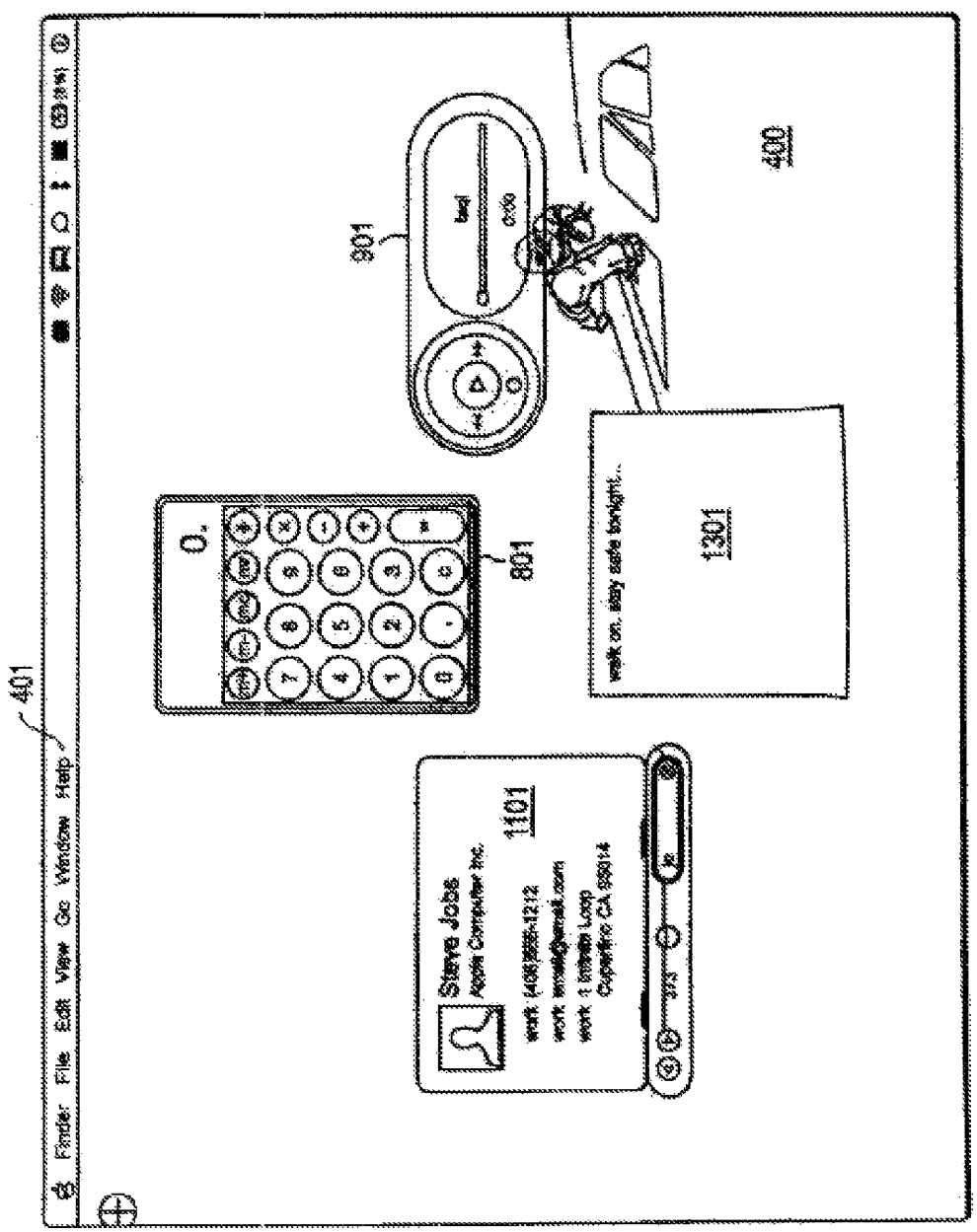
Figure 17D:
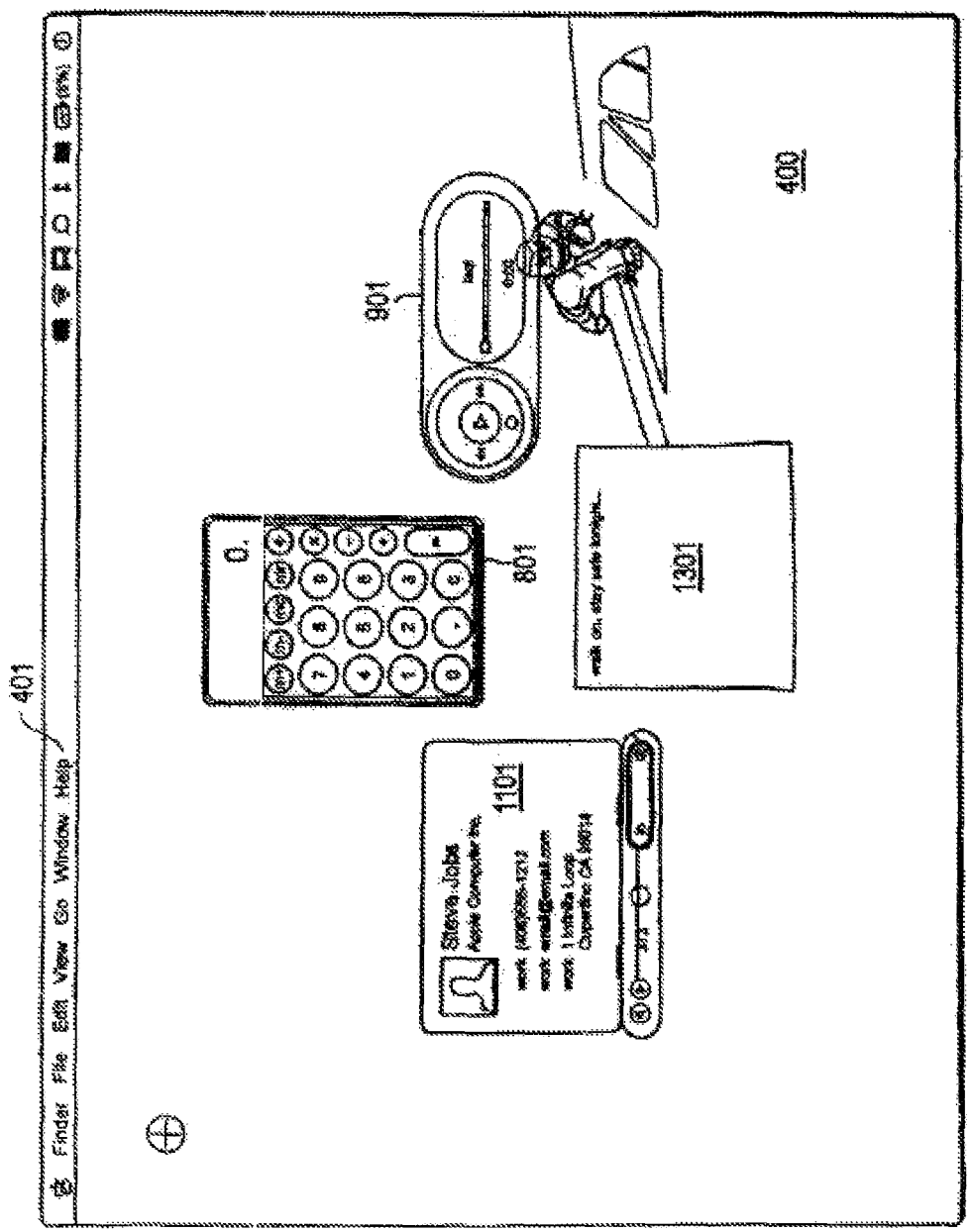

As discussed above, in one embodiment a transition animation is played when the dashboard is dismissed. FIGS. 16A through 16C are screen shots depicting a "fly-out" transition animation, wherein widgets 801, 901, 1101, 1301 appear to fly off the edges of the screen when the dashboard is dismissed. While they are flying off the edges of the screen, widgets 801, 901, 1101, 1301 grow in size and fade, so as to reinforce the appearance of movement and transition. At the same time, desktop 400 and its features (such as menu bar 401) are restored to their normal, non-faded appearance.

As discussed above, in one embodiment a transition animation is played when the dashboard is activated. FIGS. 17A through 17D are screen shots depicting a "fly-in" transition animation, wherein widgets 801, 901, 1101, 1301 appear to fly in from the edges of the screen when the dashboard is activated. Widgets 801, 901, 1101, 1301 are faded and enlarged when they first appear at the screen edges; they reduce in size and become more solid in appearance while they are flying in, so as to reinforce the appearance of movement and transition. At the same time, desktop 400 and its features (such as menu bar 401) gradually fade into the background.

In one embodiment, the system of the present invention includes the capability to alert the user when a widget needs attention or has new information to display to the user, even if the dashboard is not currently active. For example, an icon on a "Dock", or taskbar, or other user interface element commonly associated with a desktop user interface, can blink or bounce or otherwise indicate an alert condition. A distinctive sound can also be played. Alternatively, a dialog box can be presented, or a text alert can be displayed. Whatever form it may take, the alert can be of a generalized type or it may indicate the specific widget that issued the alert, and may even have additional information specifying the nature of the alert. The user can then activate the dashboard (either by a dashboard activation command as described above, or by clicking on an icon or button associated with the alert) to see the widget that issued the alert. Alternatively, the dashboard can automatically be activated in such a situation, or a dialog box can be presented to allow the user to indicate whether or not the dashboard should be activated.

For example, a package tracking widget may issue an alert when a package has been delivered. The alert may be generalized, or it may indicate that the package tracking widget is the source of the alert, or it may even provide the delivery information. The user can dismiss the alert, or activate the dashboard to see the widget and interact with it to obtain more information. As another example, a traffic webcam widget can issue an alert when an accident has occurred on the route covered by the webcam.

Figure 26:
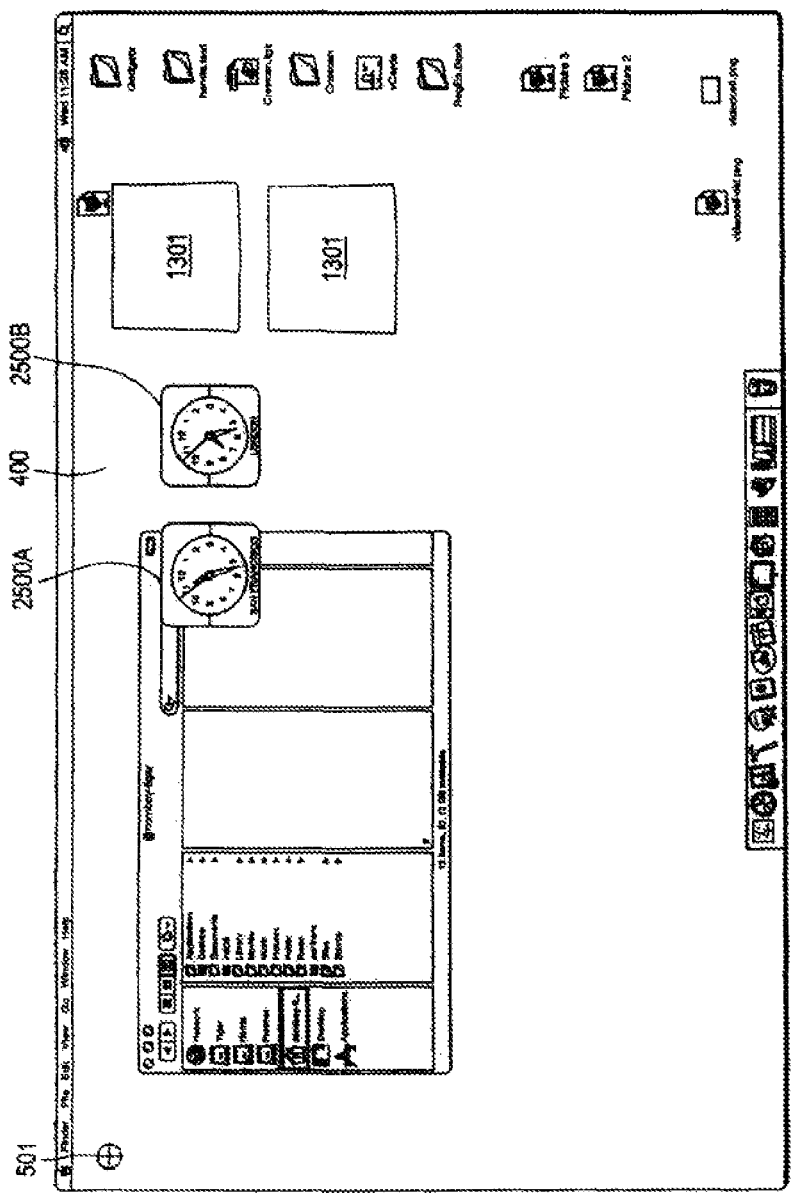
FIG. 26 is a screen shot depicting a dashboard where the configuration bar has been closed, according to one embodiment.

In one embodiment, configuration bar 601 has several possible states. Referring now to FIG. 26, there is shown an example of the dashboard where the configuration bar is closed, so that configuration icon 501 is displayed. Two stickies widgets 1301 are currently being displayed, along with two clock widgets 2500A, 2500B.

Figure 27:
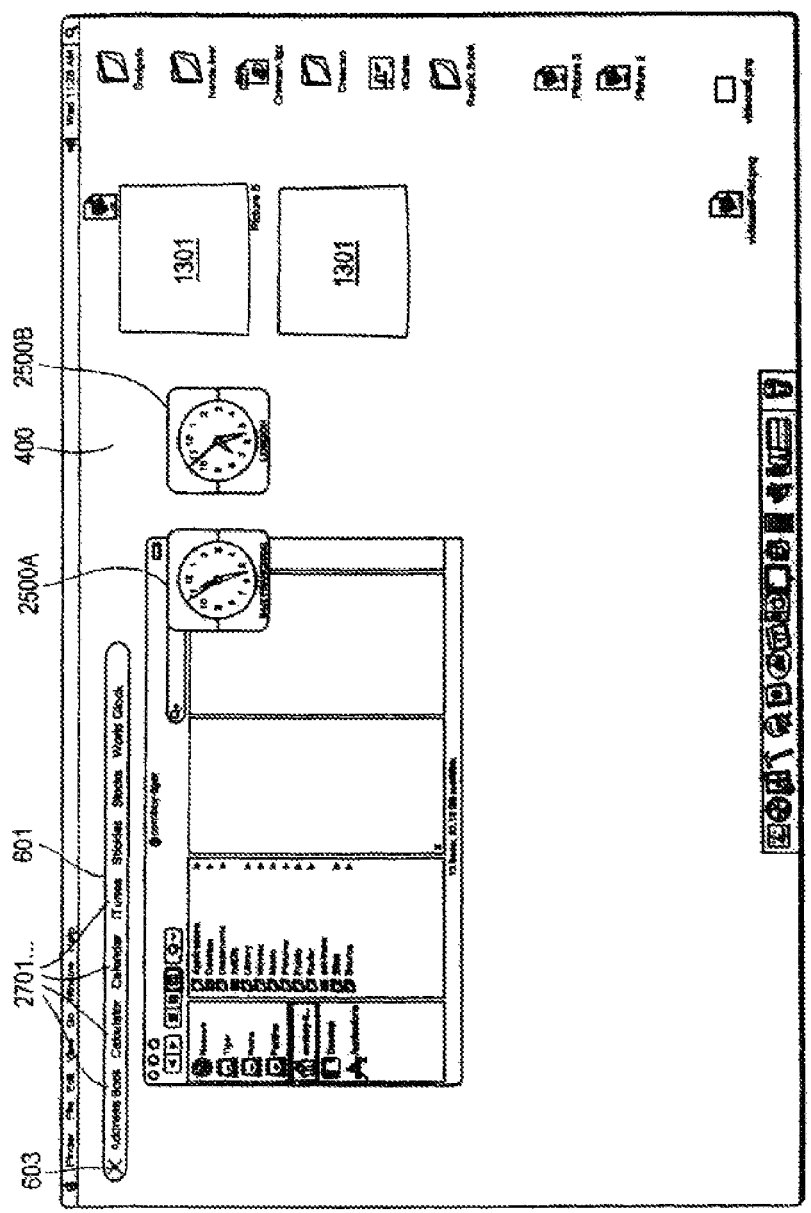
FIG. 27 is a screen shot depicting a dashboard where the configuration bar has been opened to show favorite widgets, according to one embodiment.
Figure 28:
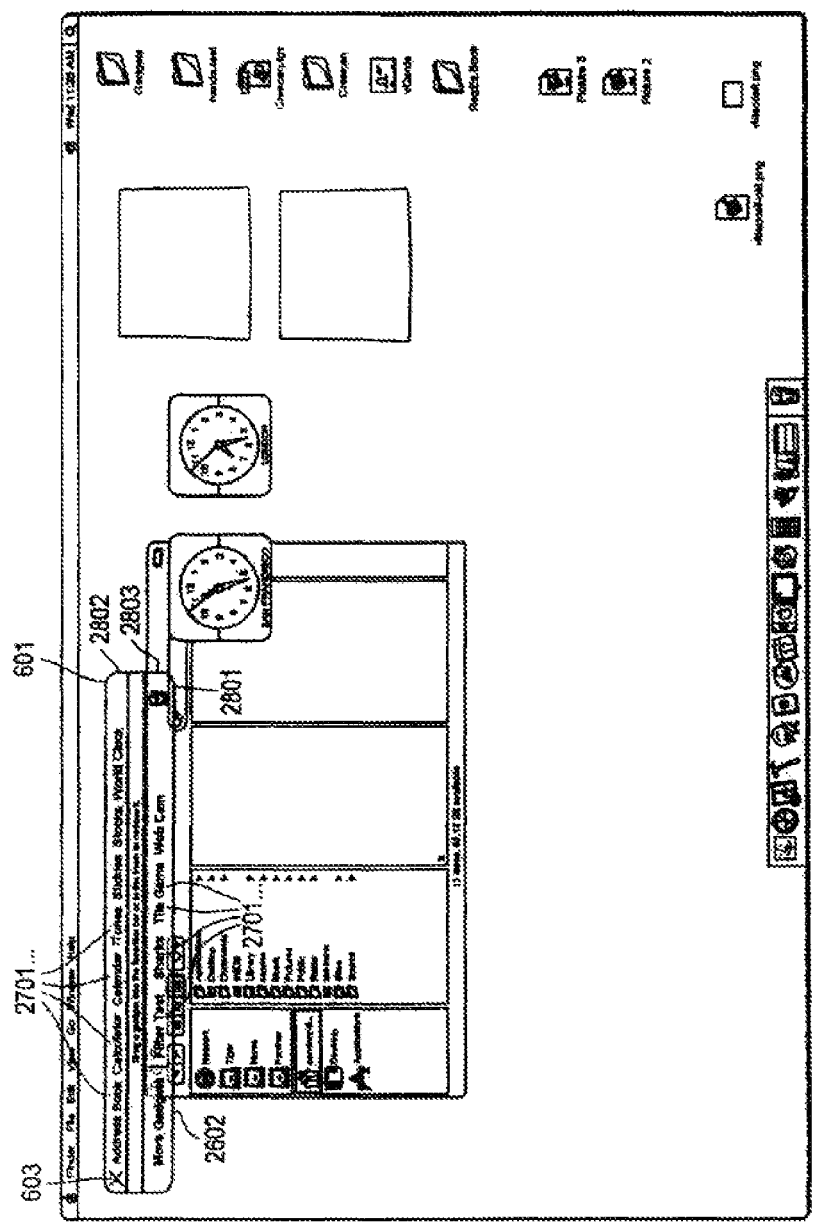
FIG. 28 is a screen shot depicting a dashboard where the configuration bar has been opened to allow access to additional widgets, according to one embodiment.

Clicking on configuration icon 501 causes configuration bar 601 to be displayed in a first state, as shown in FIG. 27. The first state includes labels 2701 for various widgets that are designated as "favorites"; in one embodiment, these are a subset of all of the widgets currently installed on the user's machine. Thus, in this state, the user is presented with only those widgets that are commonly needed. As will be seen, the user is able to configure this view so that it includes any desired subset of installed widgets. In one embodiment, configuration bar 601 in this state includes a "More" label or icon. The user clicks on this label or icon to cause configuration bar 601 to expand to its second state, as shown in FIG. 28. Dismissal icon 603 causes configuration bar 601 to be dismissed, reverting to configuration icon 501 as shown in FIG. 26. In one embodiment, the on-screen position of icon 603 matches that of icon 501, so that the user can easily open and close configuration bar 601 without moving the cursor around.

The user can drag labels 2701 onto the dashboard surface to place widgets onto the dashboard. As described above, in one embodiment a distinctive animation, such as a ripple effect, is shown to reinforce the notion that the widget is being placed at the specified location.

Referring now to FIG. 28, there is shown an example of configuration bar 601 in its second, expanded state, providing access to additional widgets as well as the favorite widgets that were presented in the first state. In this state, configuration bar 601 has two sections 2802, 2803. Section 2802 includes labels 2701 for favorite widgets; this includes the same subset of widgets that is included in the first state of configuration bar 601, as shown in FIG. 27. Section 2803 includes labels 2701 for other widgets that are not included in the set of favorite widgets. Dragging a label 2701 from section 2802 to 2803 causes the corresponding widget to be removed from the favorites subset. Dragging a label 2701 from section 2803 to 2802 causes the corresponding widget to be added to the favorites subset. Dragging a label 2701 from either section 2802 or 2803 onto the dashboard surface causes the corresponding widget to be placed at the specified location. Dragging a label 2701 from either section 2802 or 2803 onto trash icon 2801 causes the label 2701 to be removed from configuration bar 601; in one embodiment, this also causes the corresponding widget to be removed from the dashboard (if it is currently open). In one embodiment, dragging a label 2701 onto trash icon 2801 also causes the corresponding widget to be deleted from the user's machine, or made unavailable. In one embodiment, the user is presented with a dialog box to confirm that he or she wishes to delete the widget. In one embodiment, the user can also drag widgets onto trash icon 2801 to cause the widgets to be closed, dismissed, and/or uninstalled. More gadgets label 2602 provides access to a website, online store, or other resource for obtaining and installing additional widgets; in one embodiment it offers functionality that is similar to buy command 602 as described above in connection with FIG. 6.

In one embodiment the state of configuration bar 601 is persistent from one invocation of the dashboard to the next.

Figure 30:
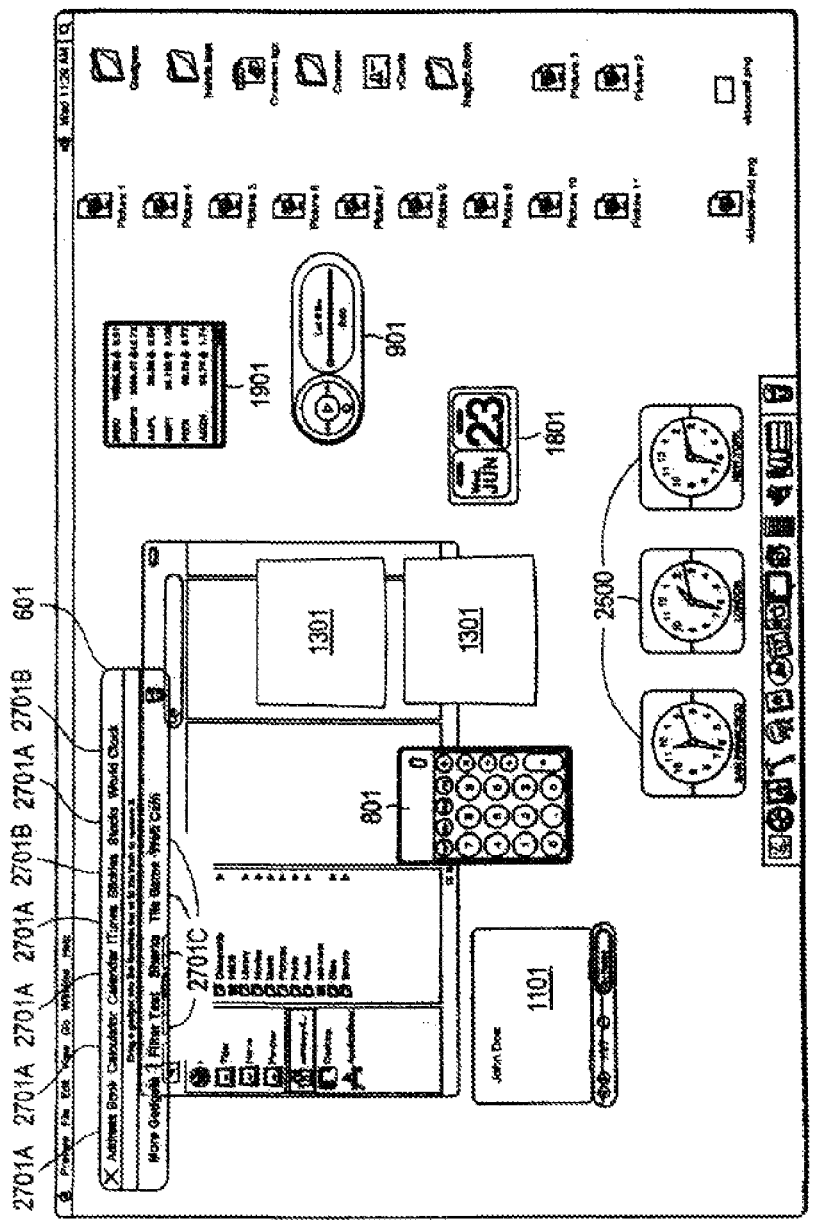
FIG. 30 is a screen shot depicting a dashboard wherein some labels in the configuration bar have changed in appearance, according to one embodiment.

Referring now to FIG. 30, there is shown an example of a dashboard wherein some labels 2701A in configuration bar 601 have changed in appearance, while other labels 2701B, 2701C are unchanged, according to one embodiment. In one embodiment, when a widget is open, its corresponding label 2701 on configuration bar 601 changes in appearance; for example, it is grayed out or displayed in some other color. In another embodiment, label 2701 is grayed out (or otherwise changed) only if the widget is a single-instance widget (as described above); for multiple-instance widgets, label 2701 remains unchanged when the widget is opened. Such a technique provides an indication to the user as to which labels 2701 can be used to activate a widget (either because they are not currently open or because they are multiple-instance widgets) and which labels 2701 are currently inactive (because they correspond to single-instance widgets that have already been opened). In the example of FIG. 30, address book 1101, calculator 801, calendar 1801, music player 901, and stock quote widget 1901 are open, single-instance widgets; therefore their corresponding labels 2701A are grayed-out. Stickies 1301 and clock 2500 are open, multiple-instance widgets; therefore their corresponding labels 2701B are unchanged. Labels 2701C are also unchanged, since they correspond to widgets that are not currently open.

In another embodiment, labels 2701 corresponding to open multiple-instance widgets have a different appearance than labels 2701 corresponding to widgets that are not currently open.

In another embodiment, when a widget is opened, its label 2701 is removed from configuration bar 601. When the widget is closed, its label 2701 is restored in configuration bar 601. In another embodiment, when a single-instance widget is opened, its label 2701 is removed from configuration bar 601, but when a multiple-instance widget is opened, its label 2701 remains on configuration bar 601. When the single-instance widget is closed, its label 2701 is restored in configuration bar 601. Removing and/or restoring labels 2701 can be accompanied by animations to reinforce the transition from configuration bar 601 onto dashboard surface and vice versa. For example, when closing a widget, the widget can appear to be sucked into configuration bar 601 as the corresponding label 2701 is restored.

If a widget is deleted or removed (by dragging it or its label to trash icon 2801, for example), its label 2701 is removed from configuration bar 601.

Figure 29:
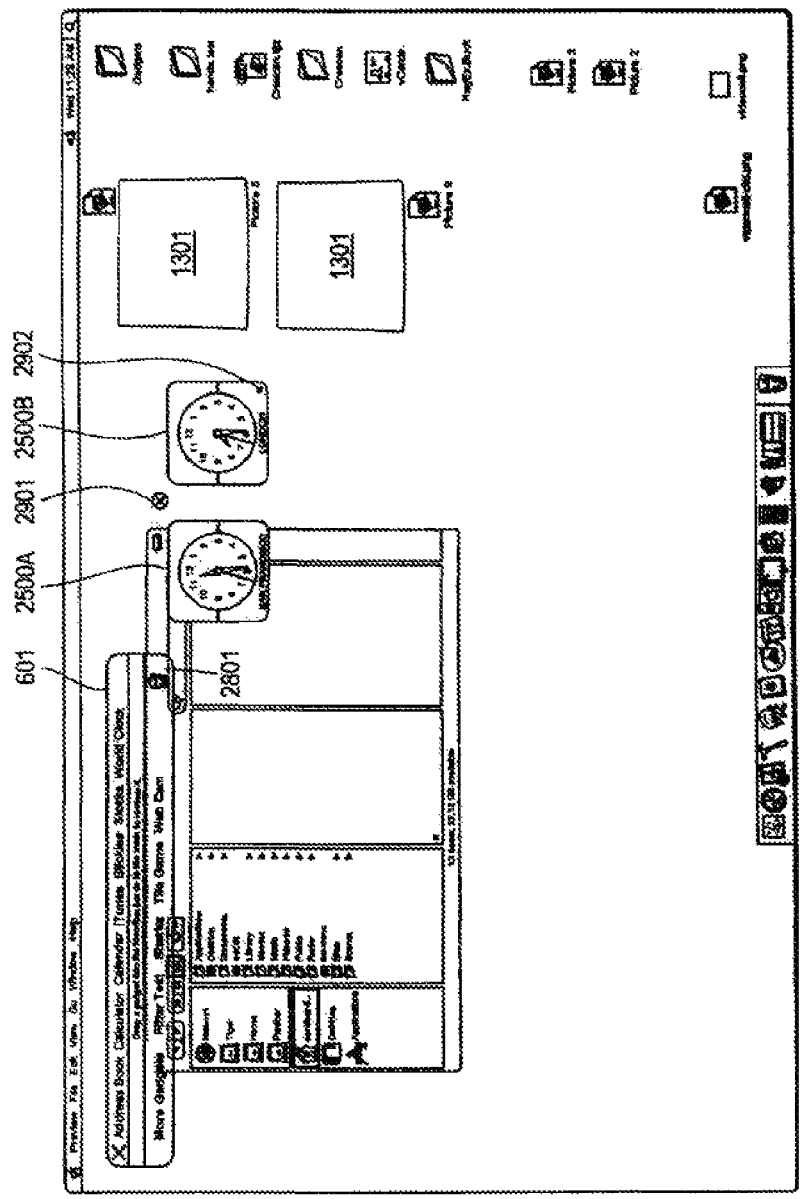
FIG. 29 is a screen shot depicting a dashboard including rollover icons for closing and configuring a widget, according to one embodiment.

In one embodiment, the user can close a widget by clicking on a close icon, or by dragging the widget back to configuration bar 601. Referring now to FIG. 29, there is shown a screen shot depicting a dashboard including close icon 2901 for closing widget 2500B. In one embodiment, icon 2901 is a rollover icon; it appears when the user has positioned the cursor over widget 2500B, and it disappears when the cursor is no longer positioned over widget 2500B. In one embodiment, rollover icon 2901 only appears if the cursor is held over widget 2500B for at least a predetermined period of time, such as half a second. In one embodiment, when a widget is closed, an animation is played to reinforce the notion that the widget is closing. For example, the widget may be momentarily distorted in such a way that it appears to be sucked into close icon 2901, or onto configuration bar 601, before it disappears from the screen. Other types of animations or effects may also be used, such as a fade, or a wipe, or a shrinking effect. In one embodiment, the user can configure which effect is desired, or if no effect is desired.

Widget 2500B also includes preferences icon 2902 for accessing preferences controls for widget 2500B. In one embodiment, icon 2902 is a rollover icon; it appears when the user has positioned the cursor over widget 2500B, and it disappears when the cursor is no longer positioned over widget 2500B (although it continues to be visible when the cursor is moved over to icon 2902). In one embodiment, icon 2902 only appears if the cursor is held over widget 2500B for at least a predetermined period of time, such as half a second. Clicking on icon 2902 causes preferences controls to be displayed. In one embodiment, preferences are entered using a conventional dialog box (not shown) as is known in the art. In another embodiment, clicking on icon 2902 causes widget 2500B to appear to flip over, revealing its reverse side, which contains preferences controls.

Figure 32:
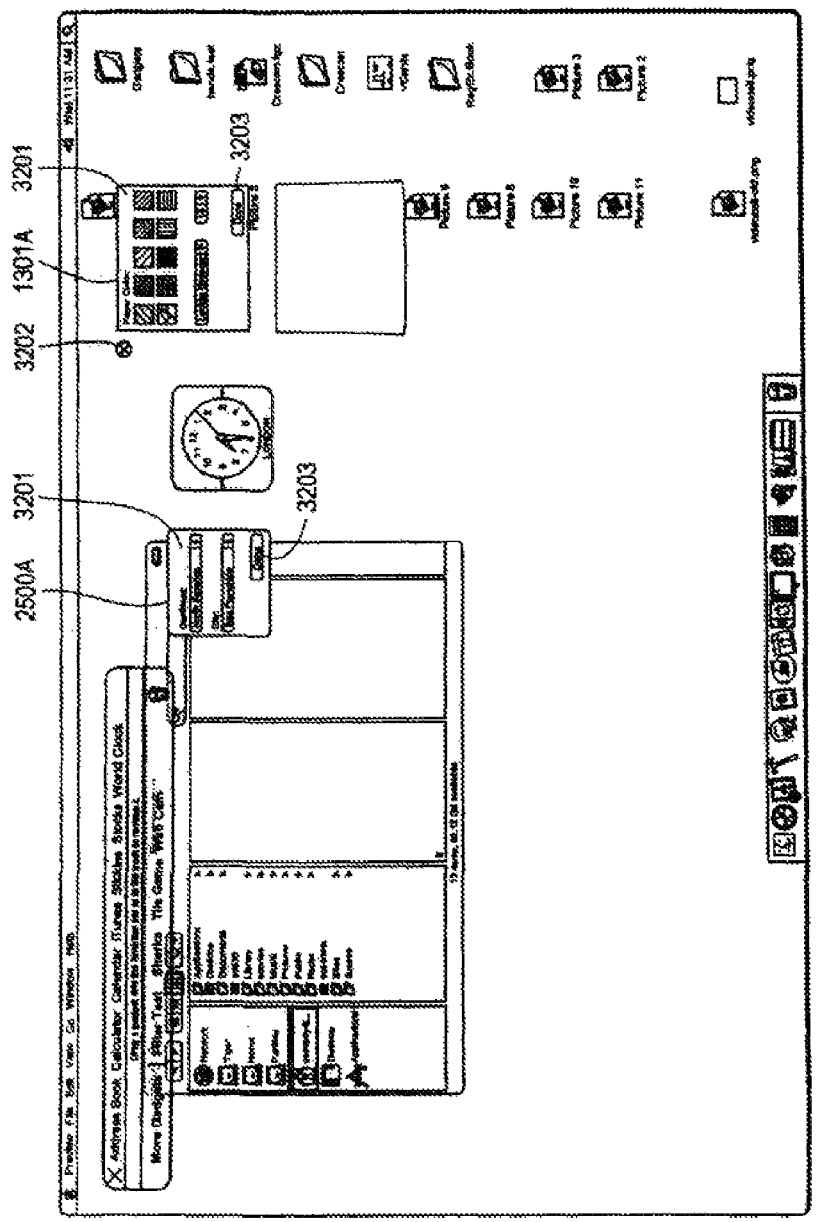
FIG. 32 is a screen shot depicting a dashboard showing preferences controls for two widgets, according to one embodiment.

Referring now to FIG. 32, there is shown an example of the dashboard where two widgets 2500A and 1301A have been flipped over, revealing preferences controls 3201. In the example, preferences controls 3201 include menus for selecting a location (for clock widget 2500A), and paper color selector and font selector (for stickies widget 1301A). One skilled in the art will recognize that any type of controls, menus, fields, or other elements can be included in preferences controls 3201. The user can dismiss preferences controls 3201 by clicking on Done button 3203 or on close box 3202. In one embodiment, close box 3202 is a rollover icon, so that it is only visible when the cursor is positioned over widget 1301A (although it continues to be visible when the cursor is moved over to close box 3202). In one embodiment, when preferences controls 3201 are dismissed, a flip-over animation is again played, and the normal appearance of the widget is restored (reflecting any changes that were made via preferences controls 3201).

Referring now to FIG. 31, there is shown another example of a dashboard wherein some labels 2701A in configuration bar 601 have changed in appearance, while other labels 2701B, 2701C are unchanged, according to one embodiment. Address book 1101, calculator 801, calendar 1801, music player 901, and stock quote widget 1901 are open, single-instance widgets; therefore their corresponding labels 2701A are grayed-out. Stickies 1301A and 1301B are open, multiple-instance widgets; therefore their corresponding label 2701B is unchanged. Labels 2701C, including world clock label, are also unchanged, since they correspond to widgets that are not currently open. In FIG. 31, the cursor (not shown) is positioned over stickies widget 1301B, so that close box 2901 and preferences icon 2902 are displayed, as described above in connection with FIG. 29.

In the example of FIG. 31, configuration bar 601 includes Done button 3101, which dismisses configuration bar 601 and restores configuration icon 501. Thus, Done button 3101 performs the same action as dismissal icon 603.

In one embodiment, flipping a widget over reveals other information, fields, or controls in addition to (or instead of) preferences fields and controls. One skilled in the art will recognize that the reverse side of a widget can include any type of auxiliary information, fields, or controls, and is not limited to a mechanism for accessing preferences controls.

Widget Installation

In one embodiment, widgets are preinstalled on the user's computer, so that dragging them onto the dashboard merely makes them active. In another embodiment, widgets are not preinstalled, but are installed in response to the user dragging them onto the dashboard. In another embodiment, dragging a widget onto the desktop causes code for the widget to be downloaded from a remote server and installed on the user's machine. In another embodiment, installing a widget in this manner also causes a fully functional application containing related functionality to be automatically installed as well (although the user can be given the option to decline such an installation); for example, installing a music player widget can cause a fully functional music player application to be installed as well. Authentication and payment may be prerequisites for such operations in some embodiments.

For example, referring briefly to FIG. 28, in one embodiment the user clicks on more gadgets label 2602 to access an online widget store or website where widgets are available for purchase or for free download. The user selects widget(s) for installation on his or her machine, and pays via credit card (if required). The online store or website is dismissed, the selected widget(s) are downloaded and installed, the dashboard is automatically reactivated, and the selected widget appears in configuration bar 601, ready to be dragged onto the dashboard surface. Alternatively the new widget can automatically be placed on the dashboard surface. Thus, the present invention provides an easy, seamless way to install widgets.

In one embodiment, an online store or free distribution site is provided

In one embodiment, an online store or free distribution site is provided for making widgets 303 available. Available widgets 303 can be viewed, previewed, selected and installed from a website, or from a configuration option within the dashboard. In one embodiment, users can pay for widgets 303 using a credit card or any other conventional means for online purchases. Widgets 303 are transmitted and installed on the user's computer according to conventional means. In one embodiment, widgets 303 are installed according to techniques described in related U.S. Utility patent application Ser. No. 10/874,829, for "User Interface for Assisting in the Installation of an Asset," filed Jun. 22, 2004, the disclosure of which is incorporated herein by reference.

In one embodiment, widgets such as 801 are implemented using HTML technology with enhancements that are more fully described below and in the related cross-referenced applications. One skilled in the art will recognize, however, that any graphics technology can be used for implementing widgets such as 801.

In one embodiment, widgets 303 are encrypted into a flat file that is expandable in memory, either in whole or in parts. Widget 303 contents are indexed so that particular resources can be accessed as needed. Widgets 303 may be encrypted according to any conventional encryption technology.

In one embodiment, clients 302 have complete control of resource loading of the WebView. When a relative resource is requested, the client 302 converts the protocol to one specific to the process. In one embodiment, the NSURL Protocol in Foundation is used to fetch data from the encrypted source.

Software Architecture

Figure 3:
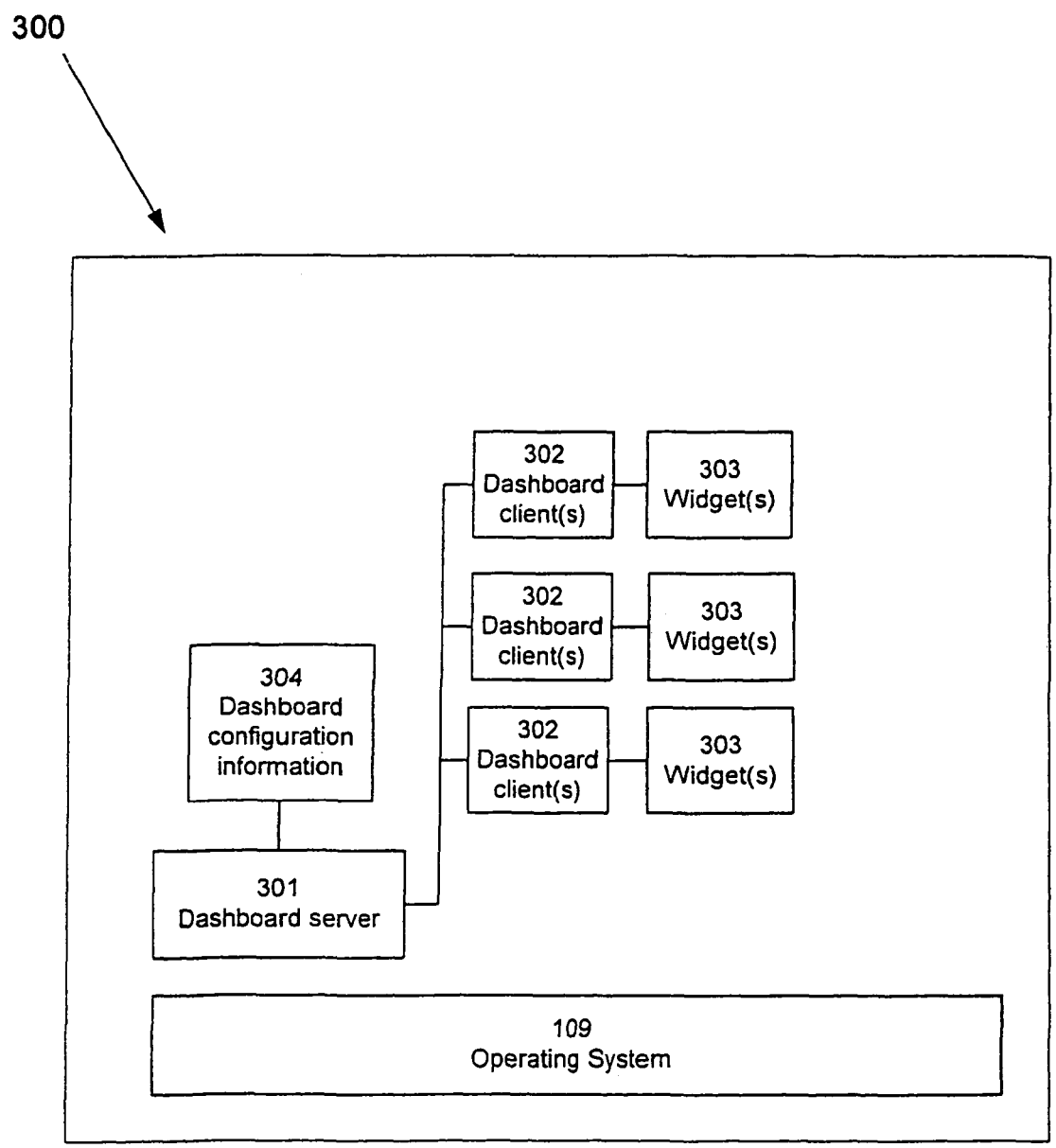
FIG. 3 is a block diagram depicting a software architecture for implementing the present invention according to one embodiment.

Referring now to FIG. 3, there is shown an example of a software architecture 300 for implementing the present invention according to one embodiment. In the embodiment, the present invention operates in connection with an operating system 109 as described above.

In one embodiment, software architecture 300 includes dashboard server 301, dashboard client(s) 302, and widget(s) 303. Dashboard configuration information 304 is used by server 301 and/or clients 302 to specify the configuration options for displaying widgets 303. All of the dashboard configuration information, including access levels and the like (if applicable), is stored in dashboard configuration information 304. As described above, such information may include dashboard configuration information for two or more dashboards configured by the same user or by different users.

In one embodiment, widgets 303 are displayed using HTML and related web technology. Dashboard server 301 manages and launches dashboard client 302 processes. Each dashboard client 302 loads a widget 303, which in one embodiment is an HTML webpage and related resources needed to display the page. In one embodiment, a client 302 is initiated for each widget 303 to be displayed. In one embodiment, clients 302 display widgets 303 without a conventional window frame, menu bar, or other components typically associated with on-screen windows; this provides a clean, straightforward display of the overall dashboard that avoids confusion and clutter. Clients 302 display widgets 303 by rendering web pages into a "WebView"; the size of each WebView is defined as metadata associated with the corresponding widget 303. Server 301 is a window server that provides data for rendering a layer that can be overlaid on the normal desktop of the user interface. Widgets 303 are rendered into the separate layer, and then that layer is drawn on top of the normal desktop, so as to partially or completely obscure the desktop while the dashboard is active.

Dashboard Server 301

Dashboard server 301 is a lightweight process that can stand alone or be imbedded in another process. Server 301 can be located at computer 102, or at remote server 107. Server 301 provides the following functionality:

Non-widget UI. In one embodiment, server 301 handles user interface functionality that is not directly related to widgets. This includes, for example: activation; deactivation; dashboard background; background animations; and the like.

Window management. In one embodiment, server 301 acts as a lightweight window server for the dashboard client 302 processes. Windows are created in server 301 process and then passed to dashboard clients 302. Operations performed on windows go through dashboard server 301. Such operations include, for example: resizing; moving; fetching of position and size; and the like. One advantage to having window operations pass through server 301 is that server 301 can then react to widget 303 changes and update the overall environment. For example, server 301 can cause displayed widgets 303 to bounce off of each other, stick to sides of the screen, snap to grids, or the like.

Fast login. In one embodiment, dashboard clients 302 are launched and then rendered into a window from dashboard server 301. Since this can take some time, dashboard server 302 provides an initial image to be rendered in the window while client 302 is launched, so as to improve visual feedback and to make initial activation animation appear instantaneous. As dashboard clients 302 load and render, they take over the window and draw their content.

Event management. In one embodiment, server 301 acts as an event server as well as a window server. Events come from the operating system window server to dashboard server 301 and are routed to the appropriate dashboard client 302. This indirection allows for a variety of features, including: server-side dragging (even if a dashboard client 302 is hung); filtering of events; insertion of server-generated events; and the like. Dashboard clients 302 communicate with server 301 to describe control regions, so that server 301 can initiate server-side drags correctly.

Loading widgets 303. In one embodiment, server 301 is responsible for loading widgets 303. It maintains the list of widgets 303 to load when starting up. In one embodiment, the dashboard client 302 corresponding to a particular widget 303 is not launched until the first time the dashboard is activated.

Arbitration of widgets 303. In one embodiment, server 301 is the arbitrator of dashboard clients 302. It controls the process and passes information to and from each widget 303. If a widget 303 crashes, dashboard server 301 re-launches the process automatically. It also prevents crash loops where a widget 303 crashes repeatedly at startup. In one embodiment, all communication to a widget 303 goes through dashboard server 301 first.

CoreImage integration. In one embodiment, server 301 uses CoreImage technology, as described in related U.S. Utility patent applications cross-referenced above. Filters are applied to the background window of the server to provide spotlight and ripple effects.

Widget 303 preference management. In one embodiment, server 301 stores, in configuration information 304 that is stored according to a conventional file system, preferences associated with widgets 303, and vends those preferences to widgets 303.

Dashboard Client 302

In one embodiment, each client 302 is a lightweight process that uses, for example, objects defined as part of a development environment such as Cocoa Application Framework (also referred to as the Application Kit, or AppKit), described for example at *Mac OS X Tiger Release Notes Cocoa Application Framework*, available at "http://developer.apple.com/documentation/ReleaseNotes/Cocoa/AppKit.html"). Clients 302 can be implemented as simplified browser screens that omit conventional interface features such as a menu bar, window frame, and the like. In one embodiment, clients 302 provide the following functionality in implementing the present invention:

Control of the WebView. Client 302 creates a WebView and attaches the HTML of widget 303 to the WebView. Client 302 acts as the delegate for user interface requests made by the WebView. In one embodiment, client 302 overrides much of AppKit's default behavior as it regards to communication to server 301 and event handling. WebViews are generic controls for viewing and manipulating HTML and XHTML; they are described, for example, at *Web Kit Reference for Objective-C*, available at "http://developer.apple.com/documentation/Cocoa/Reference/WebKit/ObjC_Classic/index.html".

JavaScript extensions. In one embodiment, client 302 inserts a custom object in the JavaScript runtime of the WebView. This allows for a variety of extensions for widgets 303, including without limitation: copy/cut/paste; getting/setting preferences; notifications when preferences have changed; opening a linked application (for example, a widget 303 may include a button or other trigger that causes a corresponding application to be launched); quitting; moving/resizing; and the like.

Managing Plug-ins. Some widgets 303 use native code as part of their implementations. In one embodiment, client 302 includes the capability to interface with such native code and/or with databases and data stores available locally or remotely. In one embodiment, widgets 303 also have the ability to create a custom AppKit NSView. A widget developer can use a custom view to enable other types of animations, such as OpenGL views, plug-ins such as Flash, and the like.

In one embodiment, plug-ins are implemented as follows. An ObjC bundle is loaded from a resources folder associated with widget 303. The bundle has two methods on its Principal Class:

-(id) initWithWebView:(WebView*)webview;
-(void) windowScriptObjectAvailable:(WebScriptObject*)windowScriptObject (this allows the plugin to add JavaScript extensions before the web page has loaded);

initWithWebView is called when the Dashboard Client starts up, and webViewLoaded is called when the page finishes loading. The developer of a plug-in can use the WebKit's scripting APIs to extend the JavaScript for a particular widget 303.

Widget 303 Format

In one embodiment, each widget 303 is implemented as an HTML file. The HTML file can reference other local and remote resources such as style sheets, other HTML files, JavaScript files, images, and the like. Widgets 303 can be implemented using, for example, a flat bundle file format or a packaged HTML file format.

Flat Bundle. The Flat Bundle format has the following directory structure:
- My.widget (directory/Bundle)
- Info.plist (file)
- My.html (file)
- My.png (file)
- English.lproj (optional directory)
- Localizable.strings (file)

The Info.plist describes widget 303. It also provides an identifier for widget 303, and points to the main HTML file and default PNG file. The default PNG file is used as a temporary display while dynamic elements are loaded from server 301. An example of a structure for Info.plist is as follows:

| Key | Type | Description/Value |
| --- | --- | --- |
| CFBundleIdentifier | CFString. | com.apple.widget <widget name> |
| CFBundleName | CFString | name of the widget |
| MainHTML | CFString | name of main HTML resource |
| Width | CFNumber | default width of the widget |
| Height | CFNumber | default height of the widget |
| DefaultImage | CFString | resource name of default PNG |
| Plugin (optional) | CFString | resource name of native plugin |

My.html can reference any other local resource as well. In one embodiment, the resources are specified relative to the HTML file's location.

My.png can have any name, based on the "DefaultImage" key in the Info.plist. This image is rendered by server 301 if there is no cached representation.

The English.lproj and other localizable directories are for localizable strings.

Widget 303 Location

In one embodiment, widgets 303 are stored locally in storage device 106 such as a hard drive. Per-machine widgets 303 are stored at, for example:
- /Library/Widgets
- /Applications/Widgets/

Widgets 303 can also be made available on a per-user basis, particularly in situations where more than one user uses the same computer 102. Peruser widgets 303 are stored, for example, at:
- ~/Widgets
- ~/Library/Widgets/

One skilled in the art will recognize that these configurations are merely exemplary, and that any other file format or directory structure can be used.

Widget 303 Development

In one embodiment, widgets 303 can be developed using WebKit, described, for example, at Web Kit Reference for Objective-C, available at "http://developer.apple.com/documentation/Cocoa/Reference/WebKit/ObjC_classic/index.html". Additional functionality can also be provided, such as the ability to drag to and from web pages, detect control regions, stop plug-ins and timers from firing when the dashboard is hidden, and the like. In one embodiment, such additional functionality is provided using an enhanced Canvas architecture, as described in related U.S. Provisional patent application Ser. No. 60/583,125, for "Procedurally Expressing Graphic Objects for Web Pages," filed Jun. 25, 2004, the disclosure of which is incorporated herein by reference. In addition, web extensions that are well known in the art can be used for providing additional functionality such as drag-and-drop capability, detection of control regions, and the like.

For widgets that involve additional, more detailed rendering than is available from WebKit/HTML, a <canvas> tag is provided. A CoreGraphics context is fetchable from the <canvas> tag, and JavaScript is then used to draw into the context and effectively the HTML page. Detailed description of this implementation can be found in the related applications.

Remote server 107 Access

In one embodiment, some or all widgets 303 communicate with a remote server 107 in order to perform their functions. For example, a weather widget requests current weather data from a remote server 107, while a package tracking widget requests current data regarding package locations from a remote server 107. Such communication takes place according to well-known techniques for requesting and receiving information across a network such as the Internet: widget 303 or client 302 forms a request for data, and transmits the request according to HTTP or some other network protocol; server 107 responds to the request with the information; and widget 303 uses the information in forming the output that will be displayed to the user. In one embodiment, these operations take place in response to JavaScript code within widget 303. Server 107 can be a resource that is available generally to the public, or it can be a proprietary source of information to which the user has been given access. Where appropriate, authorization and/or user verification can be required before server 107 transmits requested information. If desired, the information can be transmitted across a secure channel and/or encrypted prior to transmission, according to techniques that are well known in the art.

Examples of Widgets 303

The following is a list of examples of widgets 303 that can be provided using the techniques of the present invention. One skilled in the art will recognize that many other types of widgets 303 can be provided.
- buddy list
- calculator
- date book
- dictionary
- online music store and music player
- movie show times
- news feed
- package tracker
- rolodex
- sports scores
- stickies
- stock quotes
- webcam
- weather
- world clock
- currency converter
- online auction viewer and tool
- lottery
- mini inbox for receiving email
- puzzle
- telephone directory (e.g., yellow pages)

FIGS. 18 through 25 depict examples of some of these types of widgets 303. One skilled in the art will recognize that the particular layout, appearance, and arrangement of each of these widgets 303 are merely exemplary. In particular, any or all of these widgets 303 can include a button for accessing a fully functional application having expanded functionality, as described above in connection with FIGS. 9 and 10.

Figure 18:
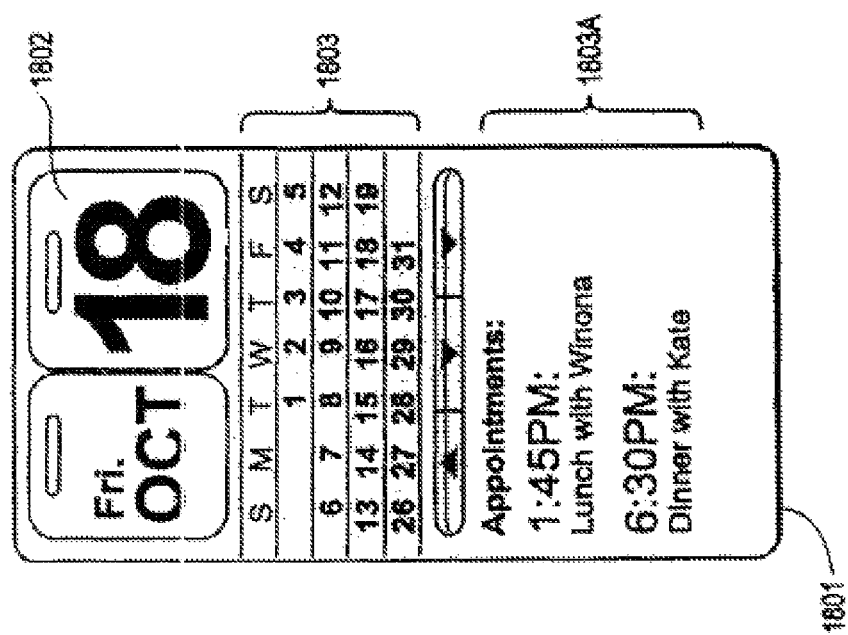
FIG. 18 is an example of a calendar widget according to one embodiment.

FIG. 18 depicts an example of a calendar widget 1801 according to one embodiment, including current date 1802, calendar display 1803 showing current month, and appointments 1803A. In one embodiment, data for the calendar is stored locally at computer 102; in another embodiment, widget 1801 retrieves calendar data from a remote server 107.

Figure 19:
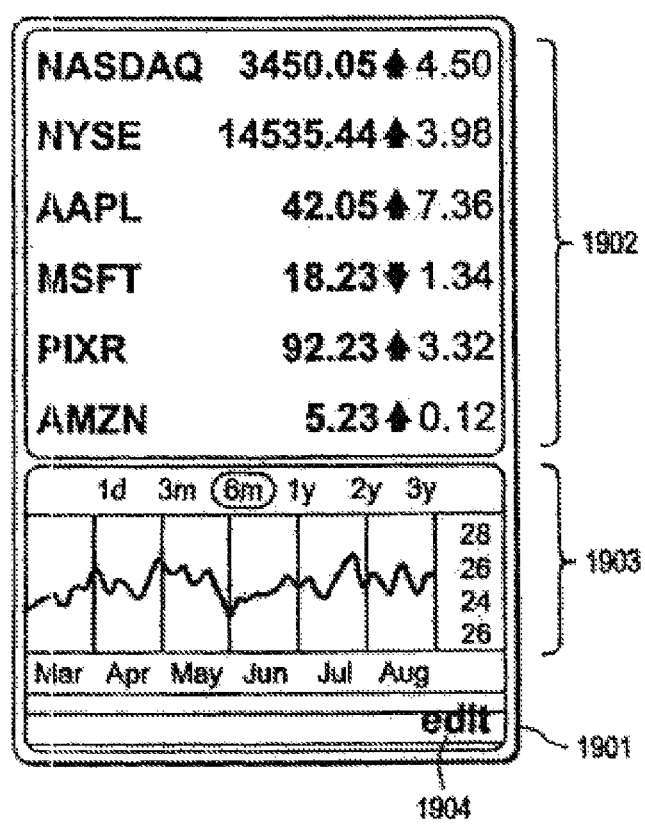
FIG. 19 is an example of a stock quote widget according to one embodiment.

FIG. 19 depicts an example of a stock quote widget 1901 according to one embodiment, including several stock quotes 1902, a graph 1903 for a selected stock, and an edit button 1904 for making changes to the stocks to be included in widget 1901. In one embodiment, widget 1901 retrieves stock quote data from a remote server 107.

Figure 20:
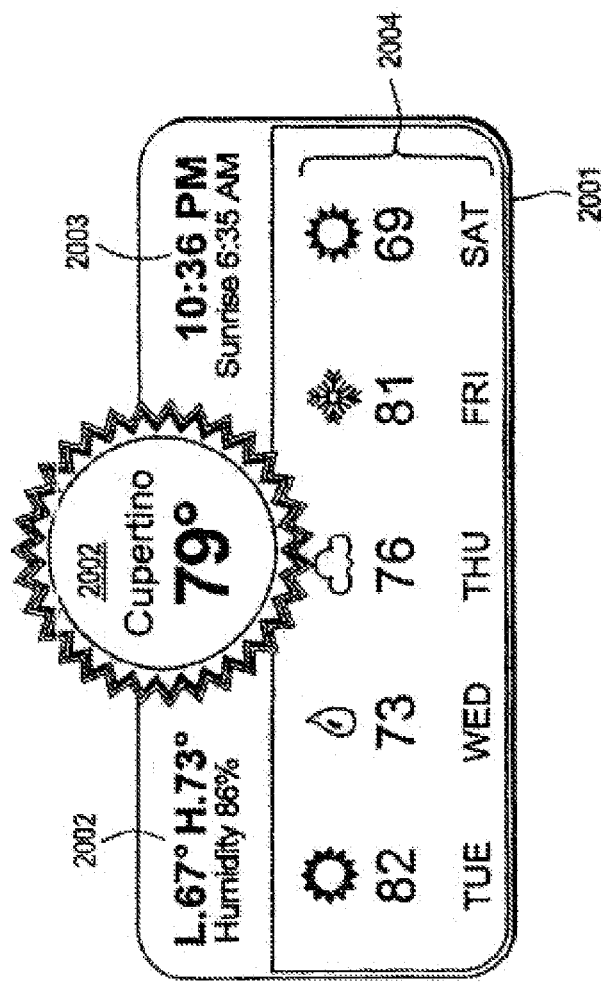
FIG. 20 is an example of a weather widget according to one embodiment.

FIG. 20 depicts an example of a weather widget 2001 according to one embodiment, including current temperature conditions 2002, current time 2003, and forecast 2004. Widget 2001 can be configured to show weather information for any one or more locations of interest to the user. In one embodiment, widget 2001 retrieves weather data from a remote server 107.

Figure 21:
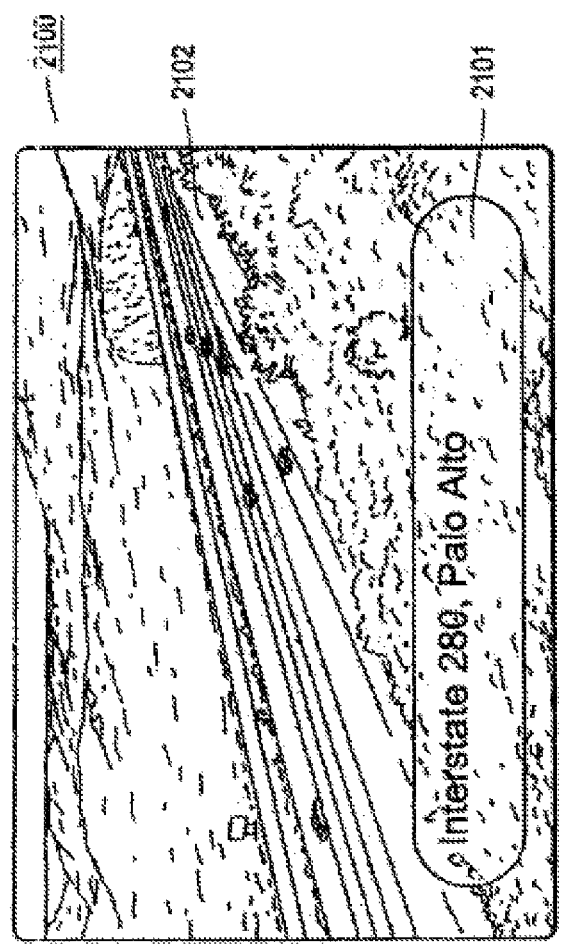
FIG. 21 is an example of a traffic webcam widget according to one embodiment.

FIG. 21 depicts an example of a traffic webcam widget 2100, including a current photograph 2102 (or live video feed) of a specified location, and an identifier 2101 of the location according to one embodiment. Widget 2100 can be configured to show images for any one or more locations of interest to the user. In one embodiment, widget 2100 retrieves photographs and/or video from a remote server 107.

Figure 22:
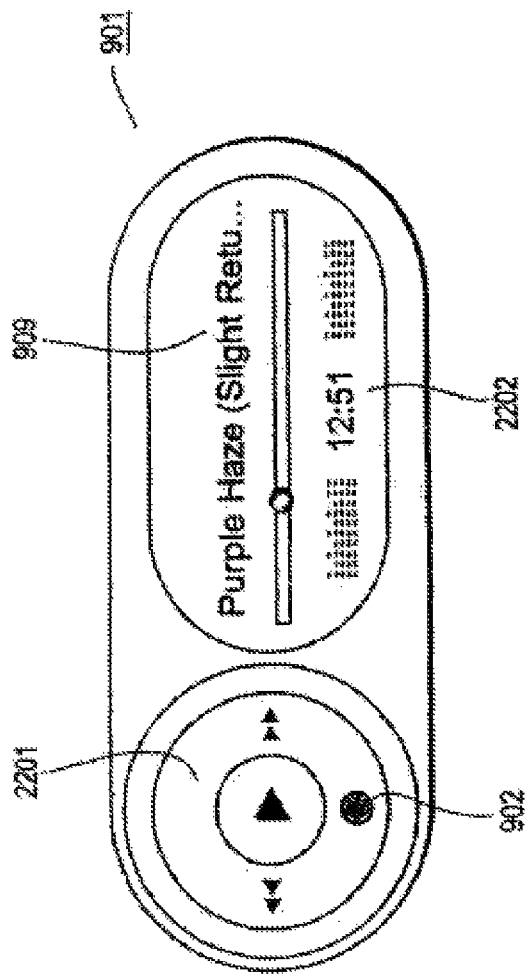
FIG. 22 is an example of a music player widget according to one embodiment.

FIG. 22 depicts an example of a music player widget 901 according to one embodiment, including now-playing indicator 909, counter 2202, controls 2201 for pausing, playing, rewinding and fast-forwarding, and button 902 for accessing a fully functional music player application, as described above in connection with FIGS. 9 and 10. In one embodiment, widget 901 retrieves music data from a remote server 107.

Figure 23:
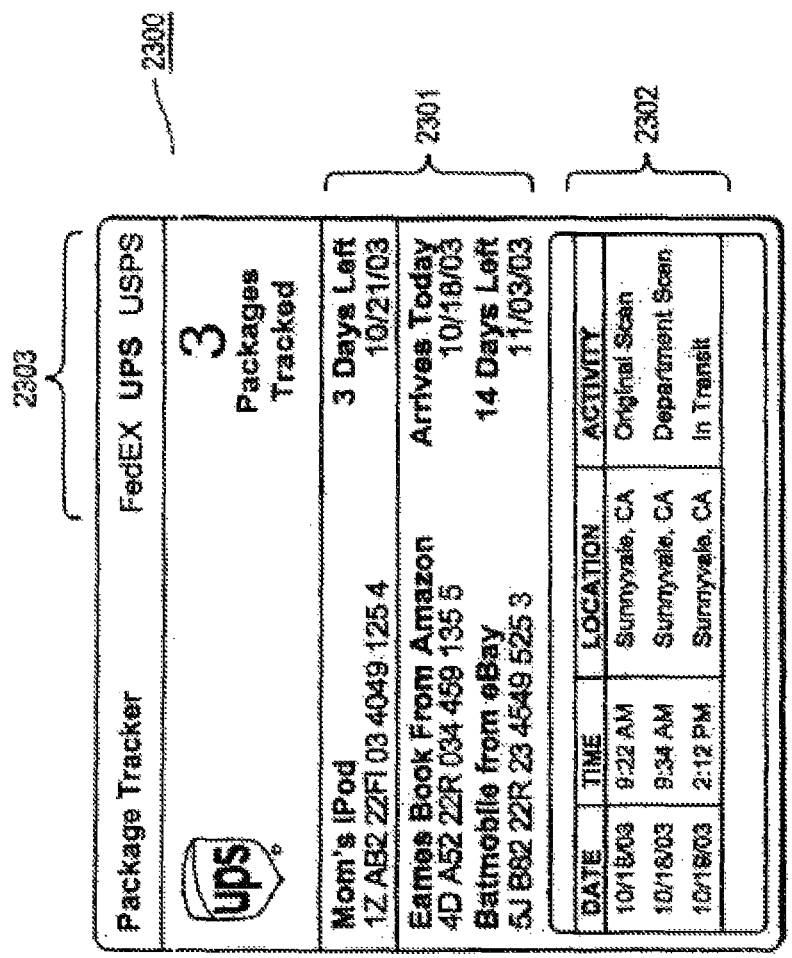
FIG. 23 is an example of a package tracking widget according to one embodiment.

FIG. 23 depicts an example of a package tracking widget 2300 according to one embodiment, including a list of delivery services 2303, one of which is currently selected. Package tracking information 2301 for the selected delivery service is shown, including a name for each item being delivered, current status, tracking number, and the date of the last update for that item. Detailed tracking info 2302 is shown for a selected item in 2301. The user can configure widget 2300 to add items to be tracked, format the results, and the like. In one embodiment, widget 2300 retrieves package tracking data from a remote server 107.

Figure 24:
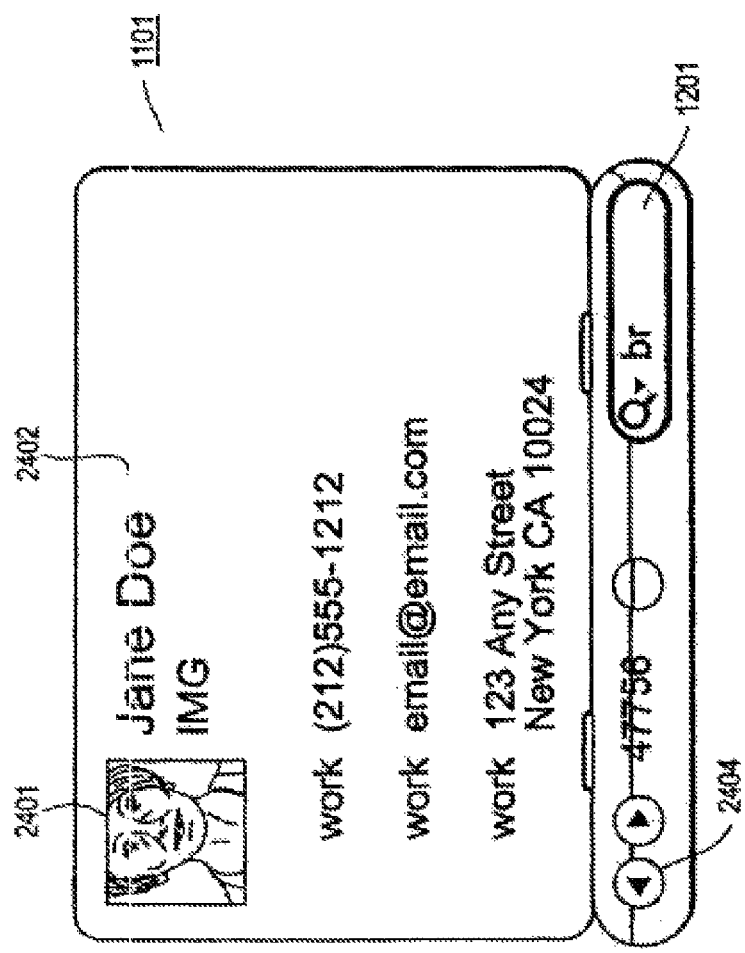
FIG. 24 is an example of an address book widget according to one embodiment.

FIG. 24 depicts an example of an address book widget 1101 according to one embodiment. Widget 1101 includes the following information for an individual: a name 2402, photograph 2401, and contact information 2403. Arrows 2404 allow the user to navigate to other records in the address book. Search field 1201 allows the user to search for names that begin with or include the search terms. In one embodiment, data for the address book is stored locally at computer 102; in another embodiment, widget 1101 retrieves address book data from a remote server 107.

Figure 25:
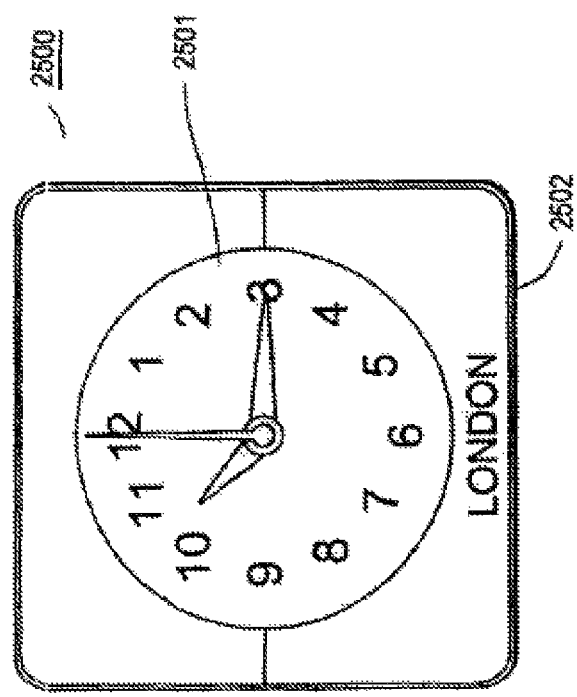
FIG. 25 is an example of a clock widget according to one embodiment.

FIG. 25 depicts an example of a clock widget 2500 according to one embodiment, including a current time display 2501 (which can take any form, digital and/or analog), and a location 2502 corresponding to the current time display 2501. The user can configure widget 2500 to change the time, location, and/or format of the display.

In one embodiment, clock widget 2500 changes in appearance according to the time of day. For example, a light-colored face can be shown during the day, and a dark face can be shown at night. Referring again to FIG. 26, clock widget 2500A has a light-colored face because the local time in San Francisco is 11:28 am, while clock widget 2500B has a dark face because the local time in London is 7:28 pm. In one embodiment, other distinguishing visual characteristics are used to denote day and night. In one embodiment, local times from 6:00 am to 6:00 pm are indicated as being daytime, while local times from 6:00 pm to 6:00 am are indicated as being night time. In another embodiment, actual sunrise and sunset times are used for controlling the appearance of clock widget 2500 (based on the selected location for the clock widget 2500, and further based on sunrise/sunset information retrieved from stored tables or from a resource such as a website). In another embodiment, a continuous gradation is used, so that times near sunset or sunrise are shown in some gradation between the dark and light-colored faces; such times may also be shown in a pinkish hue to further reinforce the sunset or sunrise time period.

Figure 33:
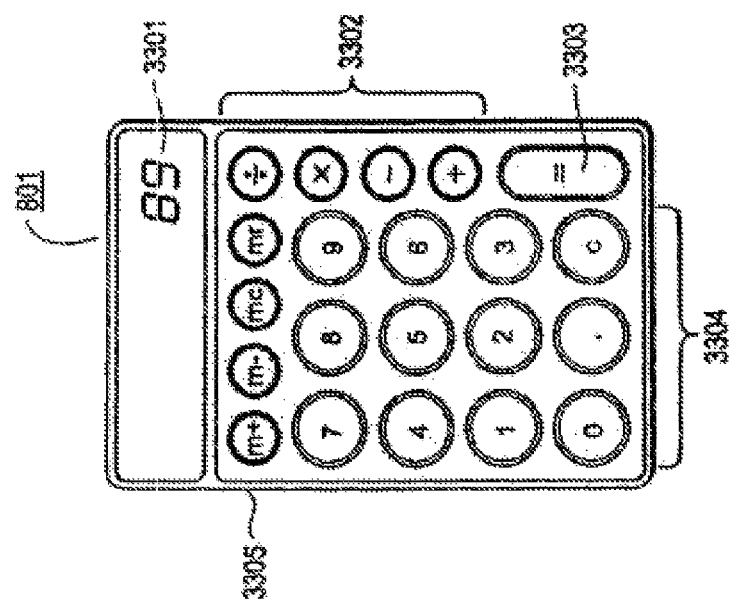
FIG. 33 is an example of a calculator widget according to one embodiment.

FIG. 33 depicts an example of a calculator widget 801 according to one embodiment, including numeric display 3301, keypad 3304, arithmetic operator keys 3302, memory keys 3305, and equals key 3303. Keys 3302, 3303, 3304, and 3305 generally function in a manner similar to that of conventional calculators and calculator accessories, except as noted herein. Display 3301 shows results of calculations in a manner similar to that of conventional calculators and calculator accessories, except as noted herein.

In one embodiment, display 3301 lights up, or otherwise changes in appearance, to indicate that calculator widget 801 is active. For example, display 3301 may light up when the user first clicks somewhere within widget 801, and may stay lit until the user dismisses widget 801 or clicks somewhere outside widget 801. While display 3301 is lit, widget 801 is active and can receive user input via the onscreen cursor or via a keyboard or other input device.

In one embodiment, operator keys 3302 light up when lit, and stay lit until the next key is pressed, so as to remind the user what operation is being performed. For example, in FIG. 33 the division operator key 3302 is lit, signifying that the user has clicked on that key, and reminds the user that the current operation is a division operation. In one embodiment, operator key 3302 stays lit until another operator key 3302 is pressed, or until the clear button is pressed, or until equals key 3303 is pressed; in another embodiment, operator key 3302 stays lit until any other key is pressed.

Figure 34A:
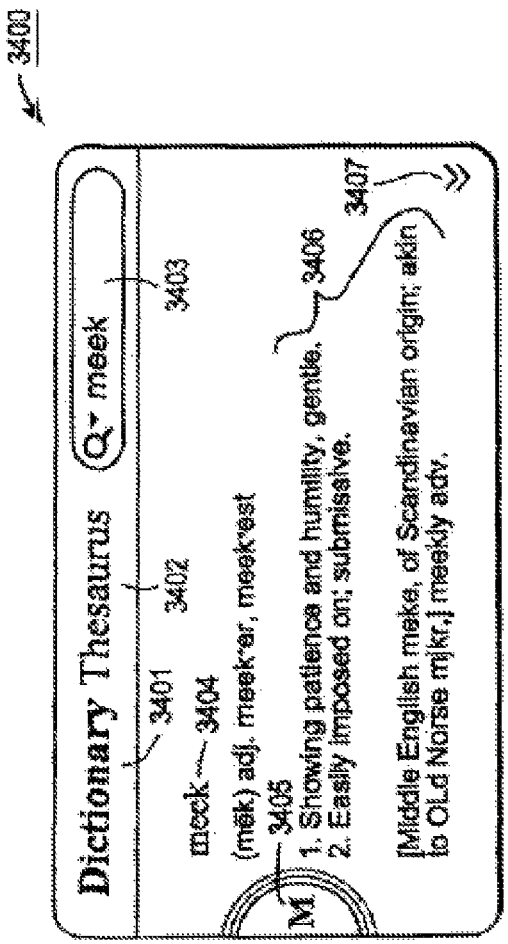
FIGS. 34A and 34B depict an example of a dictionary/thesaurus widget according to one embodiment.
Figure 34B:
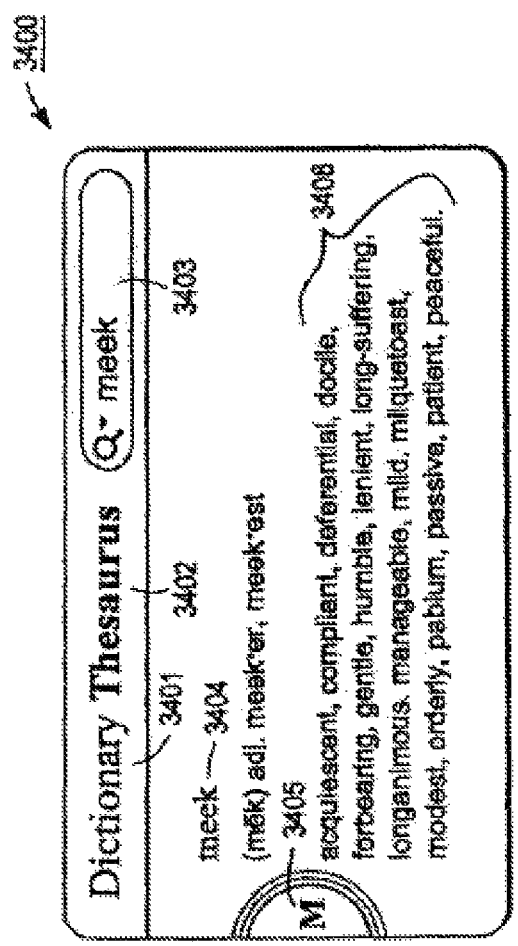

Referring now to FIGS. 34A and 34B, there is shown an example of a dictionary/thesaurus widget 3400 according to one embodiment. A user can type a word in text input field 3403, and can select dictionary or thesaurus functionality by clicking on text labels 3401 or 3402, respectively, to see either definition 3406 or synonyms 3408. If either definition 3406 or synonyms 3408 do not fit within the bounds of widget 3400, widget 3400 can auto-resize accordingly, or can display arrows 3407 for accessing the rest of the information. Thumb index 3405 can also be presented, allowing the user to quickly access other words that appear on the same dictionary page as the entered word. In one embodiment, a reverse lookup dictionary (not shown) can also be provided (the user enters a definition or part thereof, and widget 303 responds with one or more words that match the entry). In one embodiment, data for the dictionary/thesaurus is stored locally at computer 102; in another embodiment, the dictionary/thesaurus widget retrieves its data from a remote server 107.

In one embodiment, the dashboard is also available to a user from a remote location. Configuration information for the user's dashboard is stored at a remote server, pursuant to a user command or automatically. The user can then log in from a remote computer or other device, and be presented with a web page that duplicates the user's dashboard as it would be viewed from his or her own computer. Widgets 303 are provided via HTML pages per the extended functionality described above. The user can interact with widgets 303 in the same manner as from his or her own computer.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

In particular, one skilled in the art will recognize that other architectures and graphics environments may be used, and that the present invention can be implemented using graphics tools and products other than those described above. In particular, the client/server approach is merely one example of an architecture for providing the dashboard functionality of the present invention; one skilled in the art will recognize that other, non-client/server approaches can also be used.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems may be used with programs in accordance with the teachings herein, or it may prove convenient to construct more specialized apparatuses to perform the method steps. The required structure for a variety of these systems will appear from the description below. In addition, the present invention is not described with reference to any particular programming language. It will be appreciated that a variety of programming languages may be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A method for viewing a widget in a dashboard comprising:

receiving, at a widget browser process, a selection of a widget for installation, the widget to be displayed in a dashboard of a user interface of a device, the dashboard being distinct from a desktop user interface, wherein receiving the selection includes launching an installer process; and in response to the selection, previewing the selected widget including executing the widget on the device in a preview process prior to installing the widget on the device for display in the dashboard of the user interface, the preview process being distinct from the installer process;

the previewing the widget including:
    instantiating the widget in a preview process;
    displaying the widget in a presentation window of the preview process; and
    supporting interaction of the widget with a user; and selectively installing, by the installer process, the widget for display in the dashboard, wherein the preview process is distinct from the installer process and the widget browser process.

2. The method of claim 1, wherein previewing includes receiving a user selection to preview the widget.

3. The method of claim 1, further comprising presenting the widget in a presentation window and presenting the presentation window in an installation window.

4. The method of claim 3, wherein the presentation window and the installation windows are implemented by separate processes, the method further comprising managing an interaction of the presentation window and the installation window.

5. The method of claim 4, wherein managing includes managing a resizing of an installation window.

6. The method of claim 4, wherein managing includes managing a repositioning of the installation window.

7. The method of claim 4, wherein managing includes managing an interaction with the presentation window which effects a display of the installation window.

8. The method of claim 1, wherein the method is instantiated in a widget.

9. The method of claim 1, wherein selectively installing includes launching, and displaying the widget in, the dashboard.

10. The method of claim 1, where previewing the selected widget further includes presenting one or more interactive features associated with the presentation window that allow a user to selectively continue the installation process.

11. The method of claim 1, where previewing the selected widget further includes presenting one or more interactive features associated with the presentation window that allow a user to selectively discontinue the instantiation of the widget in the preview environment.

12. The method of claim 1, where selectively installing the widget includes installing the widget in response to user input during the instantiation of the widget in the preview environment.

13. A method for viewing a user interface element in a display environment comprising:
  receiving, at a widget browser process, a selection of a user interface element for installation, the user interface element to be displayed in a display environment of a device, the display environment being distinct from a desktop user interface, wherein receiving the selection includes launching an installer process; and
  in response to the selection, previewing the selected user interface element including executing the user interface element on the device in a preview process prior to installing the user interface element for display in the display environment of the device, where the preview process is distinct from the installer process;
  the previewing the user interface element including:
    determining that a preview is required;
    instantiating the user interface element in a preview process;
    displaying the user interface element in a presentation window of the preview process; and
    supporting interaction of the user interface element with a user; and
  selectively installing, by the installer process, the user interface element for display in the display environment, wherein the preview process is distinct from the installer process and the widget browser process.

14. The method of claim 13, wherein previewing includes receiving a user selection to preview the user interface element.

15. The method of claim 13, further comprising presenting the user interface element in a presentation window and presenting the presentation window in an installation window.

16. The method of claim 15, wherein the presentation window and the installation windows are implemented by separate processes, the method further comprising managing an interaction of the presentation window and the installation window.

17. The method of claim 16, wherein managing includes managing a resizing of an installation window.

18. The method of claim 16, wherein managing includes managing a repositioning of the installation window.

19. The method of claim 16, wherein managing includes managing an interaction with the presentation window which effects a display of the installation window.

20. The method of claim 13, wherein the method is instantiated in a widget.

21. The method of claim 13, wherein selectively installing includes launching, and displaying the user interface element in, a dashboard.

22. A non-transitory computer-readable medium having instructions stored thereon, which, when executed by a processor, causes the processor to perform operations comprising:
  obtaining input, at a widget browser process, selecting a widget for installation in a dashboard environment, the dashboard environment being distinct from a desktop user interface; and
  in response to the selection, previewing the selected widget including executing the widget on a device in a preview process prior to installing the widget with an installer process on the device, the preview process being distinct from the installer process and the widget browser process.

23. The non-transitory computer-readable medium of claim 22, wherein the instructions that cause previewing comprise instructions that cause:
  presenting the widget in a presentation window and presenting the presentation window in an installation window.

* * * * *

UNITED STATES PATENT AND TRADEMARK OFFICE
CERTIFICATE OF CORRECTION

PATENT NO. : 8,453,065 B2  
APPLICATION NO. : 11/148010  
DATED : May 28, 2013  
INVENTOR(S) : Imran A. Chaudhri et al.

Page 1 of 3

It is certified that error appears in the above-identified patent and that said Letters Patent is hereby corrected as shown below:

In the listing of Inventors, Title Page, column 1, line 1, delete "ChaudhrI" and insert -- Chaudhri --.

References Cited

In the listing of Other Publications, Title Page 5, column 2, line 13, delete "Internet >URL:" and insert -- Internet <URL: --.

In the listing of Other Publications, Title Page 5, column 2, line 20, delete ""Cacaded" and insert -- "Cascaded --.

In the listing of Other Publications, Title Page 5, column 2, line 20, delete "Estimatioon" and insert -- Estimation --.

In the listing of Other Publications, Title Page 5, column 2, line 29, delete "httlp://" and insert -- http:// --.

In the listing of Other Publications, Title Page 5, column 2, line 53, delete ":htrp://" and insert -- :http:// --.

In the listing of Other Publications, Title Page 6, column 1, line 10, delete "Retreived" and insert -- Retrieved --.

In the listing of Other Publications, Title Page 6, column 1, line 13, delete "Mutlimedia" and insert -- Multimedia --.

In the listing of Other Publications, Title Page 6, column 1, line 19, delete "fliekr;" and insert -- flickr: --.

Signed and Sealed this  
Twenty-seventh Day of May, 2014

Michelle K. Lee  
*Deputy Director of the United States Patent and Trademark Office*

CERTIFICATE OF CORRECTION (continued)
U.S. Pat. No. 8,453,065 B2

In the listing of Other Publications, Title Page 6, column 1, line 35, delete "Mutli-Touch" and insert -- Multi-Touch --.

In the listing of Other Publications, Title Page 6, column 1, line 48, delete "[Retrived" and insert -- [Retrieved --.

In the listing of Other Publications, Title Page 6, column 1, line 56, delete "Intrenational" and insert -- International --.

In the listing of Other Publications, Title Page 6, column 1, line 60, delete "Intrenational" and insert -- International --.

In the listing of Other Publications, Title Page 6, column 2, line 18, delete "Interent" and insert -- Internet --.

In the listing of Other Publications, Title Page 6, column 2, line 51, delete "Interent" and insert -- Internet --.

In the listing of Other Publications, Title Page 6, column 2, line 63, delete "Mutlimedia" and insert -- Multimedia --.

In the listing of Other Publications, Title Page 7, column 1, line 7, delete "/does/." and insert -- /docs/. --.

In the listing of Other Publications, Title Page 7, column 1, line 33, delete "Mutlimedia" and insert -- Multimedia --.

In the listing of Other Publications, Title Page 7, column 1, line 42, delete "RL:" and insert -- URL: --.

In the listing of Other Publications, Title Page 7, column 1, line 72, delete "Interntional" and insert -- International --.

In the listing of Other Publications, Title Page 7, column 2, line 37, delete ".widipedia." and insert -- . Wikipedia. --.

In the listing of Other Publications, Title Page 7, column 3, line 49, delete "Lurnen-" and insert -- Lernen- --.

In the listing of Other Publications, Title Page 8, column 1, line 11, delete ".grahics." and insert -- .graphics. --.

In the listing of Other Publications, Title Page 8, column 1, line 18, delete "archivve" and insert -- archive --.

CERTIFICATE OF CORRECTION (continued)
U.S. Pat. No. 8,453,065 B2

In the listing of Other Publications, Title Page 8, column 1, line 20, delete "archivve" and insert -- archive --.

In the listing of Other Publications, Title Page 8, column 1, line 47, delete "Writen" and insert -- Written --.

In the Specification

Column 1, Line 22, delete "and." and insert -- and --.

In the Claims

In Claim 10, column 29, line 22, delete "where" and insert -- wherein --.

In Claim 11, column 29, line 26, delete "where" and insert -- wherein --.

In Claim 12, column 29, line 31, delete "where" and insert -- wherein --.

UNITED STATES PATENT AND TRADEMARK OFFICE
CERTIFICATE OF CORRECTION

PATENT NO. : 8,453,065 B2  
APPLICATION NO. : 11/148010  
DATED : May 28, 2013  
INVENTOR(S) : Imran A. Chaudhri et al.

Page 1 of 3

It is certified that error appears in the above-identified patent and that said Letters Patent is hereby corrected as shown below:

Title page, item (12), delete "Chaudhrl" and insert -- Chaudhri --.

In the listing of Inventors, Title Page, column 1, line 1, delete "Chaudhrl" and insert -- Chaudhri --.

References Cited

In the listing of Other Publications, Title Page 5, column 2, line 13, delete "Internet >URL:" and insert -- Internet <URL: --.

In the listing of Other Publications, Title Page 5, column 2, line 20, delete ""Cacaded" and insert -- "Cascaded --.

In the listing of Other Publications, Title Page 5, column 2, line 20, delete "Estimatioon" and insert -- Estimation --.

In the listing of Other Publications, Title Page 5, column 2, line 29, delete "httlp://" and insert -- http:// --.

In the listing of Other Publications, Title Page 5, column 2, line 53, delete ":htrp://" and insert -- :http:// --.

In the listing of Other Publications, Title Page 6, column 1, line 10, delete "Retreived" and insert -- Retrieved --.

In the listing of Other Publications, Title Page 6, column 1, line 13, delete "Mutlimedia" and insert -- Multimedia --.

This certificate supersedes the Certificate of Correction issued May 27, 2014.

Signed and Sealed this  
First Day of July, 2014

Michelle K. Lee  
*Deputy Director of the United States Patent and Trademark Office*

CERTIFICATE OF CORRECTION (continued)
U.S. Pat. No. 8,453,065 B2

In the listing of Other Publications, Title Page 6, column 1, line 19, delete "fliekr;" and insert -- flickr: --.

In the listing of Other Publications, Title Page 6, column 1, line 35, delete "Mutli-Touch" and insert -- Multi-Touch --.

In the listing of Other Publications, Title Page 6, column 1, line 48, delete "[Retrived" and insert -- [Retrieved --.

In the listing of Other Publications, Title Page 6, column 1, line 56, delete "Intrenational" and insert -- International --.

In the listing of Other Publications, Title Page 6, column 1, line 60, delete "Intrenational" and insert -- International --.

In the listing of Other Publications, Title Page 6, column 2, line 18, delete "Interent" and insert -- Internet --.

In the listing of Other Publications, Title Page 6, column 2, line 51, delete "Interent" and insert -- Internet --.

In the listing of Other Publications, Title Page 6, column 2, line 63, delete "Mutlimedia" and insert -- Multimedia --.

In the listing of Other Publications, Title Page 7, column 1, line 7, delete "/does/." and insert -- /docs/. --.

In the listing of Other Publications, Title Page 7, column 1, line 33, delete "Mutlimedia" and insert -- Multimedia --.

In the listing of Other Publications, Title Page 7, column 1, line 42, delete "RL:" and insert -- URL: --.

In the listing of Other Publications, Title Page 7, column 1, line 72, delete "Interntional" and insert -- International --.

In the listing of Other Publications, Title Page 7, column 2, line 37, delete ".widipedia." and insert -- . Wikipedia. --.

In the listing of Other Publications, Title Page 7, column 3, line 49, delete "Lurnen-" and insert -- Lernen- --.

In the listing of Other Publications, Title Page 8, column 1, line 11, delete ".grahics." and insert -- .graphics. --.

CERTIFICATE OF CORRECTION (continued)
U.S. Pat. No. 8,453,065 B2

In the listing of Other Publications, Title Page 8, column 1, line 18, delete "archivve" and insert -- archive --.

In the listing of Other Publications, Title Page 8, column 1, line 20, delete "archivve" and insert -- archive --.

In the listing of Other Publications, Title Page 8, column 1, line 47, delete "Writen" and insert -- Written --.

In the Specification

Column 1, Line 22, delete "and." and insert -- and --.

In the Claims

In Claim 10, column 29, line 22, delete "where" and insert -- wherein --.

In Claim 11, column 29, line 26, delete "where" and insert -- wherein --.

In Claim 12, column 29, line 31, delete "where" and insert -- wherein --.

UNITED STATES PATENT AND TRADEMARK OFFICE
CERTIFICATE OF CORRECTION

| | | |
|---|---|---|
| PATENT NO. | : 8,453,065 B2 | Page 1 of 1 |
| APPLICATION NO. | : 11/148010 | |
| DATED | : May 28, 2013 | |
| INVENTOR(S) | : Imran A. Chaudhri et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 46 days.

Signed and Sealed this
Thirtieth Day of December, 2014

Michelle K. Lee
*Deputy Director of the United States Patent and Trademark Office*